US012787934B2

(12) United States Patent
Heims

(10) Patent No.: US 12,787,934 B2
(45) Date of Patent: Nov. 10, 2026

(54) BIASING SUPPORT MEMBER FOR A ROW UNIT POINT ASSEMBLY

(71) Applicant: DEERE & COMPANY, Moline, IL (US)

(72) Inventor: Troy M. Heims, Davenport, IA (US)

(73) Assignee: Deere & Company, Moline, IL (US)

(*) Notice: Subject to any disclaimer, the term of this patent is extended or adjusted under 35 U.S.C. 154(b) by 755 days.

(21) Appl. No.: 18/140,119

(22) Filed: Apr. 27, 2023

(65) Prior Publication Data

US 2024/0122120 A1 Apr. 18, 2024

Related U.S. Application Data

(60) Provisional application No. 63/379,338, filed on Oct. 13, 2022, provisional application No. 63/379,344, filed on Oct. 13, 2022, provisional application No. 63/379,346, filed on Oct. 13, 2022.

(51) Int. Cl.
*A01D 45/02* (2006.01)
*A01D 41/06* (2006.01)
*A01D 41/127* (2006.01)

(52) U.S. Cl.
CPC .......... *A01D 45/028* (2013.01); *A01D 41/06* (2013.01); *A01D 41/127* (2013.01)

(58) Field of Classification Search
CPC ..... A01D 45/028; A01D 41/06; A01D 41/127
See application file for complete search history.

(56) References Cited

U.S. PATENT DOCUMENTS 2,139,962 A 12/1938 Knudson
2,584,180 A 2/1952 Aasland
2,587,857 A 3/1952 Karlsson
(Continued)

FOREIGN PATENT DOCUMENTS

BR 102020026350 A2 7/2022
CA 2257049 A1 6/1999
(Continued)

OTHER PUBLICATIONS

Deere; Article: "Hydraulically-Adjustable Deck Plates"; pp. 1; Updated Jul. 25, 2008.
(Continued)

*Primary Examiner* — Christopher J Sebesta
(74) *Attorney, Agent, or Firm* — Taft Stettinius & Hollister LLP; Stephen F. Rost

(57) ABSTRACT

An agricultural header for use with an agricultural harvester includes a header frame, a first row unit having a first row unit frame coupled to the header frame, and a second row unit having a second row unit frame coupled to the header frame. The header also includes a casting body coupled to the first row unit frame, a sensing unit of a stalk-diameter sensing system including a frame portion and a stalk feeler deflectably coupled to the sensing unit, and a point assembly pivotally coupled to the header frame. The point assembly at least partially covers the sensing unit. A crossbar member includes a first portion and a second portion with the first portion being pivotally coupled to the casting body to pivot about a first pivot axis. The crossbar member is pivotable about the first pivot axis between a first position and a second position.

19 Claims, 40 Drawing Sheets

(56) References Cited

U.S. PATENT DOCUMENTS

| | | | |
|---|---|---|---|
| 2,728,183 | A | 12/1955 | Ratmeyer |
| 3,339,354 | A | 9/1967 | Kessler |
| 3,365,867 | A | 1/1968 | Phillips |
| 3,392,697 | A | 7/1968 | Parrish et al. |
| 3,613,343 | A | 10/1971 | Sagouspe et al. |
| 3,685,266 | A | 8/1972 | Mohn et al. |
| 3,765,157 | A | 10/1973 | Rowland et al. |
| 3,774,381 | A | 11/1973 | Burton |
| 3,808,783 | A | 5/1974 | Sutherland et al. |
| 3,839,887 | A | 10/1974 | Vieregge |
| 3,982,384 | A | 9/1976 | Rohweder et al. |
| 4,115,983 | A | 9/1978 | Barnes et al. |
| 4,166,349 | A | 9/1979 | Coenenberg et al. |
| 4,227,368 | A | 10/1980 | Mossman et al. |
| 4,411,341 | A | 10/1983 | Schultz |
| 4,447,957 | A | 5/1984 | Cavazza |
| 4,505,094 | A | 3/1985 | Demorest |
| 4,517,795 | A | 5/1985 | Meiers |
| 4,538,404 | A | 9/1985 | Heimark, Jr. et al. |
| 4,674,608 | A | 6/1987 | Morris et al. |
| 5,568,405 | A | 10/1996 | Easton et al. |
| 5,790,428 | A | 8/1998 | Easton |
| 5,884,240 | A | 3/1999 | Edgar et al. |
| 6,247,297 | B1 | 6/2001 | Becker |
| 6,963,503 | B1 | 11/2005 | Rahim et al. |
| 7,716,905 | B2 | 5/2010 | Wilcox et al. |
| 7,726,111 | B2 | 6/2010 | Grywacheski |
| 8,224,534 | B2 | 7/2012 | Kowalchuk |
| 8,757,337 | B2 | 6/2014 | Kojima et al. |
| 9,179,602 | B2 | 11/2015 | Vandeven et al. |
| 9,232,693 | B2 | 1/2016 | Hendrickson et al. |
| 9,282,693 | B2 | 3/2016 | Anderson |
| 9,320,196 | B2 | 4/2016 | Dybro et al. |
| 9,322,629 | B2 | 4/2016 | Sauder et al. |
| 9,565,802 | B2 | 2/2017 | Schleicher |
| 9,578,808 | B2 | 2/2017 | Dybro et al. |
| 9,668,420 | B2 | 6/2017 | Anderson et al. |
| 9,832,928 | B2 | 12/2017 | Dybro et al. |
| 9,867,335 | B1 | 1/2018 | Obbink et al. |
| 9,894,835 | B2 | 2/2018 | Sauder et al. |
| 9,901,031 | B2 | 2/2018 | Mott et al. |
| 9,903,979 | B2 | 2/2018 | Dybro et al. |
| 9,936,637 | B2 | 4/2018 | Anderson et al. |
| 10,034,424 | B2 | 7/2018 | Anderson et al. |
| 10,039,231 | B2 | 8/2018 | Anderson et al. |
| 10,178,828 | B2 | 1/2019 | Henderickson et al. |
| 10,264,727 | B2 | 4/2019 | Gessel et al. |
| 10,433,482 | B2 * | 10/2019 | Lehman ............... A01D 45/021 |
| 10,433,483 | B2 | 10/2019 | Cook |
| 10,537,060 | B2 | 1/2020 | Sauder et al. |
| 10,664,726 | B2 | 5/2020 | Wellington et al. |
| 10,820,509 | B2 * | 11/2020 | Schroeder ............ A01D 61/004 |
| 10,829,033 | B1 | 11/2020 | McKinney et al. |
| 10,993,373 | B2 | 5/2021 | Meschke et al. |
| 11,064,653 | B2 | 7/2021 | Zielke et al. |
| 11,428,289 | B2 | 8/2022 | Nakaya |
| 11,678,607 | B2 | 6/2023 | Zielke |
| 12,588,590 | B2 | 3/2026 | Advani et al. |
| 2006/0096708 | A1 | 5/2006 | Robinson |
| 2008/0092507 | A1 | 4/2008 | Bollig |
| 2012/0029757 | A1 | 2/2012 | Kowalchuk |
| 2014/0230391 | A1 | 8/2014 | Hendrickson et al. |
| 2014/0230392 | A1 | 8/2014 | Dybro et al. |
| 2014/0230396 | A1 | 8/2014 | Dybro et al. |
| 2014/0230580 | A1 | 8/2014 | Dybro et al. |
| 2014/0236381 | A1 | 8/2014 | Anderson et al. |
| 2014/0331631 | A1 | 11/2014 | Sauder et al. |
| 2015/0082760 | A1 | 3/2015 | Zentner |
| 2015/0107209 | A1 | 4/2015 | Pierson et al. |
| 2015/0163992 | A1 | 6/2015 | Anderson |
| 2015/0319929 | A1 | 11/2015 | Hendrickson et al. |
| 2016/0113199 | A1 | 4/2016 | Jongmans et al. |
| 2016/0174463 | A1 | 6/2016 | Barry |
| 2016/0235002 | A1 | 8/2016 | Sauder et al. |
| 2017/0238467 | A1 | 8/2017 | Gessel et al. |
| 2017/0332547 | A1 | 11/2017 | Walker |
| 2018/0017965 | A1 | 1/2018 | Kosa et al. |
| 2018/0116113 | A1 | 5/2018 | Sauder et al. |
| 2018/0139898 | A1 | 5/2018 | Shearer |
| 2018/0271016 | A1 | 9/2018 | Milano et al. |
| 2019/0335661 | A1 | 11/2019 | Seiders, Jr. |
| 2020/0008351 | A1 | 1/2020 | Zielke et al. |
| 2020/0068803 | A1 | 3/2020 | Sauder et al. |
| 2020/0221635 | A1 | 7/2020 | Hendrickson et al. |
| 2020/0236853 | A1 | 7/2020 | Trowbridge |
| 2020/0267899 | A1 | 8/2020 | Zielke et al. |
| 2020/0323133 | A1 | 10/2020 | Anderson et al. |
| 2020/0337240 | A1 | 10/2020 | Brimeyer et al. |
| 2020/0359562 | A1 * | 11/2020 | Hunt .................... A01D 41/141 |
| 2020/0375107 | A1 | 12/2020 | Duerksen et al. |
| 2020/0390035 | A1 | 12/2020 | Hunt et al. |
| 2021/0015045 | A1 | 1/2021 | Vandike et al. |
| 2021/0022283 | A1 | 1/2021 | Vandike et al. |
| 2021/0053229 | A1 | 2/2021 | Yuan et al. |
| 2021/0059114 | A1 | 3/2021 | Eichhorn et al. |
| 2021/0059117 | A1 | 3/2021 | Hunt |
| 2021/0112713 | A1 | 4/2021 | Martin et al. |
| 2021/0120738 | A1 | 4/2021 | Ricketts et al. |
| 2021/0185877 | A1 | 6/2021 | Hunt et al. |
| 2021/0185879 | A1 | 6/2021 | Hunt et al. |
| 2021/0185880 | A1 | 6/2021 | Martin et al. |
| 2021/0185916 | A1 | 6/2021 | Hunt |
| 2021/0185917 | A1 | 6/2021 | Hunt et al. |
| 2021/0185919 | A1 | 6/2021 | Hunt |
| 2021/0212248 | A1 | 7/2021 | Kong et al. |
| 2021/0212254 | A1 | 7/2021 | Thomas et al. |
| 2021/0235622 | A1 | 8/2021 | Baumgarten et al. |
| 2021/0237982 | A1 | 8/2021 | Trowbridge et al. |
| 2021/0243936 | A1 | 8/2021 | Vandike et al. |
| 2021/0289702 | A1 | 9/2021 | Jung et al. |
| 2021/0289703 | A1 | 9/2021 | Hunt et al. |
| 2021/0298234 | A1 | 9/2021 | Zielke et al. |
| 2021/0307234 | A1 | 10/2021 | Jongmans et al. |
| 2021/0307235 | A1 | 10/2021 | Jongmans et al. |
| 2021/0307248 | A1 | 10/2021 | Missotten et al. |
| 2021/0307249 | A1 | 10/2021 | Jongmans et al. |
| 2021/0315160 | A1 | 10/2021 | Zielke |
| 2021/0318118 | A1 | 10/2021 | Eichhorn |
| 2021/0321602 | A1 | 10/2021 | McMenamy |
| 2021/0329837 | A1 | 10/2021 | Schnaider et al. |
| 2021/0329838 | A1 | 10/2021 | Zielke et al. |
| 2021/0392814 | A1 | 12/2021 | Verhoef et al. |
| 2022/0000022 | A1 * | 1/2022 | Kemmerer ............. A01D 41/14 |
| 2022/0000023 | A1 | 1/2022 | Du et al. |
| 2022/0000024 | A1 | 1/2022 | Zielke et al. |
| 2022/0053693 | A1 | 2/2022 | Gahres et al. |
| 2022/0061218 | A1 | 3/2022 | Karst |
| 2022/0071093 | A1 | 3/2022 | Risius |
| 2022/0087101 | A1 | 3/2022 | Hunt et al. |
| 2022/0113161 | A1 | 4/2022 | Vandike et al. |
| 2022/0117143 | A1 | 4/2022 | Kraus et al. |
| 2022/0132737 | A1 | 5/2022 | Anderson et al. |
| 2022/0167556 | A1 | 6/2022 | Peters |
| 2022/0183229 | A1 | 6/2022 | Hunt |
| 2022/0225569 | A1 | 7/2022 | Zielke et al. |
| 2022/0232770 | A1 | 7/2022 | Yanke et al. |
| 2022/0240446 | A1 | 8/2022 | Martin |
| 2022/0264798 | A1 | 8/2022 | Martin et al. |
| 2022/0304228 | A1 | 9/2022 | Hunt et al. |
| 2022/0312676 | A1 | 10/2022 | Ruebens et al. |
| 2022/0338416 | A1 | 10/2022 | Racchella et al. |
| 2022/0354056 | A1 | 11/2022 | Hunt et al. |
| 2022/0369556 | A1 | 11/2022 | Yanke et al. |
| 2022/0369557 | A1 | 11/2022 | Hunt et al. |
| 2022/0369558 | A1 | 11/2022 | Scharmann et al. |
| 2022/0377978 | A1 | 12/2022 | Laugen et al. |
| 2022/0394927 | A1 | 12/2022 | Seiders, Jr. |
| 2022/0394928 | A1 | 12/2022 | Seiders, Jr. |
| 2022/0400611 | A1 | 12/2022 | Missotten et al. |
| 2025/0000004 | A1 | 1/2025 | Barker |

(56) References Cited

U.S. PATENT DOCUMENTS

FOREIGN PATENT DOCUMENTS

| | | | |
|---|---|---|---|
| CA | 3115254 | A1 | 4/2020 |
| CN | 111226603 | A | 6/2020 |
| CN | 111436276 | A | 7/2020 |
| CN | 111819993 | A | 10/2020 |
| CN | 111903317 | A | 11/2020 |
| CN | 111990062 | A | 11/2020 |
| CN | 212413857 | U | 1/2021 |
| CN | 212589003 | U | 2/2021 |
| CN | 112690089 | A | 4/2021 |
| CN | 113016358 | A | 6/2021 |
| CN | 113099836 | A | 7/2021 |
| CN | 113228939 | A | 8/2021 |
| CN | 113243194 | A | 8/2021 |
| CN | 113607096 | A | 11/2021 |
| CN | 113661827 | A | 11/2021 |
| CN | 214902224 | U | 11/2021 |
| CN | 113966667 | A | 1/2022 |
| CN | 114187353 | A | 3/2022 |
| CN | 114223386 | A | 3/2022 |
| CN | 114303621 | A | 4/2022 |
| CN | 114342665 | A | 4/2022 |
| CN | 114467504 | A | 5/2022 |
| CN | 114631426 | A | 6/2022 |
| CN | 216930906 | U | 7/2022 |
| CN | 114916306 | A | 8/2022 |
| CN | 115067062 | A | 9/2022 |
| DE | 2753149 | A1 | 6/1979 |
| DE | 112014000914 | T5 | 12/2015 |
| EP | 2859787 | B1 | 10/2016 |
| EP | 2782438 | B1 | 6/2017 |
| ES | 2358410 | A1 | 3/2013 |
| IN | 202031035536 | A | 9/2020 |
| IN | 202021036612 | A | 3/2022 |
| WO | WO 2007080448 | A1 | 7/2007 |
| WO | 21062552 | A1 | 4/2021 |
| WO | 21123963 | A1 | 6/2021 |
| WO | 21133756 | A1 | 7/2021 |
| WO | 21217112 | A1 | 10/2021 |
| WO | 21222592 | A1 | 11/2021 |
| WO | 21242867 | A1 | 12/2021 |
| WO | 22003457 | A1 | 1/2022 |
| WO | 22040765 | A1 | 3/2022 |
| WO | 22046769 | A1 | 3/2022 |
| WO | 22077122 | A1 | 4/2022 |
| WO | 22147601 | A1 | 7/2022 |
| WO | 22212355 | A2 | 10/2022 |
| WO | 22232244 | A1 | 11/2022 |
| WO | 23278658 | A1 | 1/2023 |

OTHER PUBLICATIONS

Researchgate; Article: “Sensing Corn Population—Another Variable in the Yield Equation”; Authors: J.W. Hummel, B.M. Lobdell, K.A. Sudduth, S.J. Birrell; pp. 15; https://www.researchgate.net/publication/267193616.

Deere; Screenshot YouTube video titled “Big John Deere Machines Harvesting Corn”; (2016); https://www.youtube.com/watch?v=n1m_U65g_H4&t=1119s.

Deere: Screenshot YouTube video titled “All New 2018 John Deere S780 Combine Harvesting Corn” (2017-2018); https://www.youtube.com/watch?v=D0zHMJfGrzE.

Oklahoma State University, Dept of Biosystems; Precision Agric; Publication Apr. 9, 2013 14:478-494; “Automatic corn plant location and spacing measurement using laser line-scan technique”; https://nue.okstate.edu/Index_Publications/Yeyin_by_plant.pdf.

Ijert Org; IETE 2020, vol. 8—Issue 11; “A Multipurpose Agricultural Robot for Automatic Ploughing, Seeding and Plant Health Monitoring”; https://www.ijert.org/a-multipurpose-agricultural-robot-for-automatic-ploughing-seeding-and-plant-health-monitoring.

Ijert Org; ISSN 2278-0181, vol. 10, Issue 06, Jun. 2021 “Autonomous Robot with Microcontroller for Plant Health Condition Analysis”; https://www.ijert.org/autonomous-robot-with-microcontroller-for-plant-health-condition-analysis.

Researchgate; Intl Journal of Emerging Tech and Innovative Research; ISSN 2349-5162, Jun. 2019, vol. 6, Issue 6, pp. 311-318; https://www.researchgate.net/publication/339941954_FARMING_ROBOT_WITH_PLANT_HEALTH_INDICATION_Cite_asFarming_Robot_With_Plant_Health_Indication_International_Journal_of_Emerging_Technologies_and_Innovative_Research_wwwjetirorg_UGC_and_issn_Approved_IS.

International Journal of Advanced Technology in Engineering and Science, vol. 03, Issue No. 21, Jan. 2015, pp. 248-251, “Autonomous Farming Robot With Plant Health Indication”, Prof. K.V. Fale et al.; URL: http://www.ijates.com.

International Journal of Pure and Applied Mathematics, Special Issue, vol. 116, No. 20 2017, pp. 457-461, “Autonomous Farming Robot With Plant Health Indication”, Dhanasekar J, Sengottuvel P, N Srikanth; URL: http://www.ijpam.eu.

A Tracked Mobile Robotic Lab for Monitoring the Plants Volume and Health, 2016 12th IEEE/ASME International Conference on Mechatronic and Embedded Systems and Applications; 2 pages, Aug. 2016.

“By Plant Prediction of Corn Grain Yield Using Height and Stalk Diameter,” Jonathan Kelly et al., Communications in Soil Science and Plant Analysis, 46:564-575; 14 pages; Apr. 16, 2015.

* cited by examiner

BIASING SUPPORT MEMBER FOR A ROW UNIT POINT ASSEMBLY

RELATED DISCLOSURES

This application claims the benefit of U.S. Provisional Patent Application Ser. No. 63/379,344, filed Oct. 13, 2022, U.S. Provisional Patent Application Ser. No. 63/379,346, filed Oct. 13, 2022, and U.S. Provisional Patent Application Ser. No. 63/379,338, filed Oct. 13, 2022, the disclosures of which are hereby incorporated by reference in their entirety.

TECHNICAL FIELD

The present disclosure relates to agricultural harvesters, in particular, to systems associated with headers of agricultural harvesters.

BACKGROUND

An agricultural harvester may have a header in the form of, for example, a cornhead. A typical row unit of the cornhead has a pair of deck plates that receive stalks of corn between the deck plates and separate ears of corn from the stalks when the stalks are pulled downwardly by underlying stalk rolls. The cornhead then directs the separated ears of corn to the feederhouse of the harvester for ingestion and processing by the harvester.

SUMMARY

According to one implementation of the present disclosure, there is disclosed a stalk-diameter sensing system for use with an agricultural harvester that travels on a field in a forward direction. The stalk-diameter sensing system comprises a first stalk feeler, a second stalk feeler, a first sensor, a second sensor, a first damper, and a second damper. The first and second stalk feelers are deflectably mounted on opposite sides of a stalk-receiving gap that receives a stalk planted in the field. The first and second stalk feelers are yieldably biased into the stalk-receiving gap for deflection upon contact with an outer surface of the stalk as the agricultural harvester travels on the field in the forward direction. The first sensor is coupled to the first stalk feeler to sense deflection of the first stalk feeler and generate a first signal. The second sensor is coupled to the second stalk feeler to sense deflection of the second stalk feeler and generate a second signal. The first damper is positioned to dampen deflection of the first stalk feeler. The second damper is positioned to dampen deflection of the second stalk feeler.

In another implementation of the present disclosure, an agricultural header for use with an agricultural harvester includes a header frame, a first row unit comprising a first row unit frame coupled to the header frame, a second row unit comprising a second row unit frame coupled to the header frame, a casting body coupled to the first row unit frame, and a sensing unit of a stalk-diameter sensing system comprising a frame portion and a stalk feeler deflectably coupled to the sensing unit. The agricultural header includes a point assembly pivotally coupled to the header frame, the point assembly at least partially covering the sensing unit, and a crossbar member comprising a first portion and a second portion, the first portion being pivotally coupled to the casting body to pivot about a first pivot axis. The crossbar member is pivotable about the first pivot axis between a first position and a second position such that in the first position, the second portion of the crossbar member is disposed in contact with the second row unit frame, and in the second position, the second portion of the crossbar member is biased out of contact with the second row unit frame.

In one example of this implementation, the crossbar member pivots about a bushing disposed along the first pivot axis. In a second example, a biasing member includes a first end and a second end, the first end coupled to the first row unit frame and the second end coupled to the crossbar member. In a third example, the second end of the biasing member is coupled to the crossbar member at a location between the first portion and the second portion. In a fourth example, the crossbar member includes an eyebolt fastener coupled thereto, the second end of the biasing member coupled to the eyebolt fastener. In a fifth example, the biasing member is configured to bias the crossbar member to pivot about the first pivot axis towards the second position.

In a sixth example, the point assembly includes a frame structure configured to contact the crossbar member in the first position. In a seventh example, the point assembly is pivotally coupled to the header frame about a second pivot axis. In an eighth example, the first and second pivot axes are generally parallel to one another. In a ninth example, the point assembly is pivotable about the second pivot axis between a work position and a transport position, wherein, when the point assembly is in the work position, the frame structure of the point assembly is in contact with the crossbar member in the first position. When the point assembly is in the transport position, the frame structure is disengaged from the crossbar member and the crossbar member is biased to the second position.

In another example, the header frame includes a first frame assembly and a second frame assembly, the second frame assembly being pivotal about a fold axis relative to the first frame assembly; wherein, the point assembly is aligned along the fold axis. In a further example, the first row unit is coupled to the first frame assembly and the second row unit is coupled to the second frame assembly.

In another implementation of this disclosure, an agricultural header for use with an agricultural harvester includes a header frame including a first frame assembly and a second frame assembly, the second frame assembly pivotally coupled to the header frame about a fold axis, a first row unit including a first row unit frame coupled to the first frame assembly, a second row unit including a second row unit frame coupled to the second frame assembly, and a casting body coupled to the first row unit frame. The agricultural header includes a sensing unit of a stalk-diameter sensing system including a frame portion and a stalk feeler deflectably coupled to the sensing unit, a point assembly aligned along the fold axis and pivotally coupled to the first frame assembly about a first pivot axis, the point assembly at least partially covering the sensing unit, and a crossbar member comprising a first portion and a second portion. The first portion is pivotally coupled to the casting body to pivot about a second pivot axis. The crossbar member is pivotable about the second pivot axis to pivot between a first position and a second position, where in the first position the second portion of the crossbar member is in contact with the second row unit frame.

In one example of this implementation, in the second position the second portion of the crossbar member is biased out of contact with the second row unit frame. In a second example, a biasing member includes a first end and a second end, the first end is coupled to the first row unit frame and the second end is coupled to the crossbar member. In a third example, the biasing member is configured to bias the crossbar member to pivot about the first pivot axis towards the second position. In a fourth example, as the point assembly pivots about the first pivot axis from a work position to a transport position, the crossbar member is biased to pivot about the second pivot axis from the first position to the second position. In another example, as the point assembly pivots about the first pivot axis from the transport position to the work position, the crossbar member is engaged by the point assembly to pivot about the second pivot axis from the second position to the first position.

In a further implementation, an agricultural header for use with an agricultural harvester, includes a header frame comprising a first frame assembly and a second frame assembly, the second frame assembly pivotally coupled to the header frame about a fold axis, a first row unit including a first row unit frame coupled to the first frame assembly, a second row unit including a second row unit frame coupled to the second frame assembly, the first row unit being on one side of the fold axis and the second row unit being on the other side of the fold axis, and a third row unit comprising a third row unit frame coupled to the first frame assembly, the first row unit located between the second row unit and the third row unit. The agricultural header also includes a first casting body coupled to the first row unit frame and a second casting body coupled to the third row unit frame, a stalk-diameter sensing system including a first sensing unit and a second sensing unit, the first sensing unit including a first stalk feeler deflectably coupled to the first sensing unit and the second sensing unit including a second stalk feeler deflectably coupled to the second sensing unit, where the first and second sensing units are coupled to the first row unit frame. A first point assembly is aligned along the fold axis and pivotally coupled to the first frame assembly about a first pivot axis, the first point assembly at least partially covering the first sensing unit. A first crossbar member includes a first portion and a second portion, the first portion pivotally coupled to the first casting body to pivot about a second pivot axis. A biasing member is coupled between the first row unit frame and the first crossbar member, wherein the first crossbar member is pivotable about the second pivot axis to pivot between a first position and a second position, where in the first position the second portion of the crossbar member is in contact with the second row unit frame. The biasing member is configured to bias the first crossbar member out of contact with the second row unit frame and towards the second position.

In one example of this implementation, a second point assembly is located adjacent the first point assembly and offset from the fold axis, the second point assembly is coupled to the first frame assembly and at least partially covering the second sensing unit. A second crossbar member includes a first portion and a second portion, the first portion of the second crossbar member pivotally coupled to the second casting body. The second crossbar member is engaged by the second point assembly to maintain the second portion of the second crossbar member in contact with the first row unit frame without being biased out of contact therewith.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
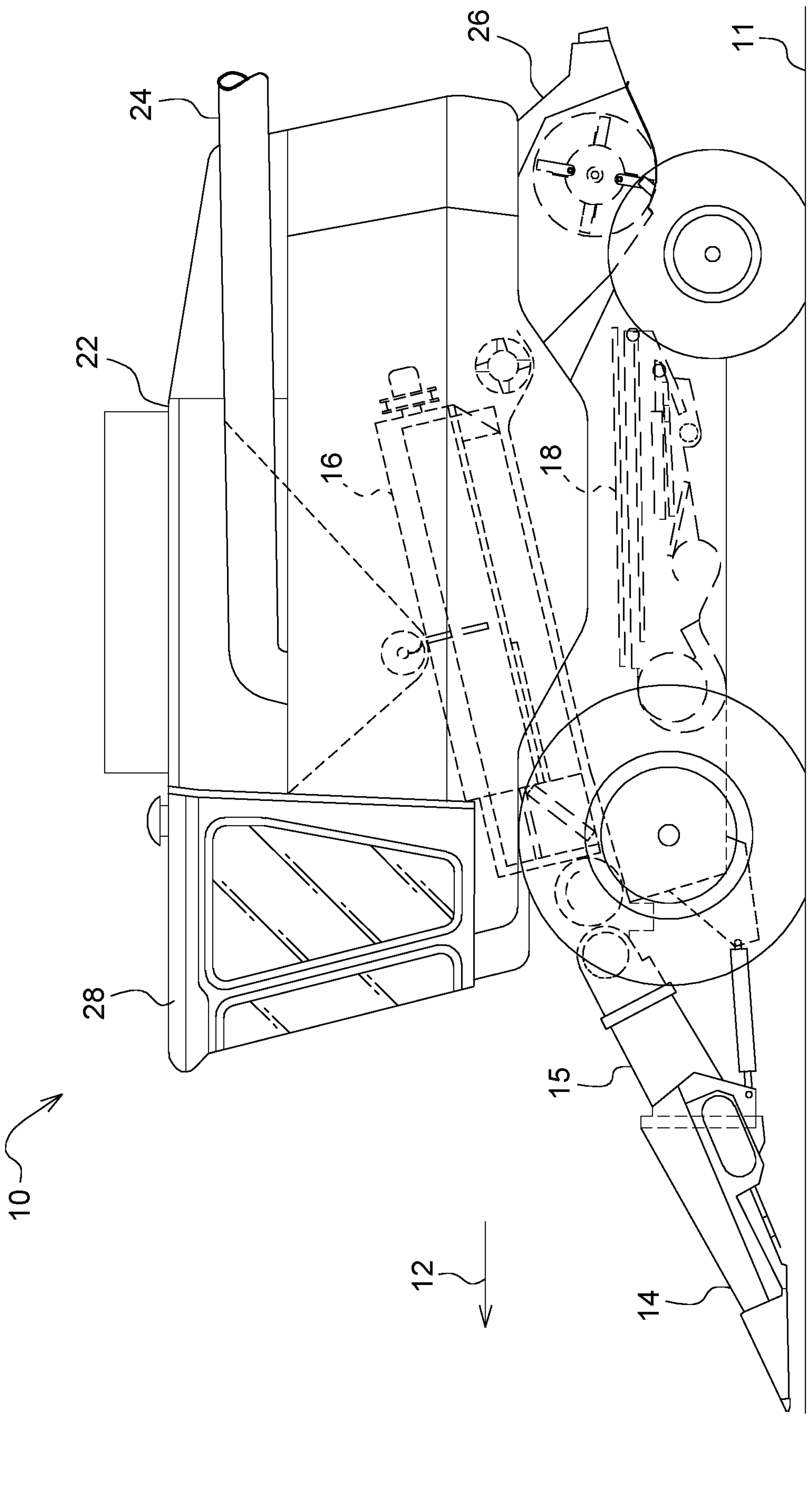
FIG. 1 is a diagrammatic side elevational view showing an agricultural harvester including a header to collect crop from a field and direct the collected crop to the body of the harvester for processing.

Referring to FIG. 1, an agricultural harvester 10 is configured to move on a field 11 in a forward direction 12 to harvest crop from the field 11. The harvester 10 may be configured in a wide variety of ways. For example, the harvester 10 may take the form of a combine harvester or other type of agricultural harvester that processes crop with stalks 13 (FIG. 3).

In the case of a combine harvester, the harvester 10 may include a header 14 to cut, gather, and transport crop rearwardly, a feederhouse 15 to advance crop received from the header 14 into the body of the harvester 10, a threshing and separating section 16 to thresh crop and further separate grain from crop residue, a cleaning section 18 including one or more chaffers and sieves to separate grain from chaff or other relatively small pieces of crop material, a clean grain elevator (not shown) to elevate clean grain to a storage bin 22, an unloader 24 to unload clean grain from the storage bin 22 to another location, and a residue system 26 to process and distribute crop residue back onto the field. A person can control the harvester 10 from an operator's station 28 of the harvester 10.

Figure 2:
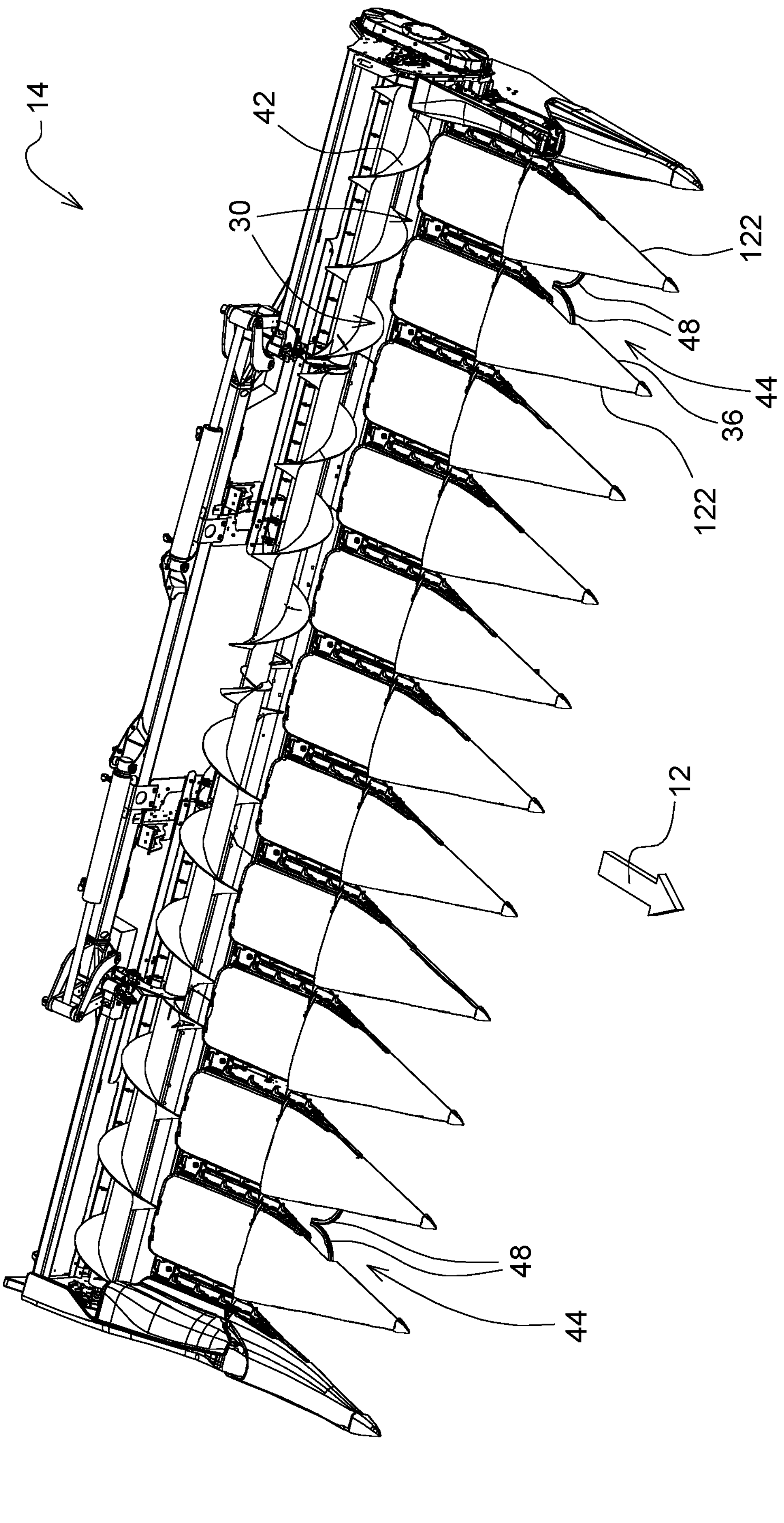
FIG. 2 is a perspective view showing a header including row units, with one or more of the row units including a stalk-diameter sensing system.
Figure 3:
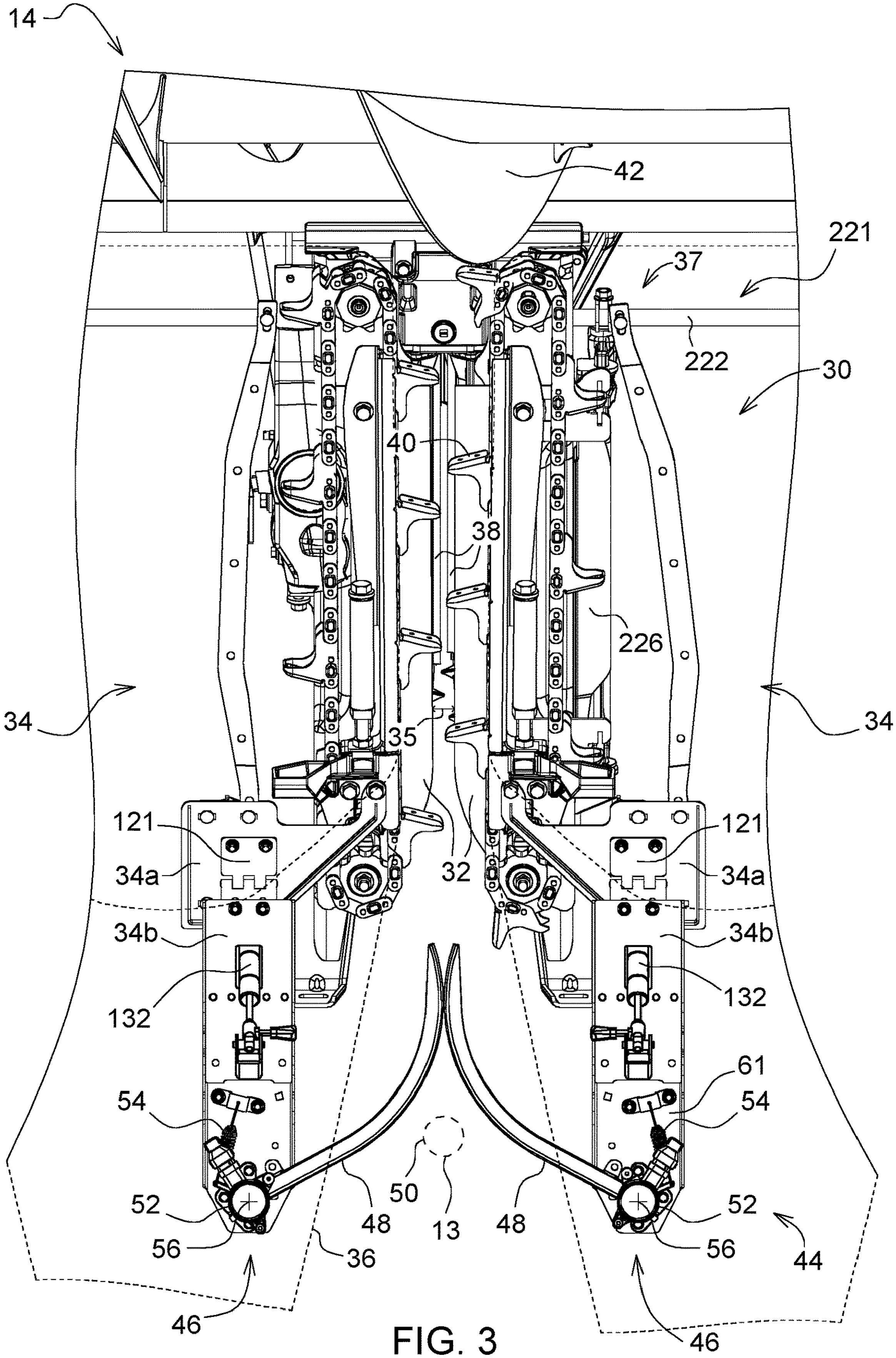
FIG. 3 is a top view showing a row unit including a stalk-diameter sensing system in front of a pair of deck plates.
Figure 4:
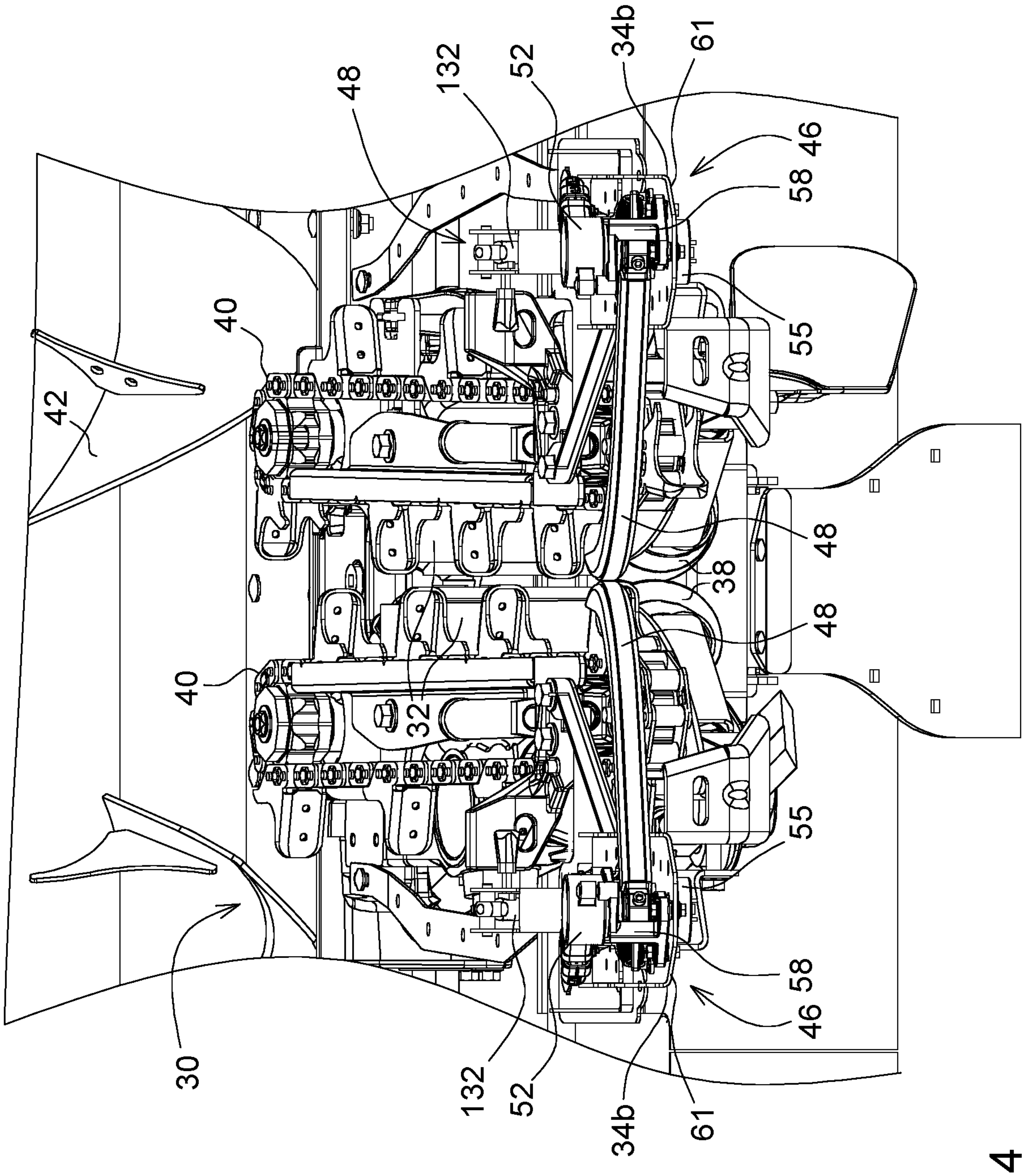
FIG. 4 is a front elevational view showing the row unit with the stalk-diameter sensing system, the stalk-diameter sensing system including two sensing units positioned on opposite sides of the row unit, each sensing unit including a rotary damper and a stalk feeler, the stalk feelers yieldably biased into confronting relation with one another.

Referring to FIGS. 2-4, the header 14 may include a plurality of row units 30, each row unit 30 for engagement with a respective row of crop. Illustratively, the header 14 may be configured, for example, as a cornhead. In such a case, each row unit 30 includes a pair of deck plates 32 mounted to a frame 34 of the row unit 30 and spaced apart to define a deck plate spacing 35 therebetween. The deck plate spacing 35 is within a larger stalk-receiving gap 36 defined by the row unit 30 for receiving successive stalks 13. A deck plate positioning system 37 of the header 14 is coupled to at least one of the deck plates 32 of each row unit 30 to adjust the deck plate spacing 35 of each row unit 30.

Each row unit 30 includes a pair of stalk rolls 38 and a pair of gathering chains 40. The stalk rolls 38 are positioned below the deck plates 32, counter-rotate to pull stalks 13 downwardly between the deck plates 32, and chop the stalks 13 into smaller pieces. Each gathering chain 40 is positioned on either side of the stalk-receiving gap 36 with a rearward run of the chain 40 positioned above a respective deck plate 32 to advance ears of corn removed from stalks 13 by the deck plates 32 rearwardly to an auger 42 behind the row units 30. The auger 42 advances the ears of corn laterally inwardly toward the feederhouse 15 for ingestion into the body of the harvester 10 and processing thereby. The stalk rolls 38 and gathering chains 40 are mounted to the frame 34. The auger 42 is mounted to the cornhead main frame.

One or more of the row units 30 may include a respective stalk-diameter sensing system 44 for sensing stalk diameter. Illustratively, the header 14 includes a sensing system 44 for a row unit 30 on a first side of the header 14 (left side relative to forward direction in FIG. 2) and a sensing system 44 for a row unit 30 on a second side of the header 14 (right side relative to forward direction in FIG. 2). It is to be appreciated that the sensing system(s) 44 may be positioned at any suitable lateral location along the header 14. Each sensing system 44 is positioned in front of the deck plates 32 and stalk rolls 38 of the respective row unit 30. The sensing system 44 is configured to sense diameter-related data of respective stalks 13 and generate signals based on the diameter-related data.

Referring to FIGS. 3-7, the sensing system 44 includes a first or left sensing unit 46 and a second or right sensing unit 46 (left and right relative to the forward direction 12). The first and second sensing units 46 are similar in structure and function to one another such that disclosure of one applies to the other. The sensing units 46 are arranged in mirrored relationship to one another.

The sensing system 44 includes a first stalk feeler 48 of the first sensing unit 46 and a second stalk feeler 48 of the second sensing unit 46. The first and second stalk feelers 48 are deflectably mounted on opposite sides of the stalk-receiving gap 36. The stalk-receiving gap 36 is located in front of the deck plates 32 relative to the forward direction 12 and receives successive stalks 13 planted in the field 11 when the harvester 10 moves in the forward direction 12. The first and second stalk feelers 48 are yieldably biased into the stalk-receiving gap 36 for deflection upon contact with the outer surface 50 of each stalk 13 as the harvester 10 travels on the field 11 in the forward direction 12. A first sensor 52 of the first sensing unit 46 is coupled to the first stalk feeler 48 to sense deflection of the first stalk feeler 48 and generate a corresponding first signal. A second sensor 52 of the second sensing unit 46 is coupled to the second stalk feeler 48 to sense deflection of the second stalk feeler 48 and a generate a corresponding second signal.

The sensing system 44 includes a first spring 54 of the first sensing unit 46 and a second spring 54 of the second sensing unit 46. The first spring 54 is coupled to the first stalk feeler 48 and the frame 34, and the second spring 54 is coupled to the second stalk feeler 48 and the frame 34. The springs 54 yieldably bias the stalk feelers 48 into the stalk-receiving gap 36 and into contact with one another in the absence of a stalk 13 therebetween. In the presence of a stalk 13, the springs 54 yieldably bias the stalk feelers 48 into contact with the outer surface 50 of the stalk 13. The springs 54 yield to contact with the stalk 13 to allow the stalk feelers 48 to pivot away from one another for the stalk 13 to pass between the stalk feelers 48. The first spring 54 urges the first stalk feeler 48 in a counter-clockwise direction about a first pivot axis 56, and the second spring 54 urges the second stalk feeler 48 in a clockwise direction about a second pivot axis 56. The springs 54 may be any suitable type of spring. The springs 54 are illustrated, for example, as extension springs. In other implementations, the springs 54 may be, for example, compression springs, as discussed herein. In yet other implementations, the springs 54 may be torsion springs, as also discussed herein.

The stalk feelers 48 are positioned for movement in a common plane. Each stalk feeler 48 has a range of motion that overlaps with the range of motion of the other stalk feeler 48 in order to contact and measure stalks that are offset from the center of the row unit 30. Although their ranges of motion overlap, the stalk feelers 48 do not overlap physically, because the stalk feelers 48 are biased into contact with one another in their closed or neutral position by the springs 54. This helps reduce angular displacement during operation and thus reduces impact energy against the stalks. In other implementations, the stalk feelers 48 may be positioned for movement in separate planes such that the stalk feelers 48 physically overlap in their neutral position.

The sensing system 44 includes a first damper 55 of the first sensing unit 46 and a second damper 55 of the second sensing unit 46. The first damper 55 is positioned to dampen deflection of the first stalk feeler 48, and the second damper 55 is positioned to dampen deflection of the second stalk feeler 48. The first damper 55 dampens clockwise deflection of the first stalk feeler 48, and the second damper 55 dampens counter-clockwise deflection of the second stalk feeler 48. As such, the dampers 55 absorb contact energy between the stalk feelers 48 and the stalk 13. Dampening of deflection of the stalk feelers 48 helps to maintain contact between the stalk feelers 48 and the stalk 13 when the stalk 13 passes between the stalk feelers 48 during diameter measurement of the stalk 13. Otherwise, initial contact between the stalk feelers 48 and the stalk 13 may sometimes tend to cause the stalk feelers 48 to break contact with the stalk 13 and thereby distort the readings of the sensors 52. A stalk feeler 48 that has broken contact with the stalk 13 may then slap the subsequent stalk 13, which may knock over that subsequent stalk 13, induce a whipping motion in that subsequent stalk 13 causing it to be off-center relative to the row unit 30 and feed improperly, and/or lead to inaccurate stalk-diameter readings.

Figure 7:
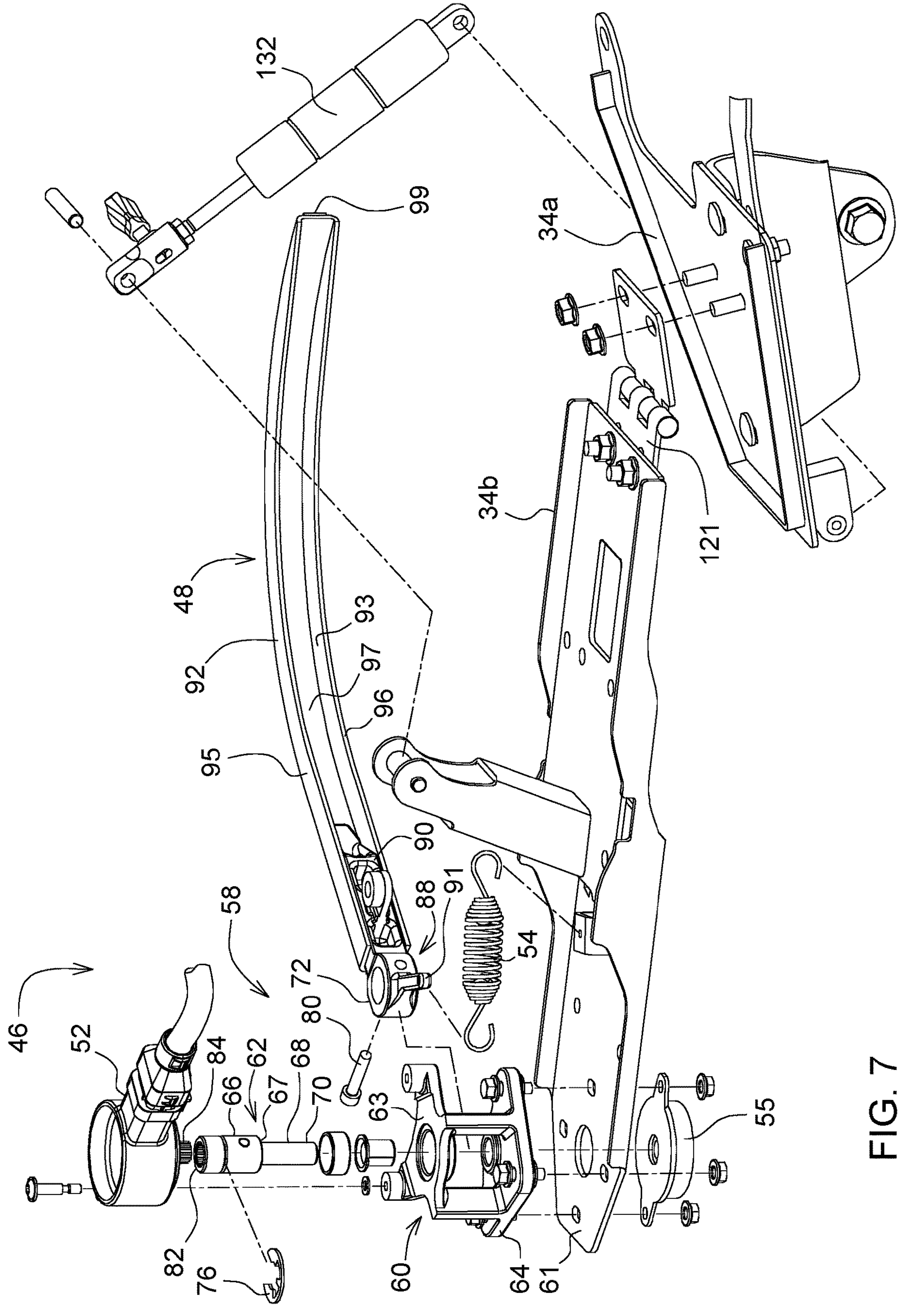
FIG. 7 is an exploded perspective view showing the sensing unit.
Figure 8:
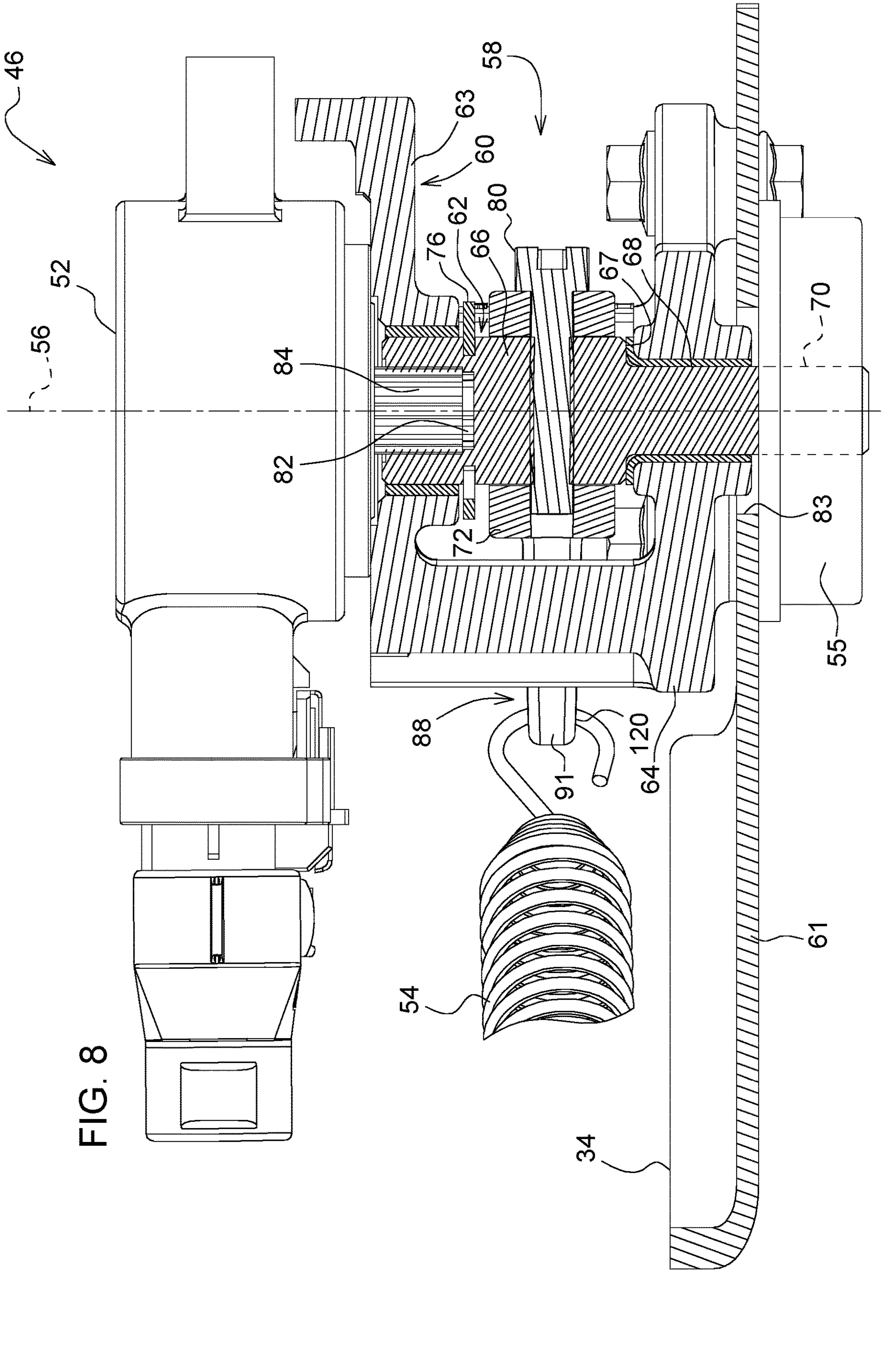
FIG. 8 is a sectional view, taken along lines 8-8 of FIG. 6, showing the sensing unit including a pivot joint defining a pivot axis about which the stalk feeler pivots, and the rotary damper underlying the pivot joint and receiving a lower portion of a pivot shaft of the pivot joint.

Referring to FIGS. 7 and 8, with respect to each sensing unit 46, the stalk feeler 48 is mounted to the frame 34 for pivotal movement about a pivot axis 56. The sensing unit 46 includes a pivot joint 58 defining the pivot axis 56 about which the stalk feeler 48 pivots (the pivot axis 56 and the pivot joint 58 may be referred to herein as a first pivot axis 56 and a first pivot joint 58 with respect to the first sensing unit 46 and a second pivot axis 56 and a second pivot joint 58 with respect to the second sensing unit 46).

The pivot joint 58 includes a housing 60 mounted to the frame 34 (e.g., with fasteners). The frame 34 includes a frame member 61 to which the pivot joint 58 is mounted.

The sensor 52 is mounted to the housing 60 of the pivot joint 58. For example, the sensor housing of the sensor 52 is mounted atop the joint housing 60 (e.g., with fasteners). The sensor 52 may be configured, for example, as a rotary sensor, such as, for example, a high frequency (e.g., 1113 Hz) rotary sensor utilizing, for example, non-contact Hall-effect technology. The sensor 52 may be configured, for example, as a pulse-width-modulation sensor to enable a relatively high sample rate for relatively high ground speeds and to achieve relatively high accuracy for stalk measurements.

The pivot joint 58 includes a pivot shaft 62. The pivot shaft 62 is mounted to the housing 60 of the pivot joint 58 and defines the pivot axis 56. The pivot shaft 62 extends between an upper wall 63 of the housing 60 and a lower wall 64 of the housing 60 to pivot about the pivot axis 56. The stalk feeler 48 is coupled to the pivot shaft 62 to pivot about the pivot axis 56.

Illustratively, each damper 55 is configured as a rotary damper. The housing 60 of the pivot joint 58 and the damper 55 are mounted on opposite sides of the frame member 61, with the housing 60 above the frame member 61 and the damper 55 below the frame member 61. A number of fasteners (e.g., four) fasten the housing 60 and the damper 55 to the frame member 61.

The damper 55 is coupled to the pivot shaft 62 of the pivot joint 58. The pivot shaft 62 includes a cylindrical first portion 66, a cylindrical second portion 68, and a cylindrical third portion 70. The second portion 68 is positioned axially between the first portion 66 and the third portion 70 relative to the pivot axis 56.

Figure 16:
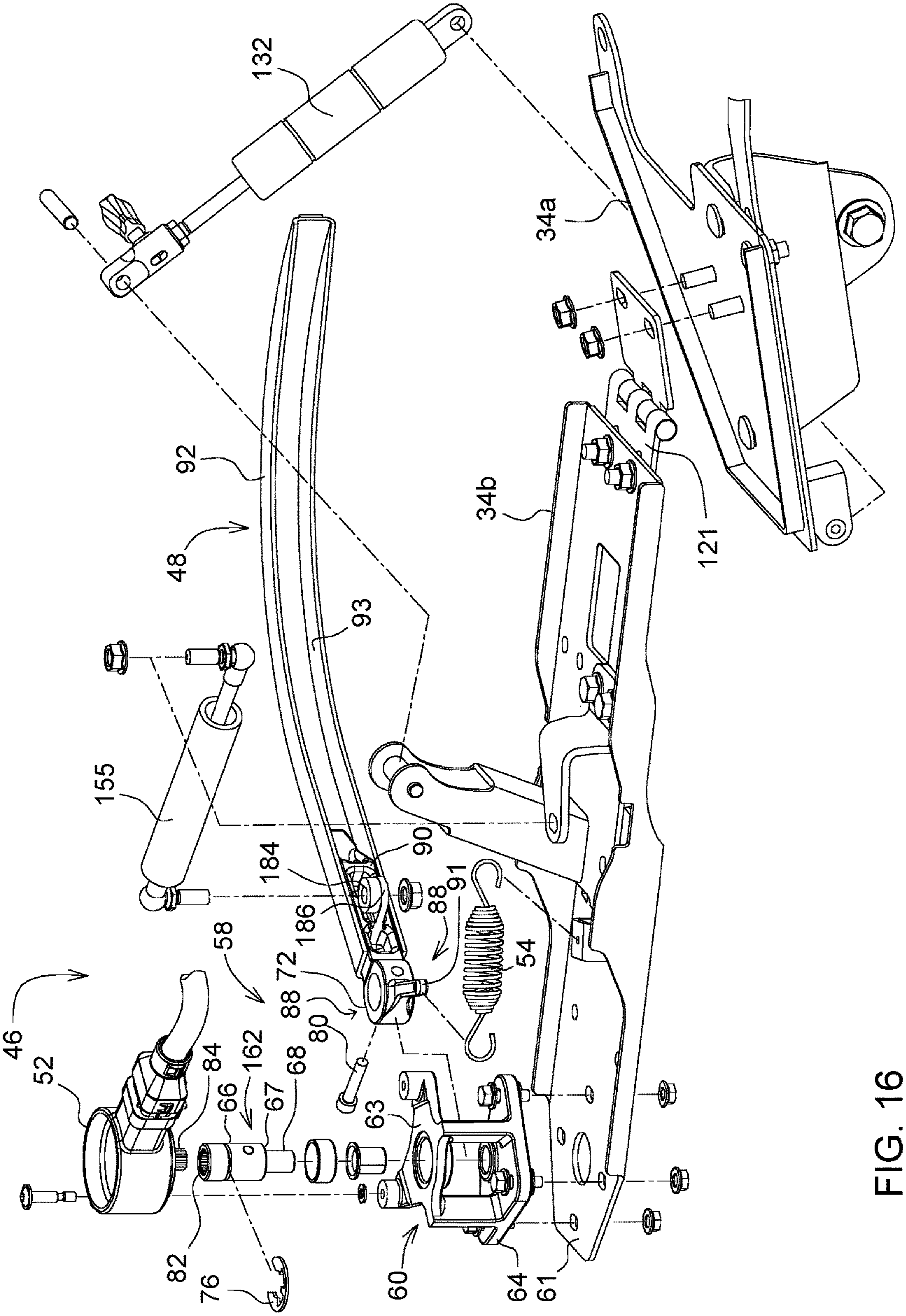
FIG. 16 is an exploded perspective view showing the sensing unit with the linear damper.
Figure 17:
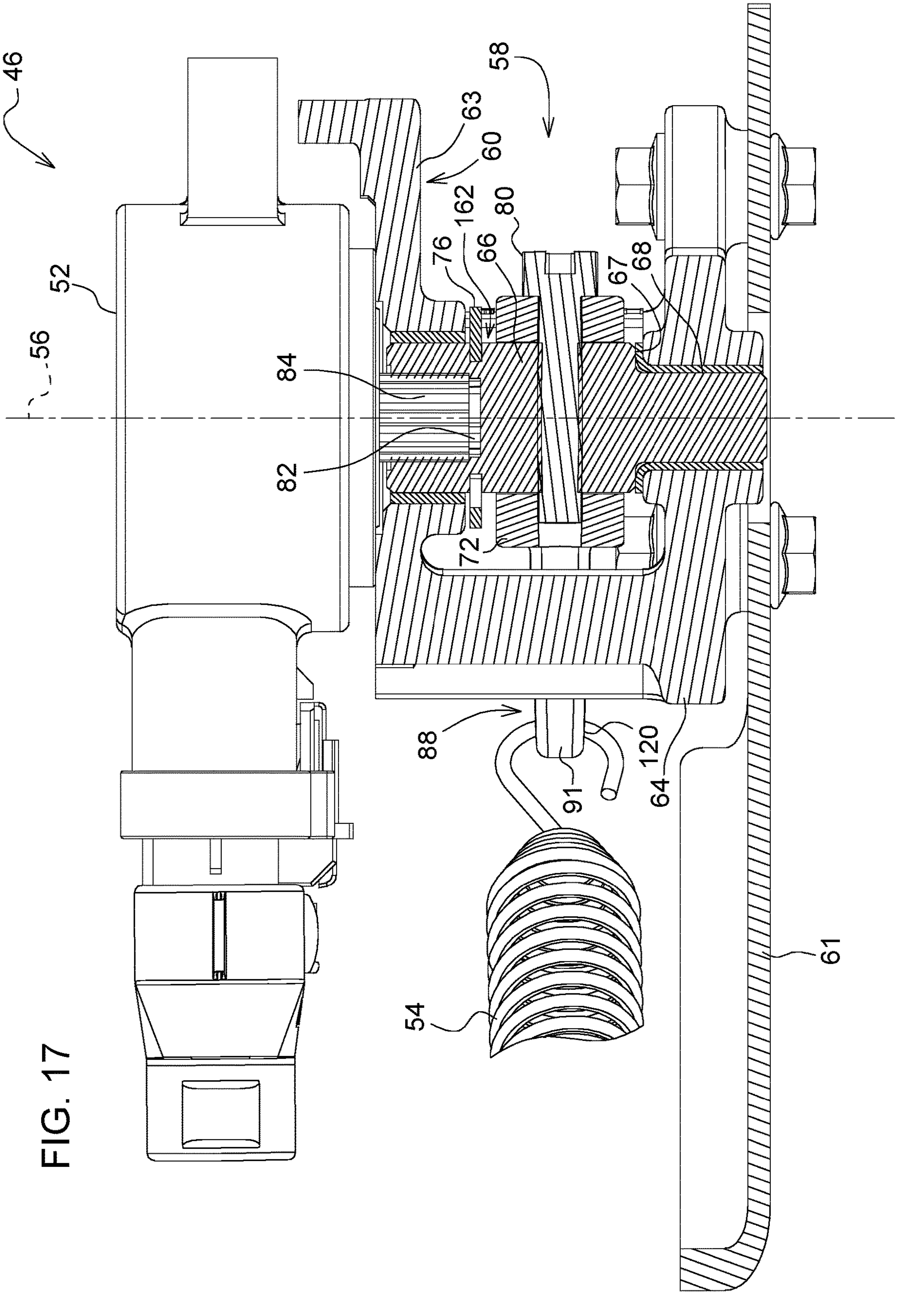
FIG. 17 is a sectional view, taken along lines 16-16 of FIG. 15.

The first portion 66 is rotatably positioned in a liner inserted into an aperture of the upper wall 63 (generic hatching is used for liner in FIGS. 7 and 16). A retaining clip 76 is positioned in a groove formed in the first portion 66, to limit insertion of the first portion 66 into the liner. A blind bore 82 of the first portion 66 receives and mates with a rotatable pin 84 of the sensor 52, such that rotation of the pivot shaft 62 about the pivot axis 56 causes corresponding rotation of the sensor pin 84 about the pivot axis 56. For example, each of the bore 82 and the pin 84 is splined such that the bore 82 and the pin 84 are coupled to one another by a splined connection. The pivot shaft 62 and the sensor pin 84 may be coupled to one another in any other suitable manner. For example, in some implementations, the pivot shaft 62 and sensor pin 84 may be coupled to one another with a set screw. In other implementations, the bore 82 and the pin 84 may have mating flats (e.g., the bore 82 and pin 84 may have D-profiles with their flats positioned in face-to-face relation).

The stalk feeler 48 includes a collar 72 through which the pivot shaft 62 extends. The collar 72 surrounds the pivot shaft 62 and is positioned axially between the sensor 52 and the damper 55 relative to the pivot axis 56. The collar 72 mates with the first portion 66 of the pivot shaft 62. The collar 72 and the first portion 66 include mating cylindrical surfaces. A cross bolt 80 extends radially from one side of the collar 72 through a bore of the first portion 66 of the pivot shaft 62 into the opposite side of the collar 72, with the cross bolt 80 threaded to the bore of the first portion 66, such that pivotal movement of the stalk feeler 48 about the pivot axis 56 causes corresponding rotation of the pivot shaft 62 about the pivot axis 56.

The second portion 68 is rotatably positioned in a liner inserted into an aperture of the lower wall 64 (generic hatching is used for liner in FIGS. 7 and 16). A shoulder 67 is formed between the first portion 66 and the second portion 68 and may rotate on an outwardly flared lip of the liner.

The third portion 70 is coupled to the damper 55. The third portion 70 extends below the lower wall 64 through an aperture 83 in the frame member 61 into the damper 55, such that the damper 55 dampens rotation of the pivot shaft 62.

A washer and bolt may be mounted to the third portion 70 to help keep internal components of the rotary damper 55 in place.

The rotary damper 55 is configured, for example, as a unidirectional rotary damper with one direction of dampening to dampen opening of the stalk feeler 48 to dissipate impact energy due to engagement with a stalk. The damper 55 does not dampen closing of the stalk feeler 48 to allow the stalk feeler 48 to return to its neutral position in contact with the other stalk feeler 48 prior to impact with the next stalk. In some implementations, the rotary damper 55 has vanes that grip the third portion 70 to dampen rotation of the pivot shaft 62 when the stalk feeler 48 opens and releases the third portion 70 when the stalk feeler 48 closes. A washer and bolt may be mounted to the third portion 70 to help keep internal components of the rotary damper 55 in place.

Referring to FIGS. 7 and 8, the stalk feeler 48 includes a pivot body 88. The pivot axis 56 extends through the pivot body 88. The pivot body 88 includes the collar 72, a first arm 90, and a second arm 91. The first and second arms 90, 91 project outwardly from the collar 72. The pivot body 88 is configured, for example, as a single-piece construction, although in other implementations it may be constructed of multiple pieces.

Figure 9:
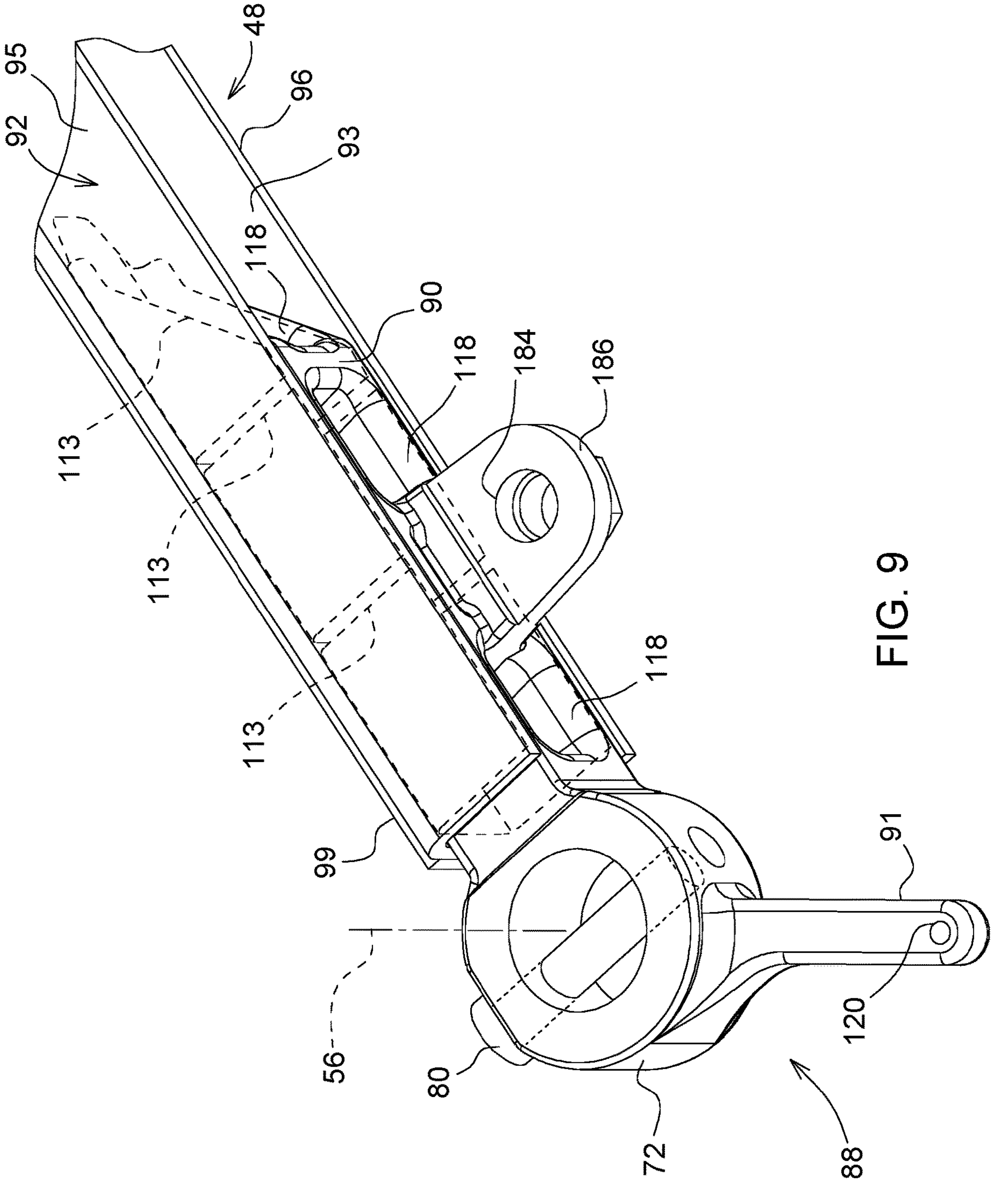
FIG. 9 is a perspective view showing attachment of the stalk feeler to a pivot body of the pivot joint.
Figure 10:
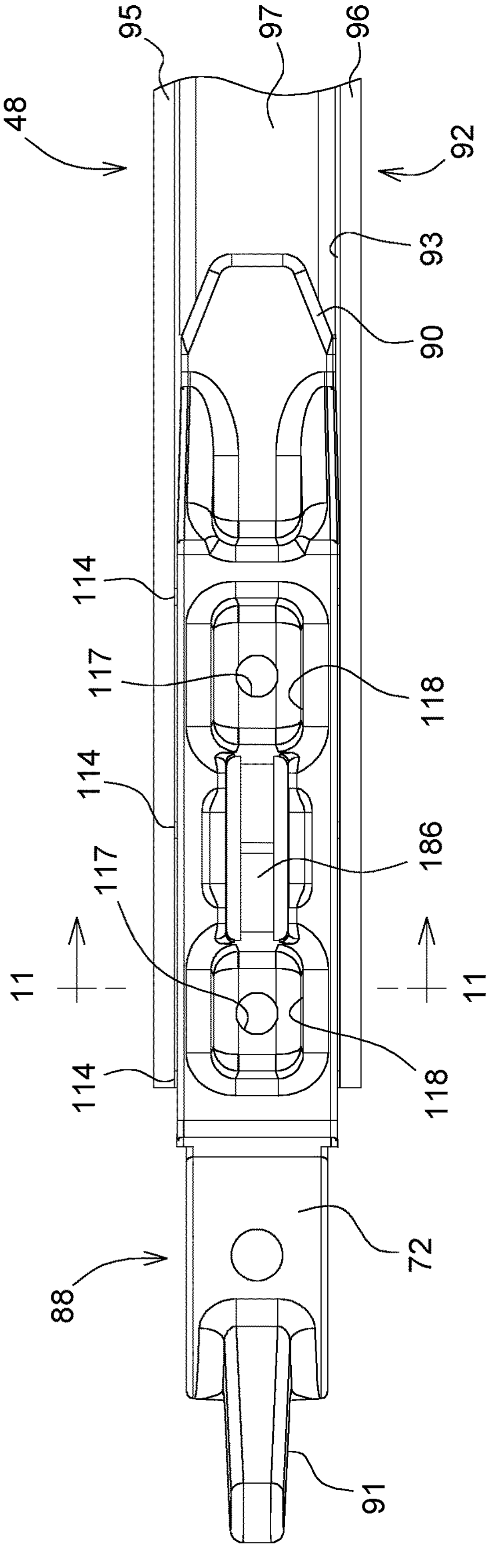
FIG. 10 is an elevational view showing attachment of the stalk feeler to the pivot body.
Figure 11:
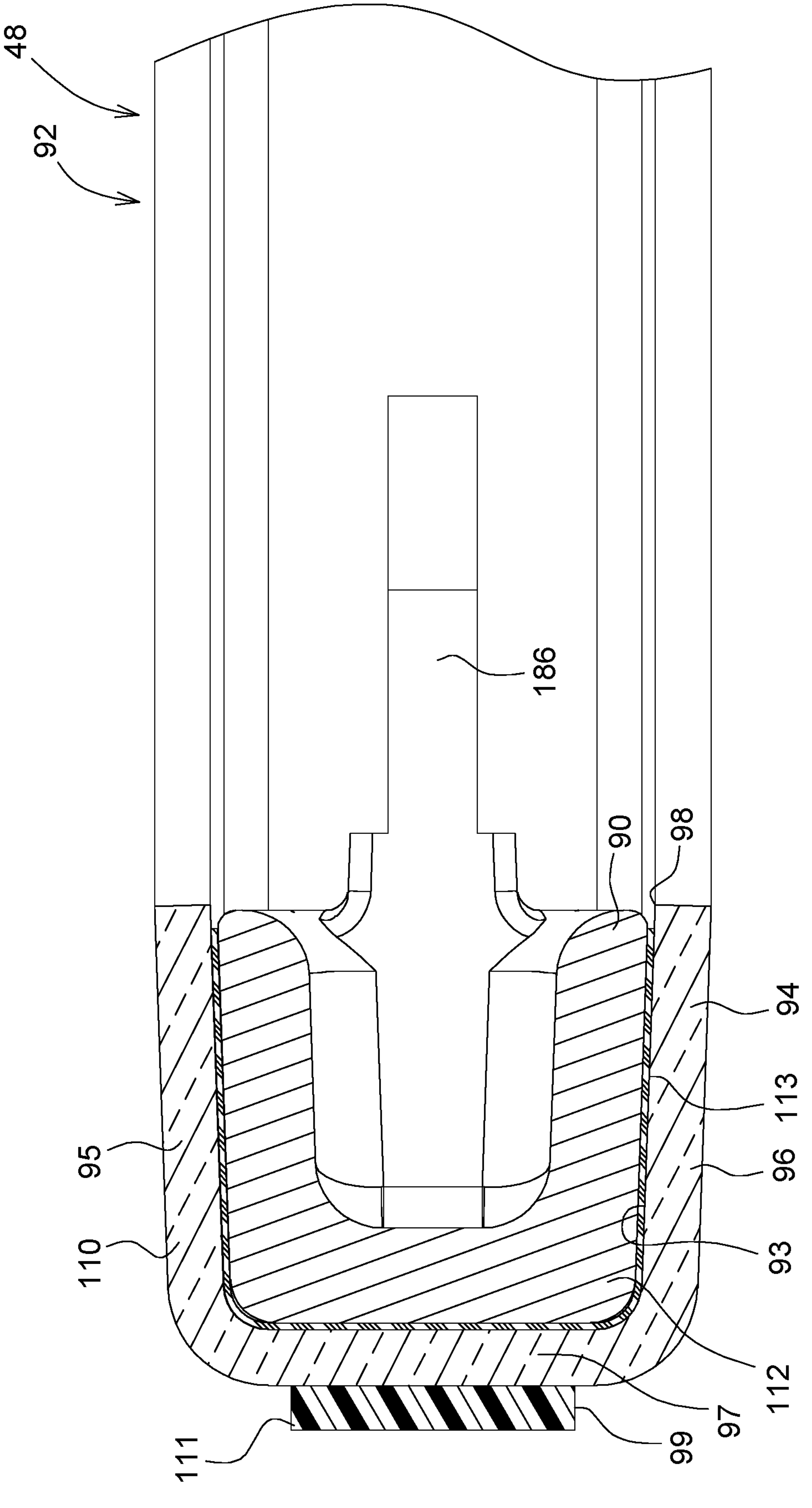
FIG. 11 is a sectional view, taken along lines 11-11 of FIG. 10.

Referring to FIGS. 9-11, the stalk feeler 48 includes a bar 92. The bar 92 is mounted to and projects from the pivot body 88. The bar 92 is coupled to the first arm 90 so as to be mounted thereto and extends into the stalk-receiving gap 36. The bar 92 is curved such that the stalk feeler 48 is configured, for example, as a cane, although the stalk feeler 48 may be configured in other suitable ways for stalk engagement. The bar 92 is to resist torsional deflection, and may include design features for adding torsional stiffness to the bar 92.

The bar 92 includes a cavity 93 into which the first arm 90 is nested. The bar 92 includes a C-shaped cross-section 94 defining the cavity 93. The bar 92 includes an upper wall 95, a lower wall 96, and a stalk-side wall 97, which cooperate to provide the C-shaped cross section 94. The upper and lower walls 95, 96 are spaced apart from one another to define an opening 98 that is opposite to the stalk-side wall 97 and opens into the cavity 93. In other implementations, the cross-section of the bar 92 may be I-shaped or T-shaped. The cross-section may be tubular (e.g., round, square, or rectangular, to name just a few), or otherwise a closed section.

The stalk feeler 48 may include a strip 99 for contacting each stalk 13. The strip 99 extends lengthwise of the bar 92 and is mounted or otherwise joined to the stalk-side wall 97 so as to be positioned thereon to contact the outer surface 50 of the stalk 13.

The stalk feeler 48 may include multiple materials. For example, the stalk feeler 48 includes in the stalk-receiving gap 36 a first material 110 and a second material 111 different from the first material 110. The bar 92 is made, for example, of the first material 110. The first material 110 has a relatively high strength-to-weight ratio with strength and stiffness to handle the loads on the stalk feeler 48, and has a reduced rotational inertia and relatively low density. The first material 110 is, for example, carbon fiber. The carbon fiber material may take the form of, for example, a unidirectional carbon fiber tape, a carbon fiber twill mat, a discontinuous carbon fiber compound, or other carbon fiber forms. In one example, the bar 92 is made of carbon-fiber reinforced thermoplastic. The bar 92 may be manufactured, for example, by injection molding, bladder molding, compression molding, thermoplastic forming, or a thermoset forming process.

The strip 99 is made, for example, of the second material 111. The second material 111 is a wear-resistant material since it contacts stalks 13. Such material, with high wear properties, may be configured in a wide variety of ways. In some implementations, the second material 111 includes a plastic material. The second material 111 is, for example, ultra-high-molecular-weight polyethylene (UHMW). In other implementations, the second material 111 is, for example, a nylon (e.g., nylon 6), which may be overmolded onto the bar 92 (e.g., heated and pressurized to overmold to carbon fiber material of bar 92). The nylon may be a carbon fiber-reinforced nylon (e.g., carbon fiber-reinforced nylon 6). In other implementations, the second material 111 is, for example, a metal (e.g., steel). In yet other implementations, the second material 111 is, for example, a hard surface coating applied to the bar 92 (e.g., via a thermal spray, such as, for example, a metallic thermal spray, a ceramic thermal spray, a combined metallic and ceramic thermal spray, or other suitable thermal spray or application method). The hard surface coating may be, for example, gray alumina, chromium carbide, or other suitable surface coating. The hard surface coating may be inclusive of various types of wear coatings such as the thermal spray process or laser clad process. There are multiple thermal/metal spray processes including flame spray, powder spray, arc spray, plasma spray, and high velocity oxy-fuel spray. Moreover, thermal spray can utilize many different materials such as steel, stainless steel, aluminum alloy, nickel alloy, copper, bronze, molybdenum, ceramic, tungsten carbide, etc. In still yet other implementations, the second material 111 is, for example, a composite material (e.g., unidirectional carbon fiber, unidirectional Kevlar®).

In some implementations, the pivot body 88 is made, for example, of a third material 112 different from the first material 110 and the second material 111. The third material 112 is, for example, aluminum. The pivot body 88 is configured, for example, as an aluminum casting. In other implementations, the pivot body 88 may be configured, for example, as a ductile iron casting or an investment steel casting, or may be made from carbon fiber-reinforced nylon 6 or other composites.

The bar 92 is coupled to the first arm 90. The bar 92 and the first arm 90 may be so coupled in a variety of ways. Illustratively, the bar 92 is coupled to the first arm 90 with adhesive material 113 establishing an adhesive bond between the bar 92 and the first arm 90. The adhesive material 113 may be, for example, a structural adhesive such as, for example, structural two-component epoxy adhesive having epoxy and glass beads embedded therein.

The first arm 90 includes stand-offs 114 spaced apart along the length of the first arm 90 to create gaps between the first arm 90 and the bar 92 in which the adhesive material 113 is positioned. Each stand-off 114 is configured, for example, as a generally C-shaped ridge extending about peripheral portions of the first arm 90 corresponding to the walls 95, 96, 97 so as to contact those walls 95, 96, 97. The adhesive material 113 is positioned on machined surfaces of the first arm 90 corresponding to the walls 95, 96, 97 of the bar 92.

In other implementations, the bar 92 may be overmolded onto the pivot body 90. For example, the bar 92, made, for example, of carbon fiber, may be overmolded onto the arm 90 of the pivot body 88 made, for example, of an aluminum casting. In yet other implementations, the bar 92 and the pivot body 88 may be integrated into a single piece. For example, the bar 92 and the pivot body 88 may be made, for example, of a composite material, nylon 6, or carbon fiber-reinforced nylon 6 (e.g., by injection molding), to name but a few options. In such non-adhesive constructions, the stand-offs 114 may be omitted.

The strip 99 is coupled to the bar 92. The strip 99 is coupled to the stalk-side wall 97 of the bar 92 with adhesive material (not shown). For example, a steel or UHMW strip may be coupled to the bar 92 with adhesive material. In other implementations, the strip 99 is overmolded onto the bar 92 (e.g., nylon 6 of strip 99 molded to carbon fiber of bar 92). Both the strip 99 and the bar 92 may be made of composite materials (e.g., carbon fiber-reinforced nylon 6 of strip 99 molded to carbon fiber of bar 92), with the strip 99 made of a composite material having higher wear resistance than the composite material of the bar 92. In yet other implementations, the strip 99 is a hard surface coating applied to the stalk-side wall 97 of the bar 92. The coating may be applied by thermal spray (e.g., a metallic thermal spray, a ceramic thermal spray, or a combined metallic and ceramic thermal spray) or other suitable application method. In yet other implementations, the strip 99 is fastened to the stalk-side wall 97 (e.g., riveted, bolted, or screwed).

In other implementations, a worn strip 99 can be replaced with a fresh strip 99. For example, the bar 92 and the strip 99 may be fastened to the first arm 90 with one or more fasteners (not shown) in place of or in addition to the adhesive material 113 for the bar 92 and the adhesive material for the strip 99. For example, there may be two such fasteners, each of which extends through a respective aperture (not shown) formed in the strip 99, a respective aperture (not shown) formed in the stalk-side wall 97, and a respective aperture 117 formed in the first arm 90 into respective weight-reducing cavities 118 formed in the first arm 90 to fasten the bar 92 and the strip 99 to the first arm 90. In another example, fasteners may be used to fasten only the strip 99 to the bar 92, in which case each fastener extends through a respective aperture formed in the strip 99 and a respective aperture formed in the stalk-side wall 97. In such implementations, a worn strip 99 can be replaced with a fresh strip 99 upon removal and reinstallation of the fasteners.

In some implementations, the stalk feeler 48 is formed of at least three different materials as described above. In other implementations, the stalk feeler 48 is formed of at least two materials. For example, the pivot body 88 and bar 92 are formed of the different materials. In this example, there may not be a strip 99. In other examples, the pivot body 88 and bar 92 are formed of the same material, but the strip 99 is formed of a different material. In one example, the pivot body 88 and bar 92 may be formed from carbon fiber reinforced thermoplastic, and the strip 99 is formed for plastic (UHMW), metal (steel), or a hard surface coating (e.g., thermal spray).

Referring back to FIGS. 6-7, the spring 54 is coupled to the pivot body 88. The spring 54 is coupled to the second arm 91 of the pivot body 88. The spring 54 is coupled at a first end of the spring 54 to the second arm 91 via a spring attachment point 120 of the pivot body 88 and at a second end of the spring 54 to the frame 34. The spring 54 is configured, for example, as an extension spring. In other implementations, the spring 54 may be configured, for example, as a compression spring, in which case the spring 54 may be coupled to the first arm 90, and the second arm 91 may be omitted from the pivot body 88. In yet other implementations, the spring 54 may be configured, for example, as a torsion spring, in which case the pivot body 88 may have the first arm 90 for attachment of the bar 92 thereto but may omit the second arm 91, or the pivot body 88 may omit both arms 90, 91 (both arms 90, 91 may omitted if, for example, the bar 92 and pivot body 88 are constructed of a single piece).

The frame 34 includes a sub-frame with a rear sub-frame section 34*a* and a front sub-frame section 34*b* coupled to the rear sub-frame section 34*a* for pivotable movement relative thereto. The front sub-frame section 34*b* is, for example, coupled to the rear sub-frame section 34*a* with a hinge 121. The sensor 52, the pivot joint 58 and its housing 60, the spring 54, and the damper 55 are mounted to the front sub-frame section 34*b*. The frame member 61 is included in the front sub-frame section 34*b*, with the housing 60 and the damper 55 fastened thereto.

Figure 6:
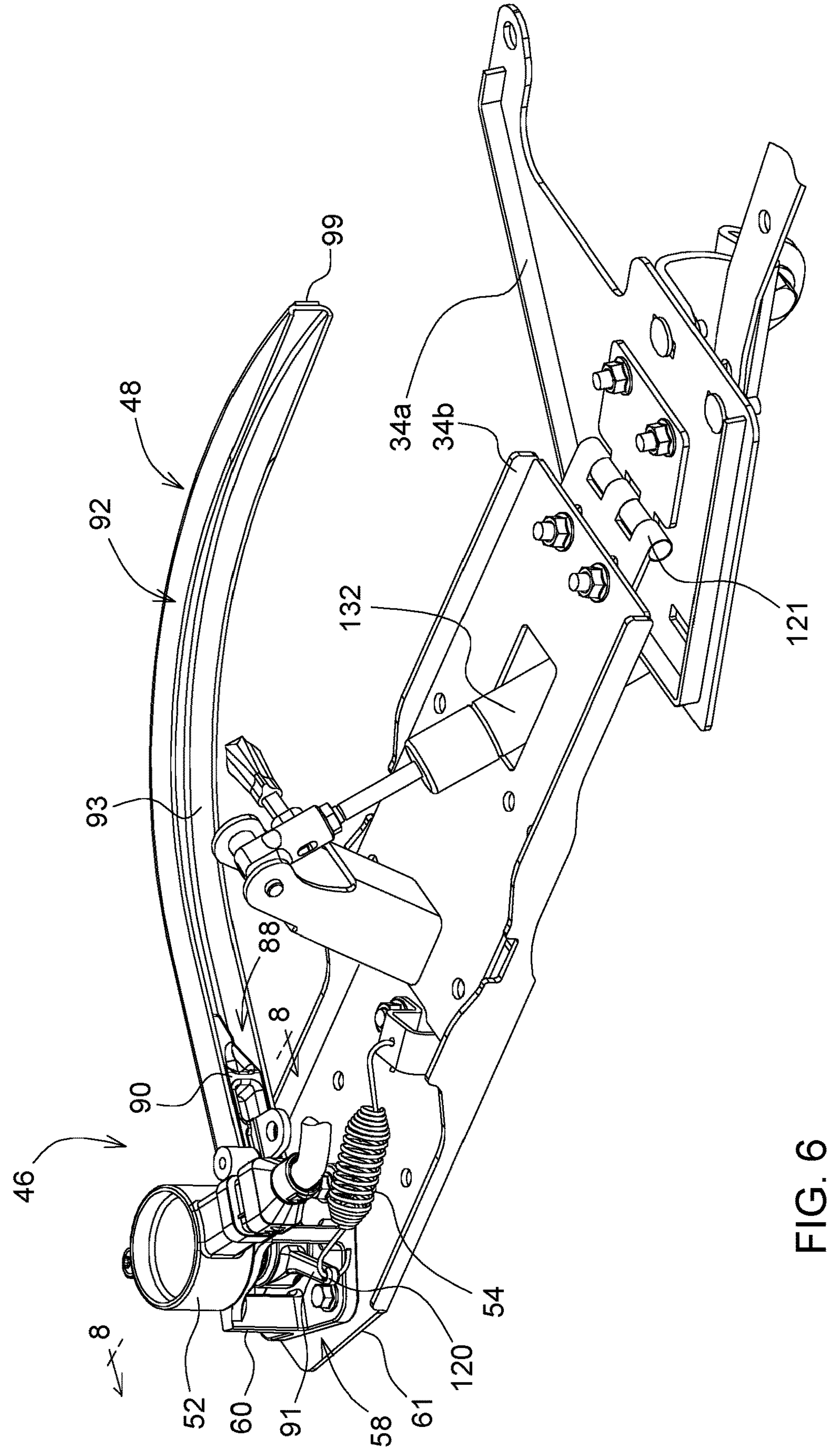
FIG. 6 is a perspective view showing one of two sensing units of the stalk-diameter sensing system.
Figure 12:
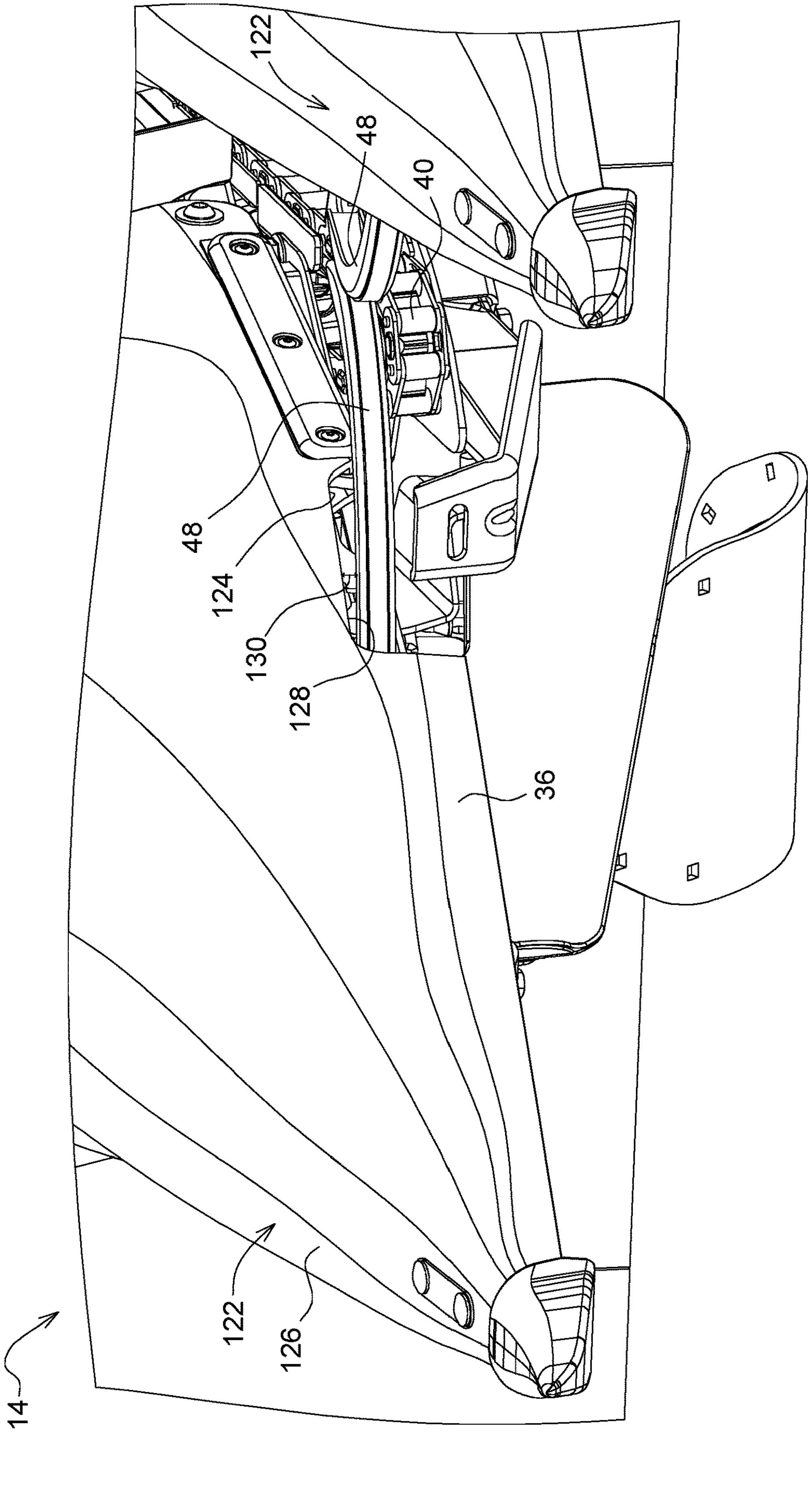
FIG. 12 is a perspective view showing projection of a stalk feeler through a side recess formed in the housing of a centering point assembly of the header.
Figure 13:
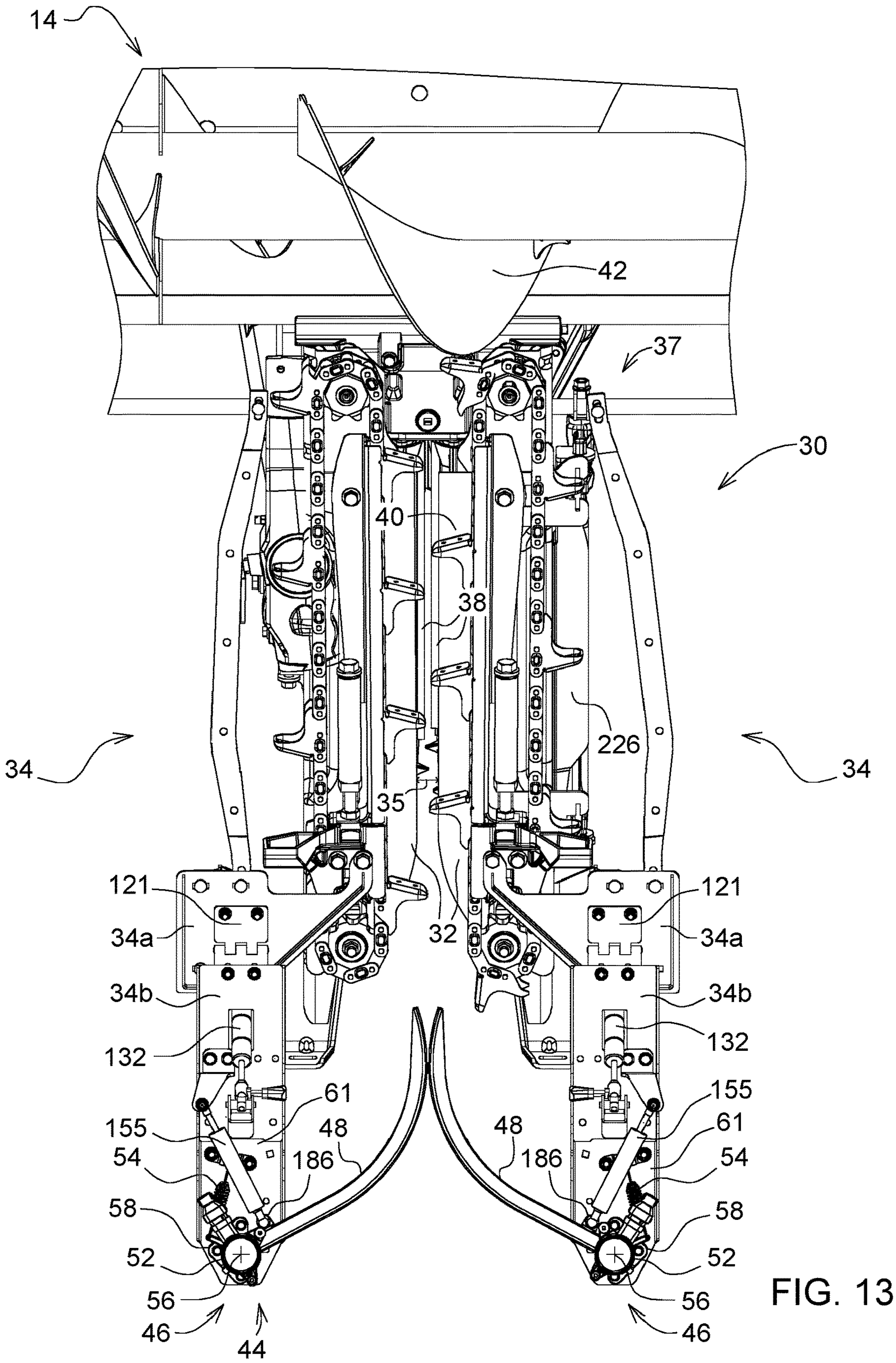
FIG. 13 is a top view showing the row unit with the stalk-diameter sensing system in which each sensing unit includes a linear damper in place of the rotary damper.

Referring to FIGS. 6, 7, and 12, the header 14 includes a plurality of center point assemblies 122. Each center point assembly 122 is coupled to row unit frame 34 for pivotable movement about a lateral pivot axis to adjust the front portion of the center point assembly manually up or down.

Two of the center point assemblies 122 flank the stalk-receiving gap 36. Each such center point assembly 122 covers a respective sensing unit 46. The center point assembly 122 includes a housing 126 that covers the sensor 52, the pivot joint 58, the spring 54, and the damper 55. The stalk feeler 48 extends from the pivot joint 58 through a side recess 124 of the housing 126 into the stalk-receiving gap 36. As such, the stalk feeler 48 is positioned in the side recess 124 with the stalk feeler 48 and a top edge 128 of the side recess 124 defining a gap 130 therebetween.

It is desirable to minimize the size of the gap 130 in order to minimize ingress of debris into the gap 130 that might otherwise hinder motion of the stalk feeler 48 and distort readings of the sensor 52. The pitch of the front sub-frame section 34*b* can be manually pivotably adjusted up and down via the hinge 121 to coordinate the position of the stalk feeler 48 with the pitch of the center point assembly 122 to minimize the size of the gap 130.

A lock 132 locks the front sub-frame section 34*b* into position relative to the rear sub-frame section 34*a*. The lock 132 is configured, for example, as a locking gas (or oil) spring coupled to the rear sub-frame section 34*a* at a first end and to a front sub-frame section 34*b* at a second end opposite to the first end. The second end of the lock 132 is coupled, for example, to a stanchion of the front sub-frame section 34*b* mounted to the frame member 61.

Referring to FIGS. 13-17, in some implementations, the sensing unit 46 includes a linear damper 155 in place of the rotary damper 55. In such a case, the damper 155 is coupled to the frame 34 and to the stalk feeler 48. The damper 155 is configured, for example, as a unidirectional linear compression damper with one direction of dampening to dampen opening of the stalk feeler 48 to dissipate impact energy due to engagement with a stalk. The damper 155 does not dampen closing of the stalk feeler 48 to allow the stalk feeler 48 to return to its neutral position in contact with the other stalk feeler 48 prior to impact with the next stalk. The linear damper 155 may be any suitable linear damper (e.g., oil-filled damper which is orientation-independent allowing it to be mounted in any direction).

The damper 155 is coupled to a pivot shaft 162, which replaces the pivot shaft 62 in the pivot joint 58. The pivot shaft 162 is similar in structure and function to the pivot shaft 62 except that the pivot shaft 162 lacks the third portion 70, since the damper 155 is a linear damper instead of a rotary damper.

The damper 155 is coupled to the stalk feeler 48 via a damper attachment point 184. The damper 155 is coupled to the pivot body 88 of the stalk feeler 48 via the damper attachment point 184. The damper 155 is coupled to the first arm 90 of the pivot body 88 via the damper attachment point 184. The pivot body 88 includes a lug 186. The lug 186 projects from, and transversely relative to, the first arm 90 away from the cavity 93 of the bar 92. The damper attachment point 184 is included in the lug 186 such that the damper 155 is coupled to the lug 186.

The damper attachment point 184 and spring attachment point 120 of the first sensing unit 46 are positioned on laterally opposite sides of the pivot axis 56 of the first sensing unit 46 relative to the forward direction 12, and the damper attachment point 184 and spring attachment point 120 of the second sensing unit 46 are positioned on laterally opposite sides of the pivot axis 56 of the second sensing unit 46 relative to the forward direction 12. The damper attachment points 184 of the first and second sensing units 46 are positioned laterally between the pivot axes of the first and second sensing units 46 relative to the forward direction 12. This is the case where the dampers 155 are linear compression dampers, and the springs 54 are extension springs.

In some implementations, each damper 155 may be configured as a unidirectional linear extension damper coupled to the second arm 91, and each spring 54 may be configured as a compression spring coupled to the first arm 90. In such a case, the points 184 are spring attachment points, and the points 120 are damper attachment points, with the spring attachment points of the first and second sensing units 46 positioned laterally between the pivot axes of the first and second sensing units 46 relative to the forward direction 12. In yet other implementations, each spring 54 may be configured as a torsion spring. In such a case, the linear damper 155 may be configured, for example, as either a linear extension damper or a linear compression damper. The pivot body 88 may have one arm 90 (e.g., with a linear compression damper) or two arms 90, 91 (e.g., with a linear extension damper).

In yet other implementations, both the spring 54 and the damper 155 may be coupled to the first arm 90, with the second arm 91 omitted from the pivot body 88. In such a case, the spring 54 may be a compression spring, and the damper 155 may be a linear compression damper. The spring 54 may be coupled to the arm 90 via the spring attachment point 120, and the damper 155 may be coupled to the arm 90 via the damper attachment point 184. The spring attachment point 120 and the damper attachment point 184 may be included in separate lugs projecting from the arm 90, or may be integrated into a common lug or other structure coupled to the arm 90. As such, the damper attachment point 184 and spring attachment point 120 of the first sensing unit 46 may be positioned on the same lateral side of the pivot axis 56 of the first sensing unit 46 relative to the forward direction 12, and the damper attachment point 184 and spring attachment point 120 of the second sensing unit 46 may be positioned on the same lateral side of the pivot axis 56 of the second sensing unit 46 relative to the forward direction 12.

Figure 5:
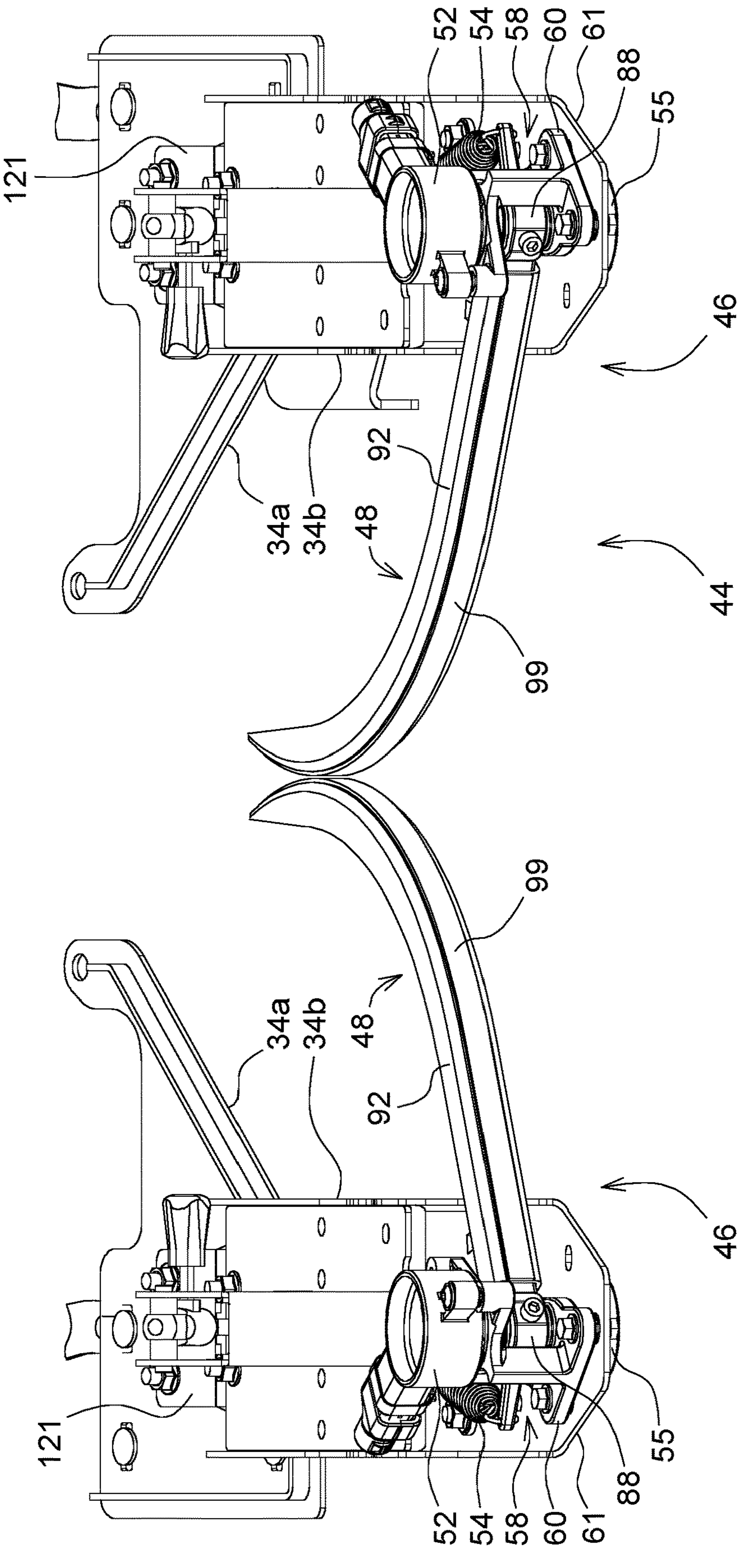
FIG. 5 is a perspective view showing the stalk-diameter sensing system with its two sensing units.
Figure 14:
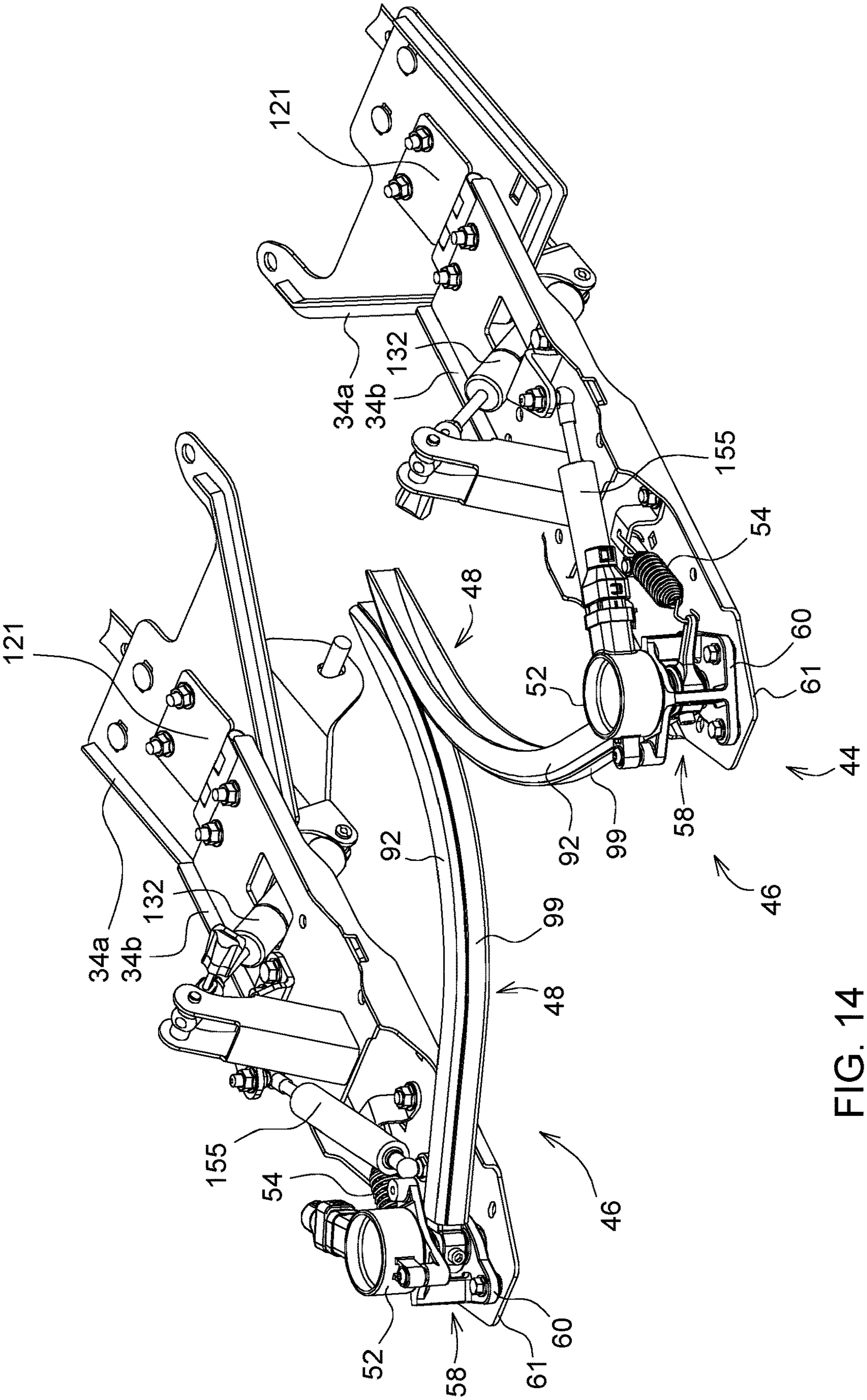
FIG. 14 is a perspective view showing the stalk-diameter sensing system in which each sensing unit includes a linear damper.
Figure 15:
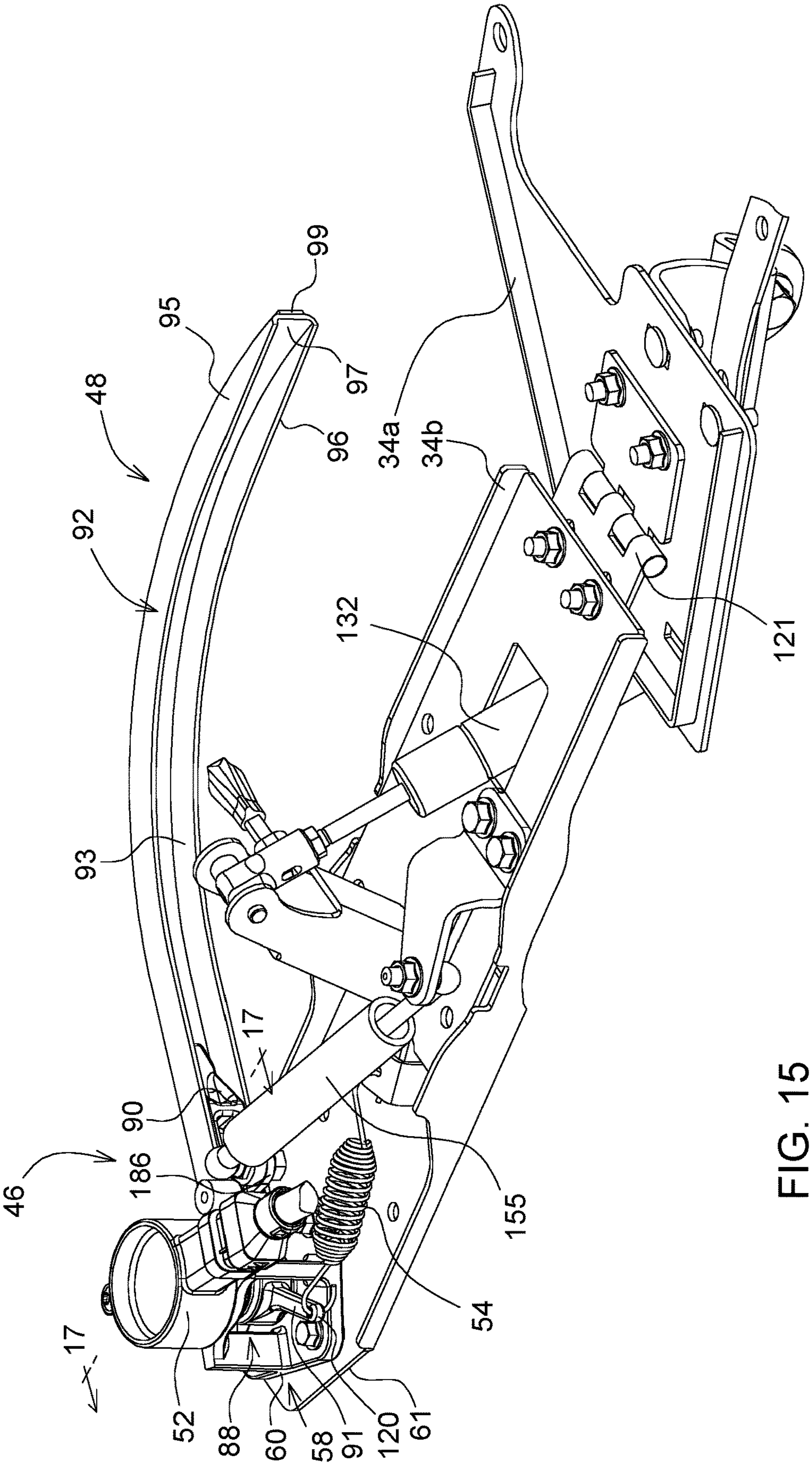
FIG. 15 is a perspective view showing a sensing unit with the linear damper.

Referring to FIGS. 5 and 14, the harvester 10 advances the header 14 through the field 11 in the forward direction 12. In so doing, the sensing system 44 engages stalks 13 successively and senses diameter-related data of the respective stalks 13 from the respective outer surfaces 50 thereof. The springs 54 urge the stalk feelers 48 into contact with one another in their neutral position and into contact with the outer surface 50 of each stalk 13 as the feelers 48 encounter successive stalks 13. The dampers 55, 155 help keep the feelers 48 in contact with the stalks 13, rather than bounce off the stalks 13 on contact, for more accurate readings by the sensors 52. The feelers 48 are rotationally constrained to the pivot shafts 62, 162, and the pivot shafts 62, 162 are rotationally constrained to the sensor pins 84 of the sensors 52. As such, the sensors 52 sense the deflection of the feelers 48. Each sensor 52 senses the rotational displacement of the respective feelers 48 as a directly corresponding angle value (e.g., when a feeler 48 rotates 5 degrees, the sensor 52 senses 5 degrees of rotation). The angle values sensed by the sensors 52 due to deflection of the feelers 48 represent diameter-related data of the stalks 13 and can be used to calculate the respective stalk diameters. The sensors 52 generate corresponding signals representative of the angle values sensed by the sensors 52. The signals are thus based on the diameter-related data and can be processed as discussed in more detail herein.

Figure 18:
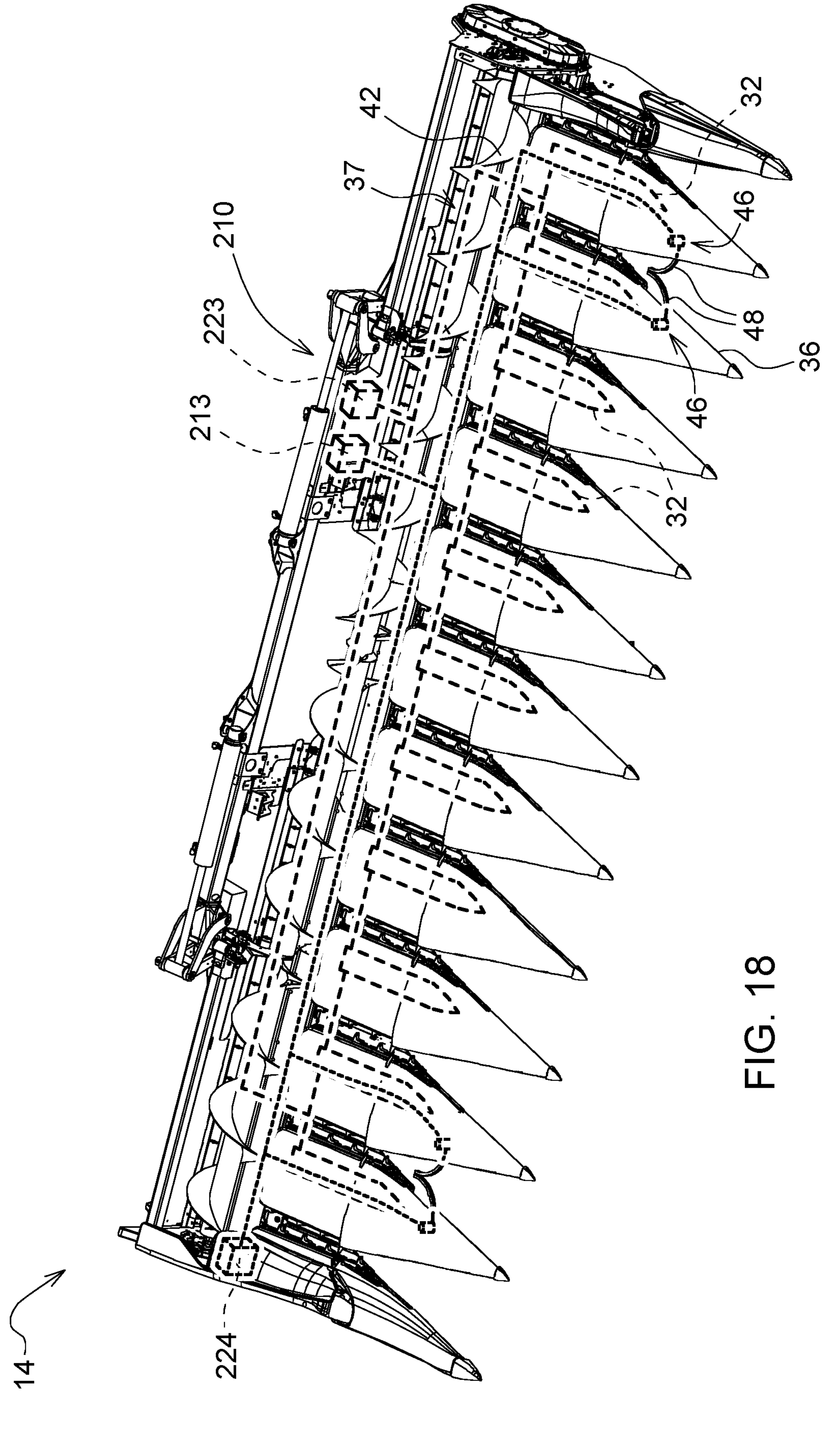
FIG. 18 is a perspective view showing the header with the stalk-diameter sensing systems for control of the deck plate spacing of the deck plates of the row units.
Figure 19:
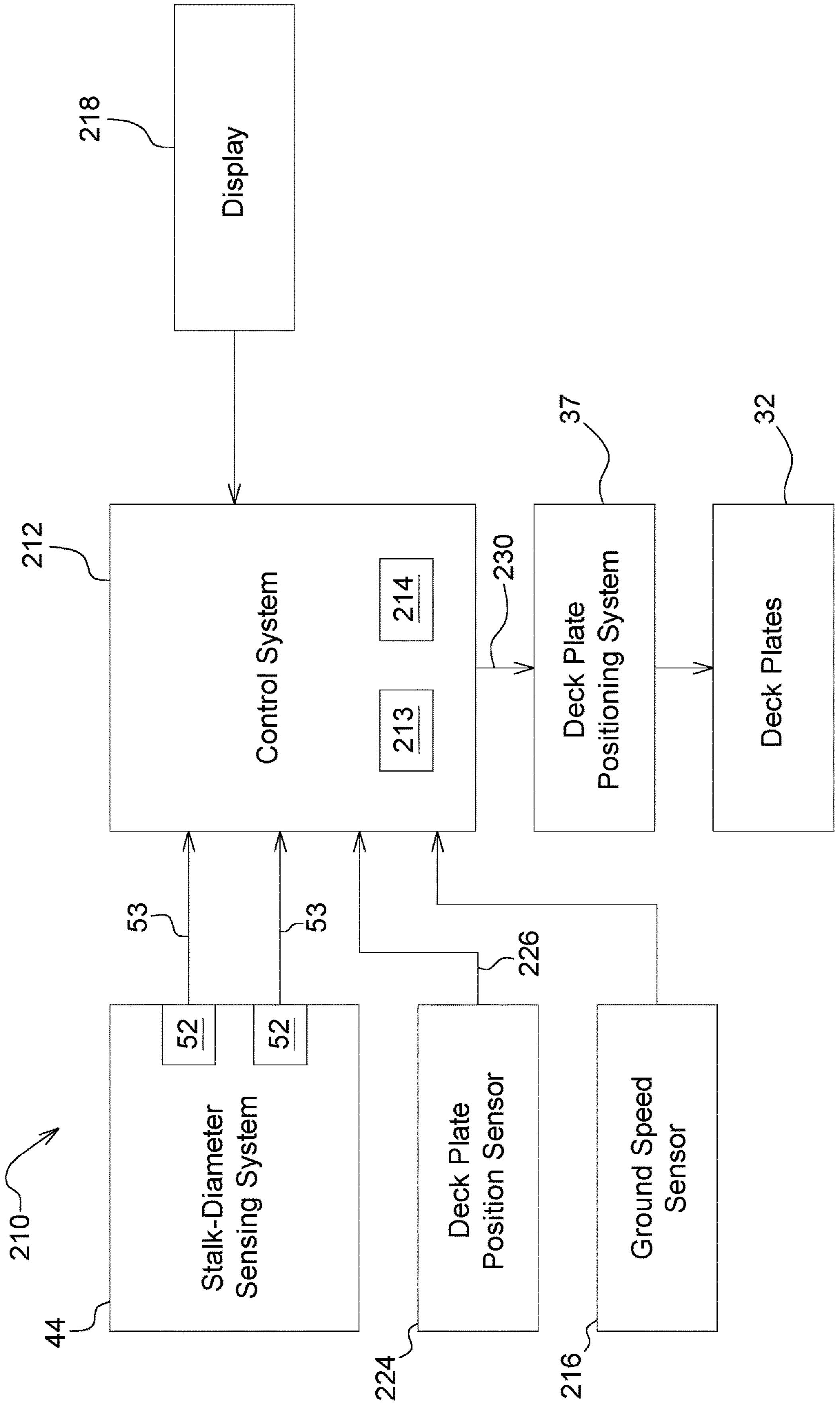
FIG. 19 is a schematic view showing an agricultural system for control of the deck plate spacing.
Figure 20:
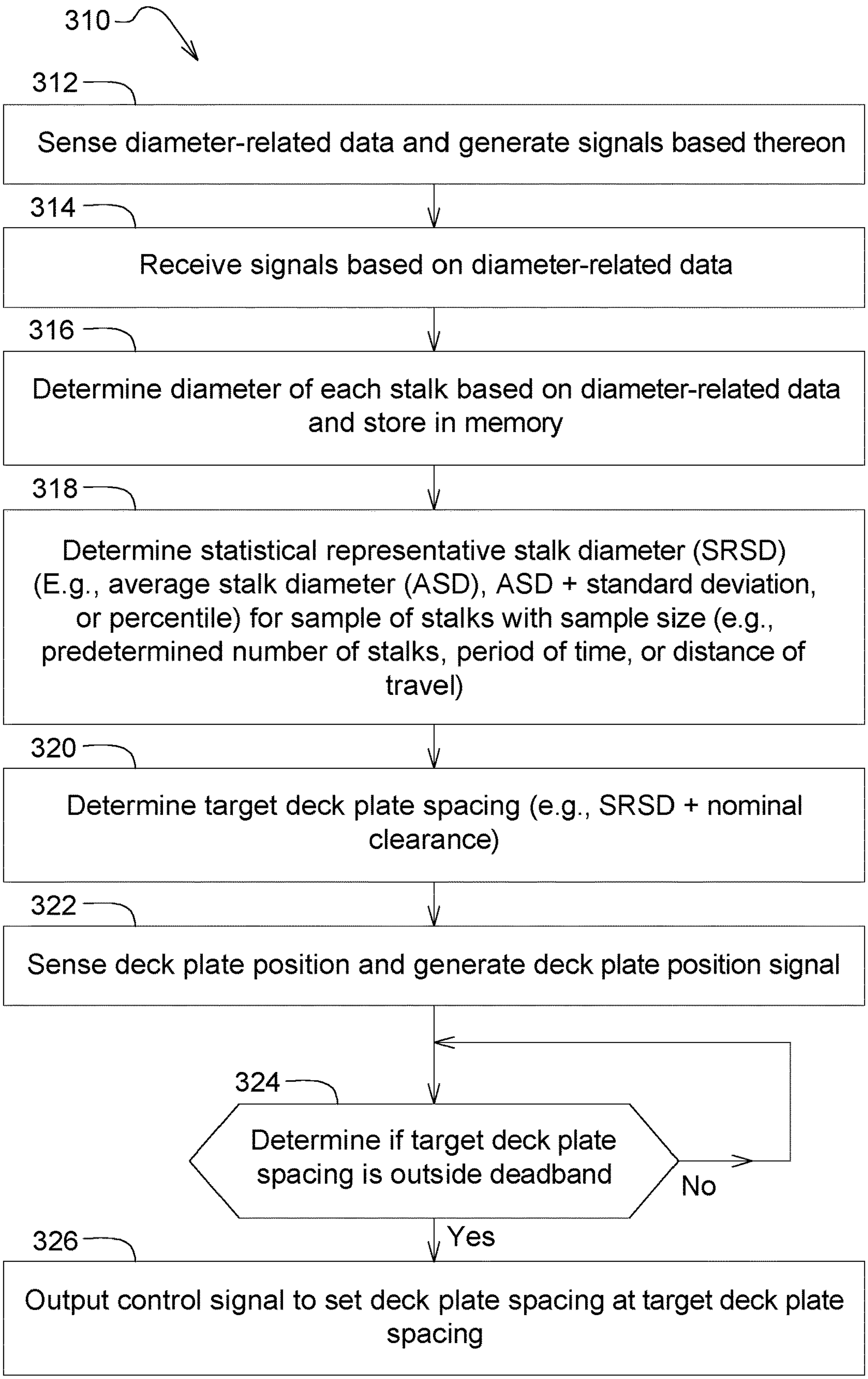
FIG. 20 is a control method for control of the deck plate spacing.

Referring to FIGS. 18-20, an agricultural system 210 is configured to control the deck plate spacing 35 and perform a control method 310. The agricultural system 210 includes the stalk-diameter sensing system 44, the deck plates 32, the deck plate positioning system 37, and a control system 212. The control system 212 is configured to communicate with the stalk-diameter sensing system 44 and the deck plate positioning system 37.

The control system 212 may include one or more controllers, each including a processor and memory with instructions stored therein to cause the processor to perform the various functions of the control system 212. One or more of the controllers of the control system 212 may be onboard the harvester 10 or the header 14, or in a remote location. Illustratively, the control system 212 includes a single controller 213, which is positioned onboard the header 14 (e.g., the header controller).

Figure 21:
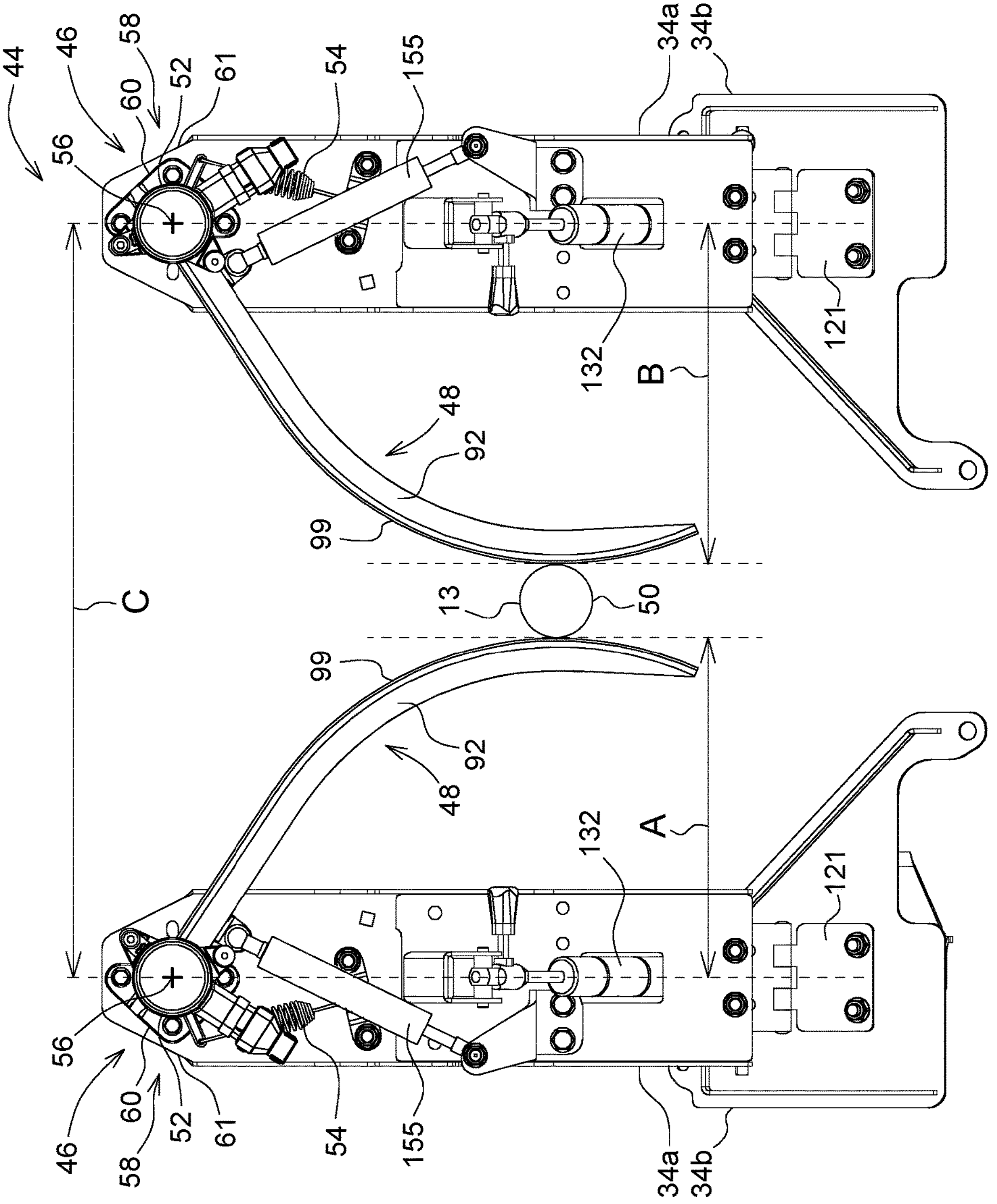
FIG. 21 is a top view showing a stalk-diameter sensing system sensing the diameter of a stalk.

Referring to FIGS. 20 and 21, in block 312 of the control method 310, the sensors 52 sense diameter-related data of each stalk 13 and generates the signals based on the diameter-related data. In block 314, the control system 212 receives the signals.

In block 316, the control system 212 determines a diameter of each stalk 13 based on the diameter-related data. The control system 212 determines a feeler gap D according to the formula D=C−A−B. The distance C is the lateral distance between the first and second pivot axes 56 and is a known constant stored in memory. The distance A is the lateral distance from the first pivot axis 56 to the laterally innermost portion of the first stalk feeler 48. The distance B is the lateral distance from the second pivot axis 56 to the laterally innermost portion of the second stalk feeler 48. The distances A and B vary as the stalk feelers 48 pivot about their respective pivot axes 56 due to engagement with stalks 13. The control system 212 receives angle values from the first sensor 52 and inputs the angle values to a transfer function to determine the distance A, and receives angle values from the second sensor 52 and inputs the angle values to a transfer function to determine the distance B. The feeler gap D thus varies over time due to engagement with stalks 13, with each peak in the magnitude of the feeler gap D representing the diameter of a respective stalk 13. The control system 212 detects each peak of the feeler gap D and its corresponding magnitude and stores that magnitude as the diameter of the respective stalk 13 in memory. The control system 212 thus determines the diameter for each stalk 13.

The control system 212 may determine the stalk diameter in other suitable ways. For example, in another implementation, the control system 212 receives angle values from the first sensor 52 and angle values from the second sensor 52. For a given stalk 13, the control system 212 sums the angle value from the first sensor 52 and the angle value from the second sensor 52. That sum is input to a transfer function to correlate the sum to the feeler gap D. The feeler gap D thus varies over time due to engagement with stalks 13, with each peak in the magnitude of the feeler gap D representing the diameter of a respective stalk 13. The control system 212 detects each peak of the feeler gap D and its corresponding magnitude and stores that magnitude as the diameter of the respective stalk 13 in memory. The control system 212 may thus determine the diameter for each stalk 13

In block 318, the control system 212 determines a statistical representative stalk diameter (SRSD) for a sample of stalks based on the diameter data. The sample of stalks has a sample size of at least two stalks. If the control system 212 has not received data for the sample size, the control system 212 pauses determination of the SRSD until it has received data for the sample size or otherwise at least two stalks.

The control system 212 may be configured to determine the SRSD in a variety of ways. For example, in some implementations, the control system 212 determines the SRSD based on an average stalk diameter. In such a case, the control system 212 calculates an average of the diameters of the stalks 13 in the sample of stalks to arrive at the average stalk diameter as the SRSD for that sample. In other implementations, the control system 212 is configured to determine the SRSD based on the average stalk diameter and an associated standard deviation. In such a case, the control system 212 calculates the average stalk diameter for the sample and the standard deviation for the average stalk diameter of that sample. The SRSD is then the average stalk diameter plus the standard deviation. In yet other implementations, the control system 212 is configured to determine the SRSD based on a percentile (e.g., $90^{th}$ percentile). In such a case, the control system 212 selects the diameter that corresponds to the percentile for the sample as the SRSD. The percentile corresponds to the diameter at which the associated percentage of stalks in the sample of stalks would pass between the deck plates 32. Stated otherwise, the $X^{th}$ percentile represents the diameter at which X percentage of stalks in the sample of stalks would pass between the deck plates 32. The percentile may be any suitable percentile.

The sample size may be determined in a variety of ways. For example, in some implementations, the sample size is a predetermined number of stalks, e.g., 10 stalks, 25 stalks, or 100 stalks, to name but a few different predetermined numbers of stalks. In such a case, the control system 212 determines the SRSD based on the predetermined number of stalks. In other implementations, the sample size is the number of stalks sensed by the stalk-diameter sensing system 44 in a predetermined period of time, e.g., 10, 20, or 30 seconds, to name but a few different predetermined periods of time. In such a case, the control system 212 monitors a timer 214 of the control system 212 and determines the SRSD based on the stalks 13 sensed in the predetermined period of time. In yet other implementations, the sample size is the number of stalks sensed by the stalk-diameter sensing system 44 in a predetermined distance of travel traveled by the harvester 10 and/or the header 14 advanced thereby. In such a case, the control system 212 monitors the distanced traveled and determines the SRSD based on the stalks 13 sensed in the predetermined distance of travel. The control system 212 may calculate the distanced traveled based on harvester speed, sensed by a ground speed sensor 216 (sensor 216 generates ground speed signal representative of harvester speed and control system 212 receives the ground speed signal), multiplied by time, or may determine the distance traveled by any other suitable method. The header controller or other controller of the control system 212 (e.g., a controller on the harvester 10) may calculate or otherwise determine the distance traveled. In each case, the sample size is at least two stalks 13.

The SRSD may be determined for successive samples of stalks respectively. In such a case, the control system 212 is configured to determine the SRSD for each sample of stalks of successive samples of stalks at a sample frequency. Each sample of stalks has the sample size of at least two stalks.

The sample frequency may be determined in a variety of ways. For example, in some implementations, the sample frequency is based on each time the stalk-diameter sensing system 44 senses a new stalk such that each sample of stalks comprises the respective new stalk and a predetermined number of preceding stalks. Each time the sensing system 44 senses a new stalk, the control system 212 re-determines the SRSD, with the current sample including the new stalk 13 and the predetermined number of preceding stalks. For example, if the sample size is 10 stalks, the sample of stalks includes the new stalk and the preceding 9 stalks. In other implementations, the sample frequency is based on a predetermined period of time. For example, the sample frequency is every predetermined period of time (e.g., every 10 seconds). In such a case, the control system 212 monitors the timer 214 and re-determines the SRSD every predetermined period of time from the sample of stalks sensed during the respective predetermined period of time. In yet other implementations, the sample frequency is based on a predetermined distance of travel. For example, the sample frequency is every predetermined distance of travel traveled by the harvester 10 and the header 14 advanced thereby (e.g., every 10 feet). In such a case, the control system 212 monitors the distanced traveled, as set forth herein, and re-determines the SRSD every predetermined distance of travel from the sample of stalks sensed during the respective predetermined distance of travel.

In block 320, the control system 212 determines a target deck plate spacing for the deck plates 32. The target deck plate spacing is the summation of the SRSD and a nominal clearance. The nominal clearance is the difference of the overall gap between deck plates 32 and SRSD. In an example, if the SRSD is 25 millimeters and the nominal clearance is 5 millimeters, the target deck plate spacing is 30 millimeters.

The nominal clearance may be set in a variety of ways. For example, in some implementations, the nominal clearance is selectable by a human operator of the harvester 10 and header 14 driven thereby. Making the nominal clearance operator selectable would allow the operator to provide input on the deck plate spacing 35 relative to the operator's preference and/or field conditions. For example, the operator can consider if the operator is more concerned about deck plate loss, due, for example, to butt shelling, or intake of material other than grain into the body of the harvester 10.

The control system 212 may include a display 218 or other operator input device located at the operator's station 28 by which the operator can input the nominal clearance. In such a case, the display 218 may display one or more selectable setpoints for the nominal clearance in text or numerical format with the option to change the setpoint (e.g., numerical setpoint selectable between 1 and 9 or a sliding scale with multiple setpoints). The control system 212 may convert the selected setpoint to an engineering number via a transfer function with units of millimeters.

Figure 22:
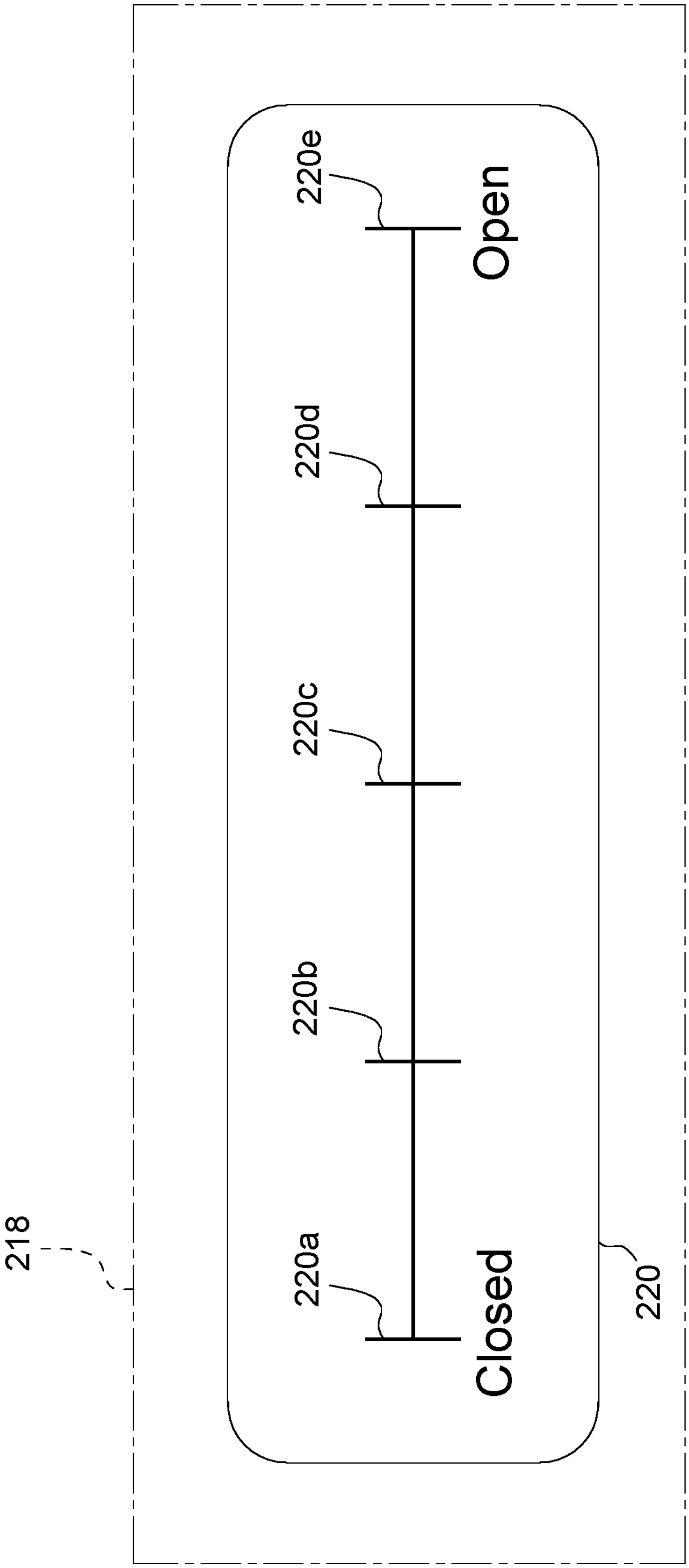
FIG. 22 is an elevational view showing a display with one or more operator-selectable setpoints for use in control of the deck plate spacing.

Referring to FIG. 22, illustratively, the display 218 may include a screen with a sliding scale 220. The scale 220 has a plurality of operator-selectable setpoints, each corresponding to a value for the nominal clearance. For example, the scale 220 has a first setpoint 220*a*, a second setpoint 220*b*, a third setpoint 220*c*, a fourth setpoint 220*d*, and a fifth setpoint 220*e* corresponding respectively to nominal clearance of 1 millimeter, 4 millimeters, 7 millimeters, 10 millimeters, and 13 millimeters. The display 218 generates a clearance signal representative of the nominal clearance selected by the operator.

Referring to FIGS. 18-21, the control system 212 communicates with the display 218. The control system 212 is configured to receive the clearance signal representative of the nominal clearance and determine the target deck plate spacing based on the SRSD plus the nominal clearance.

In other implementations, the control system 212 is configured to determine the nominal clearance automatically, independent of a selection of the nominal clearance by a human operator. The control system 212 may determine the nominal clearance based on machine learning. The control system 212 may determine the nominal clearance based on the average stalk diameter, in which case the nominal clearance may be tighter when stalk diameters are smaller. The control system 212 may determine the nominal clearance based on the standard deviation of stalk diameters, in which case the nominal clearance may be wider for a larger standard deviation. The control system 212 may determine the nominal clearance based on grain moisture, in which case the nominal clearance would be smaller for drier grain (e.g., dry corn) when the grain would be more susceptible to loss.

In yet other implementations, the nominal clearance is a fixed constant. In such a case, the nominal clearance is not adjustable.

The deck plate positioning system 37 is configured to adjust the deck plate spacing 35 of each row unit 30. The deck plate positioning system 37 is configured, for example, to adjust the lateral position of one of the deck plates 32 of each row unit 30 relative to the other deck plate 32 of that row unit 30. For example, the first or left deck plate 32 may be laterally adjustable toward and away from the second or right deck plate 32 relative to the frame 34, and the second or right deck plate 32 may be fixed relative to the frame 34.

Referring to FIGS. 3 and 18, the deck plate positioning system 37 includes an actuator 221, a connecting bar 222, and a yoke 226 for each row unit 30. The yoke 226 is coupled to the first deck plate 32 at two attachment points and is pivotally coupled to the frame 34 to adjust the first deck plate laterally. The connecting bar 222 is coupled to the yokes 226 and is mounted for linear movement in laterally opposite directions to pivot the yokes 226 to laterally adjust the first deck plates 32 of the row units 30 in response to operation of the actuator 221.

The actuator 221 may include a linear actuator, a hydraulic cylinder, or any other suitable mechanism for moving the connecting bar 222. In some implementations, the actuator 221 includes a hydraulic system with a valve block 223 and a double-acting hydraulic cylinder (not shown). In such a case, extension and retraction of the actuator 221 moves the connecting bar 222 laterally back and forth. The valve block 223 includes one or more valves under the control of the control system 212 to route hydraulic fluid to the appropriate port of the hydraulic cylinder (with the other port releasing pressure, for example, to tank or other suitable location) to extend or retract the rod thereof to shift the connecting bar 222 laterally and thereby pivot the yokes 226 for lateral adjustment of the first deck plates 32 and the corresponding deck plate spacing 35. A folding cornhead may employ two double-acting hydraulic cylinders and three connecting bars, one connecting bar for each wing of the folding cornhead and one connecting bar for the center section of the folding cornhead. In such a case, extension of one hydraulic cylinder in a first lateral direction moves the connecting bars in the first lateral direction so as to pivot the yokes 226 and shift the first deck plates 32, and extension of the other hydraulic cylinder in an opposite second lateral direction moves the connecting bars in the second lateral direction so as to pivot the yokes 226 and shift the first deck plates the other way.

Referring to FIGS. 18-21, the agricultural system 210 includes a deck plate position sensor 224. In block 322, the deck plate position sensor 224 senses a position of one or both of the deck plates 32 of one or more row units 30. The deck plate position is representative of the deck plate spacing 35 (i.e., the current deck plate spacing), such that the deck plate position sensor 224 senses the deck plate spacing 35. In the case where the first deck plates 32 are laterally moveable relative to the frame 34 and the second deck plates 32 are fixed relative to the frame 34, the deck plate position sensor 224 senses a position of the first deck plate 32 of one or more row units 30 relative to the frame 34. The sensor 224 may indirectly do so. In an example, where the deck plate positioning system 37 uses a hydraulic cylinder actuator 221 to move the connecting bar 222, the deck plate position sensor 224 is configured, for example, as a rotary sensor (e.g., rotary potentiometer) that senses the angular position of a pivotally mounted tie rod coupled to and pivoted by the connecting bar 222 such that lateral displacement of the connecting bar 222 by the cylinder actuator 221 causes angular displacement of the tie rod. The sensor 224 senses the angular position of the tie rod, which angular position corresponds to the position of the first deck plate 32 relative to the frame 34 and thus the deck plate spacing 35. The deck plate position sensor 224 generates a deck plate position signal representative of the position of the first deck plate 32 relative to the frame 34 and thus the deck plate spacing 35. It is to be understood that the deck plate position sensor 224 may be configured in a variety of ways.

The control system 212 is configured to communicate with the deck plate position sensor 224. The control system 212 receives the deck plate position signal.

In block 324, the control system 212 determines if the target deck plate spacing is outside a deadband relative to the (current) deck plate spacing 35, indicated by the deck plate position represented by the deck plate position signal. If the target deck plate spacing is outside the deadband, the control method advances to block 326 to output a control signal. If the target deck plate spacing is not outside the deadband, the control system 212 does not output the control signal, in which case the deck plate spacing 35 remains the same. As such, the control system 212 outputs the control signal only if the target deck plate spacing is outside the deadband.

In block 326, the control system 212 communicates with the deck plate positioning system 37. The control system 212 outputs a control signal to command the deck plate positioning system 37 to set the deck plate spacing 35 at, or otherwise based on, the target deck plate spacing. The control signal output by the control system 212 is based on the target deck plate spacing determined by the control system 212 and the (current) deck plate spacing 35 sensed by the deck plate position sensor 224 and represented by the deck plate position signal generated as feedback for consideration by the control system 212. The target deck plate spacing may be an actual value of the deck plate spacing to be achieved or some change in deck plate spacing to be achieved (delta spacing). If the target deck plate spacing is an actual value of the deck plate spacing, the control system 212 outputs the control signal to command the deck plate positioning system 37 to set the deck plate spacing 35 at the target deck plate spacing. If the target deck plate spacing is a delta spacing, the control system 212 outputs the control signal to command the deck plate positioning system 37 to set the deck plate spacing 35 based on the target deck plate spacing.

As indicated herein, the agricultural system 210 may have more than one stalk-diameter sensing system 44. For example, the header 14 may have a second sensing system 44 positioned toward the opposite end of the header 14 and associated with another row of crop in the field 11. In such a case, the control system 212 aggregates all the data from the sensing systems 44 to control the deck plate positioning system 37 and thus the deck plate spacing 35, since stalk diameters may vary from row to row.

Each sensing system 44 may be used in the control of a portion of the deck plates 32 of the header 14. For example, in some implementations, the first sensing system 44 (e.g., on lefthand side of the header 14) may be used by the control system 212 in the control of the spacing 35 of the deck plates 32 on the lefthand side of the header 14, and the second sensing system 44 (e.g., on righthand side of the header 14) may be used by the control system 212 in the control of the spacing 35 of the deck plates 32 on the righthand side of the header 14.

In other implementations, the header 14 may have a left wing, a right wing, and a center section positioned between the left and right wings. The agricultural system 210 may have a third sensing system 44. The first sensing system 44 is associated with a row unit of the left wing and used by the control system 212 to control the spacing 35 of the deck plates 32 of the left wing. The second sensing system 44 is associated with a row unit of the right wing and used by the control system 212 to control the spacing 35 of the deck plates 32 of the right wing. The third sensing system 44 is associated with a row unit of the center section and used by the control system 212 to control the spacing 35 of the deck plates 32 of the center section.

For ease of illustration threads are not shown in the drawings but are to be understood.

Figure 23:
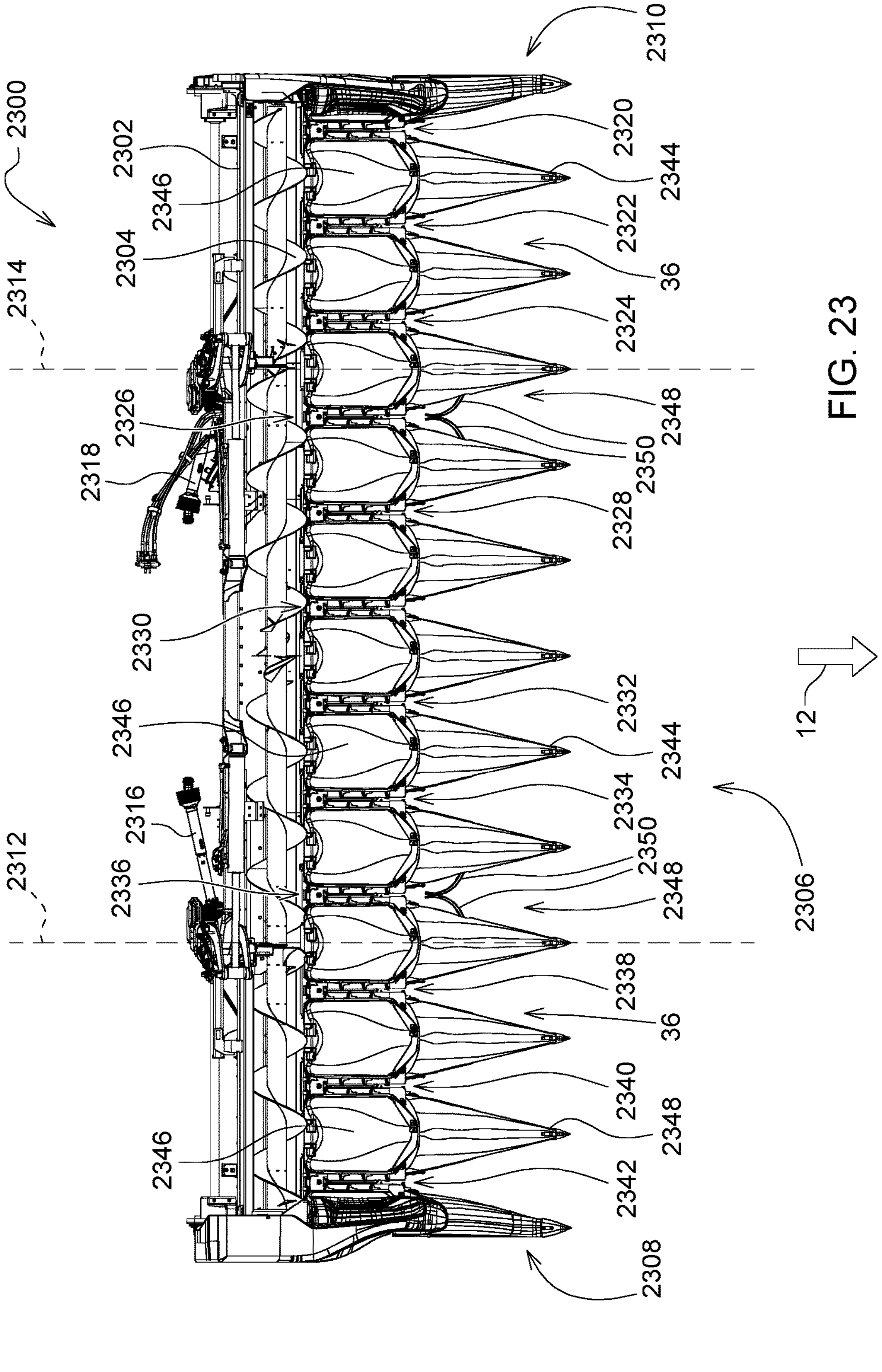
FIG. 23 is a top view of an example header of an agricultural harvester including a plurality of row units, with one or more of the row units including a stalk-diameter sensing system.

Referring to FIG. 23, another implementation is shown of an example header (e.g., agricultural header) for being mounted to an agricultural machine such as the agricultural harvester 10 of FIG. 1. As illustrated, the header 2300 is shown including a header frame 2302 to which a plurality of row units and a rotating auger 2304 may be coupled. The plurality of row units may include any number of row units. In FIG. 23, the plurality of row units includes a first row unit 2320, a second row unit 2322, a third row unit 2324, a fourth row unit 2326, a fifth row unit 2328, a sixth row unit 2330, a seventh row unit 2332, an eighth row unit 2334, a ninth row unit 2336, a tenth row unit 2338, an eleventh row unit 2340, and a twelfth row unit 2342. Each row unit may be assembled and include the same features and functionality as described above with respect to the row units 30 of FIGS. 1-4.

The header 2300 includes a center frame assembly 2306 located generally in a middle or central portion thereof. Adjacent and on each side of the center frame assembly 2306 is a wing frame assembly. As shown, a first wing frame assembly 2308 is located on one side of the center frame assembly 2306, and a second wing frame assembly 2310 is located on an opposite side thereof. In this implementation, the first row unit 2320, the second row unit 2322, and the third row unit 2324 are coupled to the second wing frame assembly 2310, the fourth row unit 2326, the fifth row unit 2328, the sixth row unit 2330, the seventh row unit 2332, the eighth row unit 2334, and the ninth row unit 2336 are coupled to the center frame assembly 2306, and the tenth row unit 2338, the eleventh row unit 2340, and the twelfth row unit 2342 are coupled to the first wing frame assembly 2308.

The header 2300 of FIG. 23 is movable between a transport position and a work position. In the transport position, the header 2300 is folded into a compact configuration for being transported, for example, on a roadway. In the work position, the header 2300 is unfolded and disposed in its configuration as shown in FIG. 23 where the header 2300 is configured to perform an operation such as harvesting crop in a field. In FIG. 23, the first wing frame assembly 2308 of the header 2300 is foldable or pivotable about a first fold axis 2312 relative to the center frame assembly 2306. Likewise, the second wing frame assembly 2310 is foldable or pivotable about a second fold axis 2314 relative to the center frame assembly 2306. The first and second wing frame assemblies are foldable or pivotable relative to the center frame assembly 2306 when the header is being folded into the transport position or unfolded into the work position. A first actuator 2316 is shown in FIG. 23 coupled between the center frame assembly 2306 and the first wing frame assembly 2308 for pivoting the first wing frame assembly 2308 about the first fold axis 2312. A second actuator 2318 in FIG. 23 is coupled between the center frame assembly 2306 and the second wing frame assembly 2310 for pivoting the second wing frame assembly 2310 about the second fold axis 2314. The first and second actuators may be a hydraulic actuator, a linear actuator, an electric actuator, a mechanical actuator, or any known type of actuator.

The header 2306 may be coupled to a front end of an agricultural harvester and travel in a forward travel direction indicated by arrow 12 in FIG. 23. As the header 2306 moves in a field in the forward travel direction, rows of crop may be harvested by the header. The header 2300 includes row units similar to the row units 30 described previously. More specifically, each row unit on the header 2300 includes a pair of deck plates 32 mounted to a frame 34 of the row unit and spaced apart to define a deck plate spacing 35 therebetween. The deck plate spacing 35 is within a larger stalk-receiving gap 36 defined by the row unit for receiving successive stalks 13. A deck plate positioning system 37 of the header 2300 is coupled to at least one of the deck plates 32 of each row unit to adjust the deck plate spacing 35 of each row unit.

Each row unit on the header 2300 also includes a pair of stalk rolls 38 and a pair of gathering chains 40. The stalk rolls 38 are positioned below the deck plates 32, counter-rotate to pull stalks 13 downwardly between the deck plates 32, and chop the stalks 13 into smaller pieces. Each gathering chain 40 is positioned on either side of the stalk-receiving gap 36 with a rearward run of the chain 40 positioned above a respective deck plate 32 to advance ears of corn removed from stalks 13 by the deck plates 32 rearwardly to the auger 2304 behind the row units. The auger 2304 advances the ears of corn laterally inwardly toward the feederhouse 15 for ingestion into the body of the harvester 10 and processing thereby. The stalk rolls 38 and gathering chains 40 are mounted to the frame 34. The auger 2304 is mounted to the header frame 2302 of the header 2300.

One or more of the row units on the header 2300 may include a respective stalk-diameter sensing system 2348 for sensing stalk diameter. Illustratively, the header 2300 includes a sensing system 2348 for the ninth row unit 2336 on a first side of the header 2300 and a sensing system 2348 for the fourth row unit 2326 on a second side of the header 2300. It is to be appreciated that the sensing system(s) 2300 may be positioned at any suitable lateral location along the header 2300. Each sensing system 2348 is positioned in front of the deck plates 32 and stalk rolls 38 of the respective fourth and ninth row units 2326, 2336. The sensing system 2348 is configured to sense diameter-related data of respective stalks 13 and generate signals based on the diameter-related data.

Each stalk-diameter sensing system 2348 in FIG. 23 includes a first stalk feeler 2350 and a second stalk feeler 2350. As described above, each of the first stalk feeler 2350 and the second stalk feeler 2350 are part of a first sensing unit 2352 and a second sensing unit 2352 (FIG. 24), respectively (e.g., first and second sensing units 46). Each sensing unit 2352 is coupled to one or more row unit frames, as will be described below. Moreover, each sensing unit 2352 is generally covered or enclosed by a point assembly 2344 (e.g., snoot) and its corresponding housing or cover 2346. The respective stalk feeler, however, protrudes through a side recess (e.g., side recess 124 formed in a housing 126) of the point assembly 2344. As such, the stalk feeler 2350 is positioned in the side recess of the point assembly 2344 with the stalk feeler 2350 and a top edge of the side recess defining a gap (e.g., gap 130 of FIG. 12) therebetween. As described above, it is desirable to minimize the size of the gap formed between the stalk feeler 2350 and the side recess in the point assembly 2344 in order to minimize ingress of debris into the gap that might otherwise hinder motion of the stalk feeler 2350 and distort readings of a sensor 52 of the respective sensing unit 2352.

Figure 24:
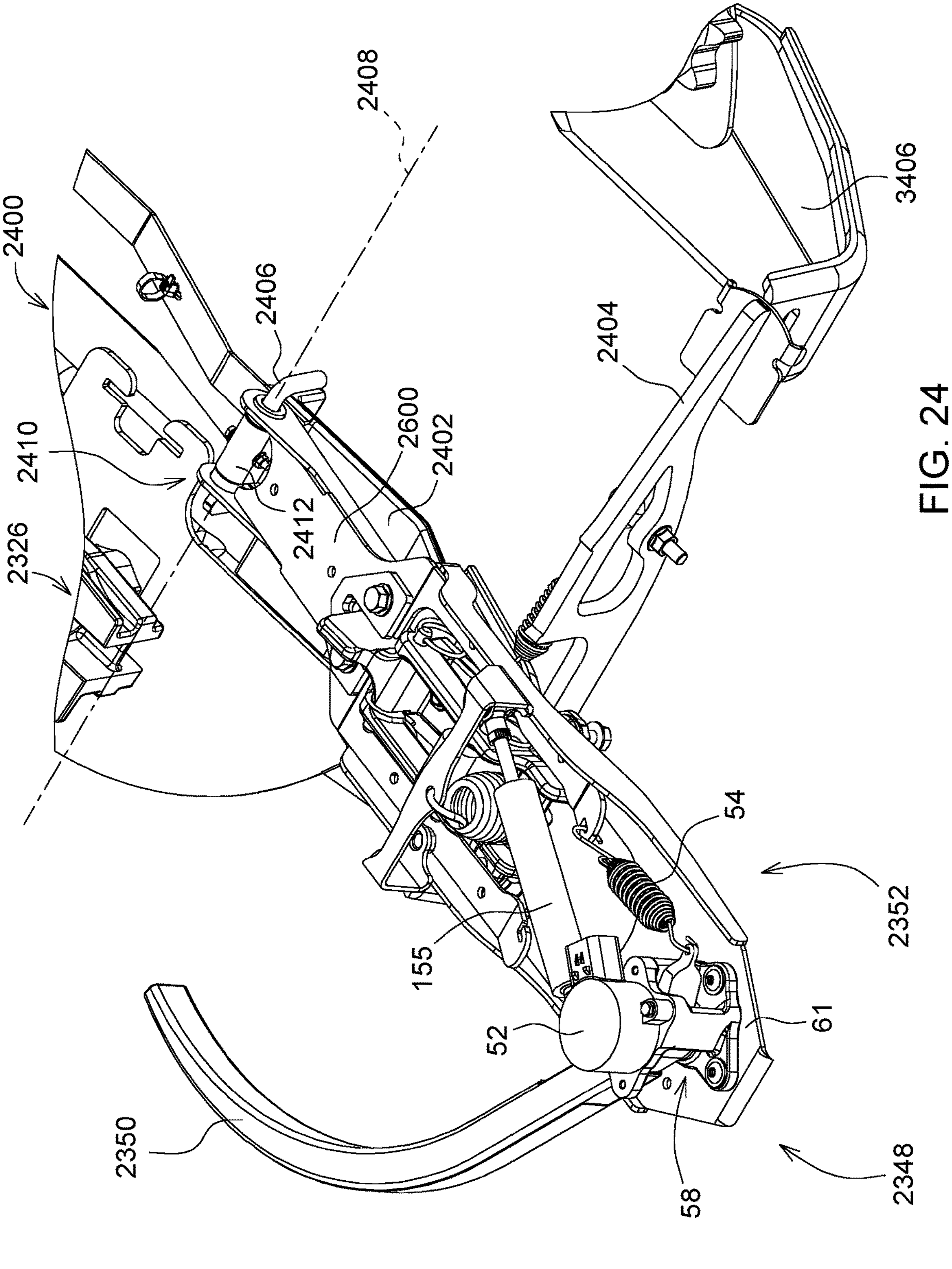
FIG. 24 is a perspective view of one example implementation of a stalk-diameter sensing system.

The first and second stalk feelers 2350 are deflectably coupled on opposite sides of the stalk-receiving gap 36. As described above, the stalk-receiving gap 36 is located in front of the deck plates 32 relative to the forward direction 12 and receives successive stalks 13 planted in the field 11 when the harvester 10 moves in the forward direction 12. The first and second stalk feelers 2350 are yieldably biased into the stalk-receiving gap 36 for deflection upon contact with the outer surface 50 of each stalk 13 as the harvester 10 travels on the field 11 in the forward direction 12. As shown in FIG. 24, each sensing unit 2352 includes a sensor 52 coupled to each stalk feeler 2350 to sense deflection of the stalk feeler 2350 and generate a corresponding first signal. A second sensor 52 of the second sensing unit 2352 is coupled to the second stalk feeler 2350 to sense deflection of the second stalk feeler 2350 and a generate a corresponding second signal. In some implementations, the first sensing unit 2352 and second sensing unit 2352 may include the pivot body 88, damper 55, housing 60, frame member 61, and pivot joint 58 similar to the sensing unit 46 described above.

Each sensing unit 2352 includes a spring 54 coupled to the stalk feeler 2350 and a row unit frame (e.g., frame 34). The spring 54 yieldably biases the stalk feeler 2350 into the stalk-receiving gap 36 and into contact with the other stalk feeler 2350 of the stalk-diameter sensing assembly 2348 in the absence of a stalk 13 therebetween. In the presence of a stalk 13, the springs 54 yieldably bias the stalk feelers 2350 into contact with the outer surface 50 of the stalk 13. The springs 54 yield to contact with the stalk 13 to allow the stalk feelers 2350 to pivot away from one another for the stalk 13 to pass between the stalk feelers 2350.

The stalk feelers 48 are positioned for movement in a common plane so as to be aligned with one another in the plane. Each stalk feeler 2350 has a range of motion that overlaps with the range of motion of the other stalk feeler 2350 in order to contact and measure stalks that are offset from the center of the row unit 2326. Although the ranges of motion of each stalk feeler 2348 overlaps, the stalk feelers 2348 do not overlap physically, because the stalk feelers 2348 are biased into contact with one another in their closed or neutral position by the springs 54. In other words, the stalk-diameter sensing system 2348 shown in FIG. 23 is similar in structure and function as the stalk-diameter sensing system 48 previously described.

As shown in FIG. 23, however, the first and second fold axes 2312, 2314 are located adjacent the ninth row unit 2336 and the fourth row unit 2326, respectively. The location of each fold axis relative to the fourth and ninth row units as well as the stalk-diameter sensing system 2348 includes a different mounting structure for coupling each sensing unit 2352 to the respective row unit than described previously. Further, the impact on folding and unfolding the header 2300 with this different mounting structure is now described with respect to FIGS. 24-40.

Referring to FIG. 24, the stalk-diameter sensing system 2348 is shown with respect to the fourth row unit 2326 on the header 2300. While the stalk-diameter sensing system 2348 is shown and described with respect to the fourth row unit 2326, the same applies to the stalk-diameter sensing system 2348 coupled at the ninth row unit 2336. The fourth row unit 2326 includes a row unit frame 2400 similar to that of the row unit frame 30 described above. As shown in FIG. 24, the row unit frame 2400 includes a leg portion 3406, 3408 as will be described with respect to FIG. 34 below. The sensing unit 2352 of FIG. 24 is supported by additional frames, support members, and castings. In particular, with respect to FIGS. 24 and 25, the sensing unit 2352 is shown coupled to a main body 2402. The main body 2402 may be formed as or from a casting, weldment, powered metal, composite, etc. The main body 2402 includes a post 2412 that forms a transverse opening configured to receive a hinge pin 2406. The hinge pin 2406 couples the sensing unit 2352 to the main body 2402 via a pivotal connection 2410 about a hinge axis 2408. The sensing unit 2352 is able to pivot relative to the main body 2402 about the hinge axis 2408.

Figure 29:
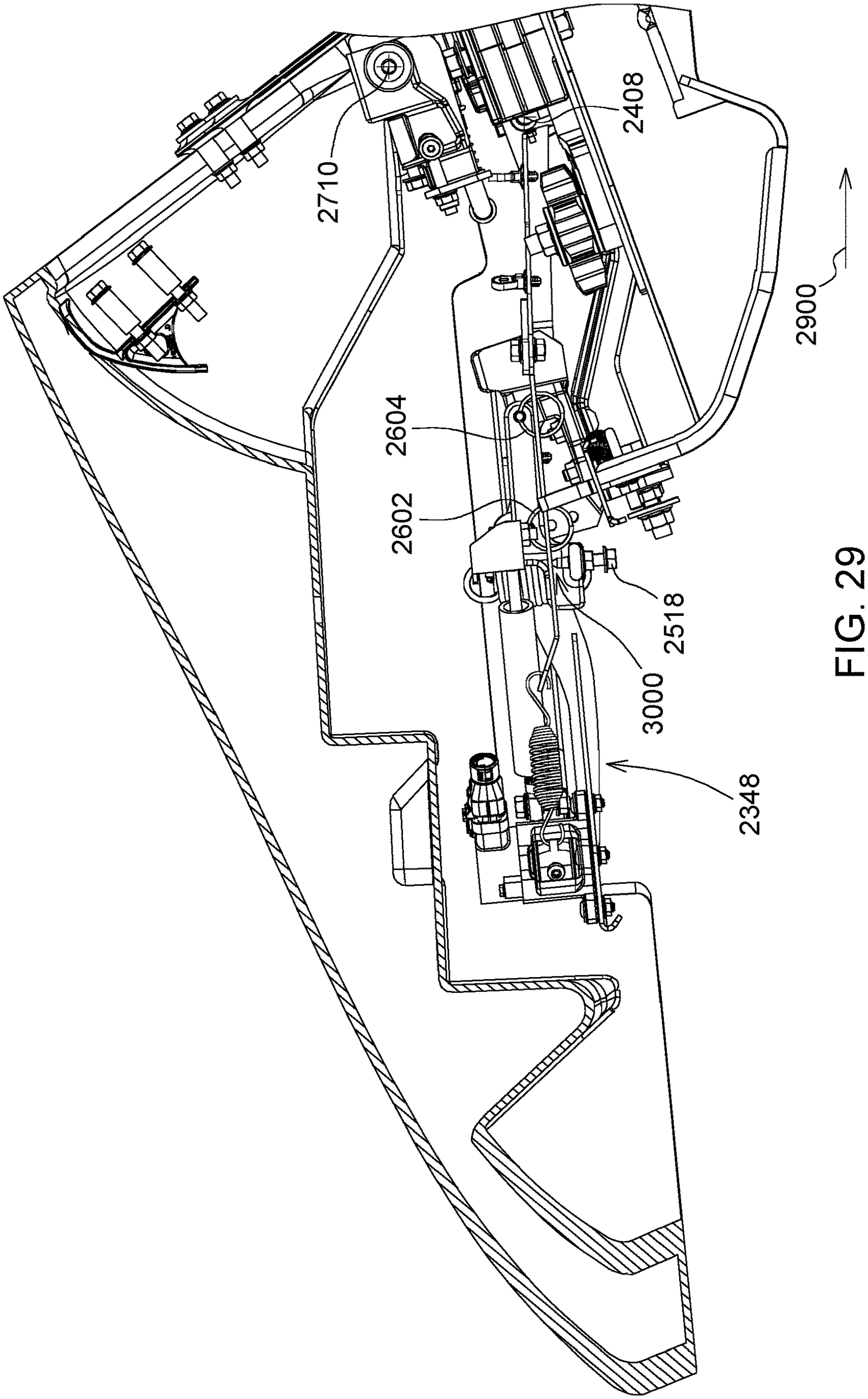
FIG. 29 is a partial section of a side view of the point assembly of FIG. 27 and stalk-diameter sensing system of FIG. 24.

The location of the hinge axis 2408 in FIG. 24 is advantageously located in close proximity to a point assembly pivot axis 2710. In FIG. 29, for example, the implementation of the hinge axis 2408 is located in a more rearward direction indicated by arrow 2900 and thus closer to the point assembly pivot axis 2710 than the implementations previously described in this disclosure. In other words, the point assembly 2344 is able to pivot about the point assembly pivot axis 2710 (i.e., particularly when the point assembly 2344 contacts an object or the ground) and the sensing unit 2352 is able to pivot about the hinge axis 2408 (i.e., when the sensing unit 2352 engages an object or ground). Thus, the point assembly 2344 and sensing unit 2352 are able to pivot independently of one another. In spite of this, the size of the gap defined between the stalk feeler 2350 and the side recess in the point assembly 2344 generally remains consistent and unaffected due to less variation through the range of motion of both the point assembly 2344 and the sensing unit 2352. Again, this consistent gap is maintained due to the hinge axis 2406 being located in closer proximity to the point assembly pivot axis 2710.

As also shown in FIG. 24, a crossbar support 2404 is included as part of the mounting structure of the sensing unit 2352. The crossbar support and its function will be described below.

Figure 25:
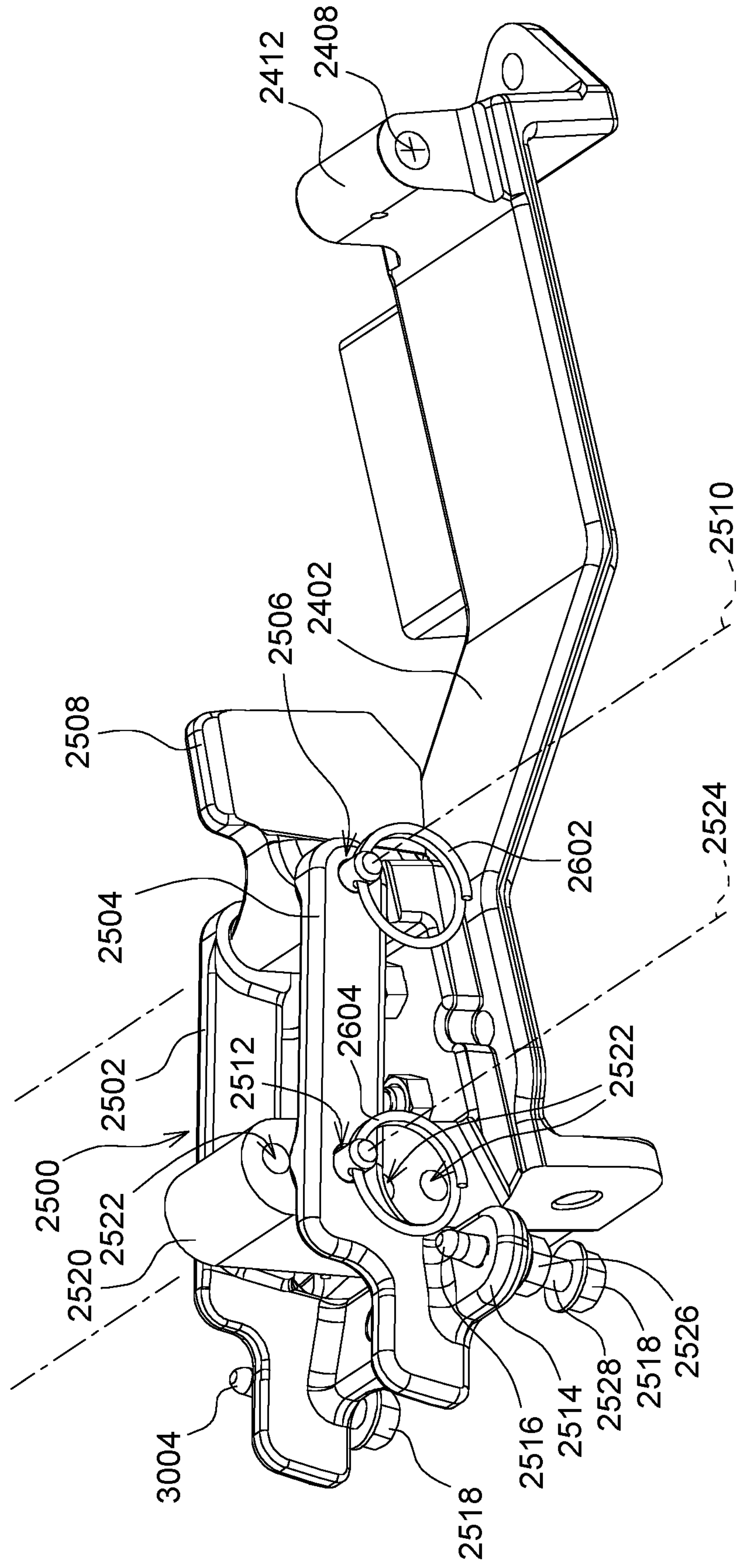
FIG. 25 is a perspective view of one example assembly for coupling to a row unit and the stalk-diameter sensing system of FIG. 24.
Figure 31:
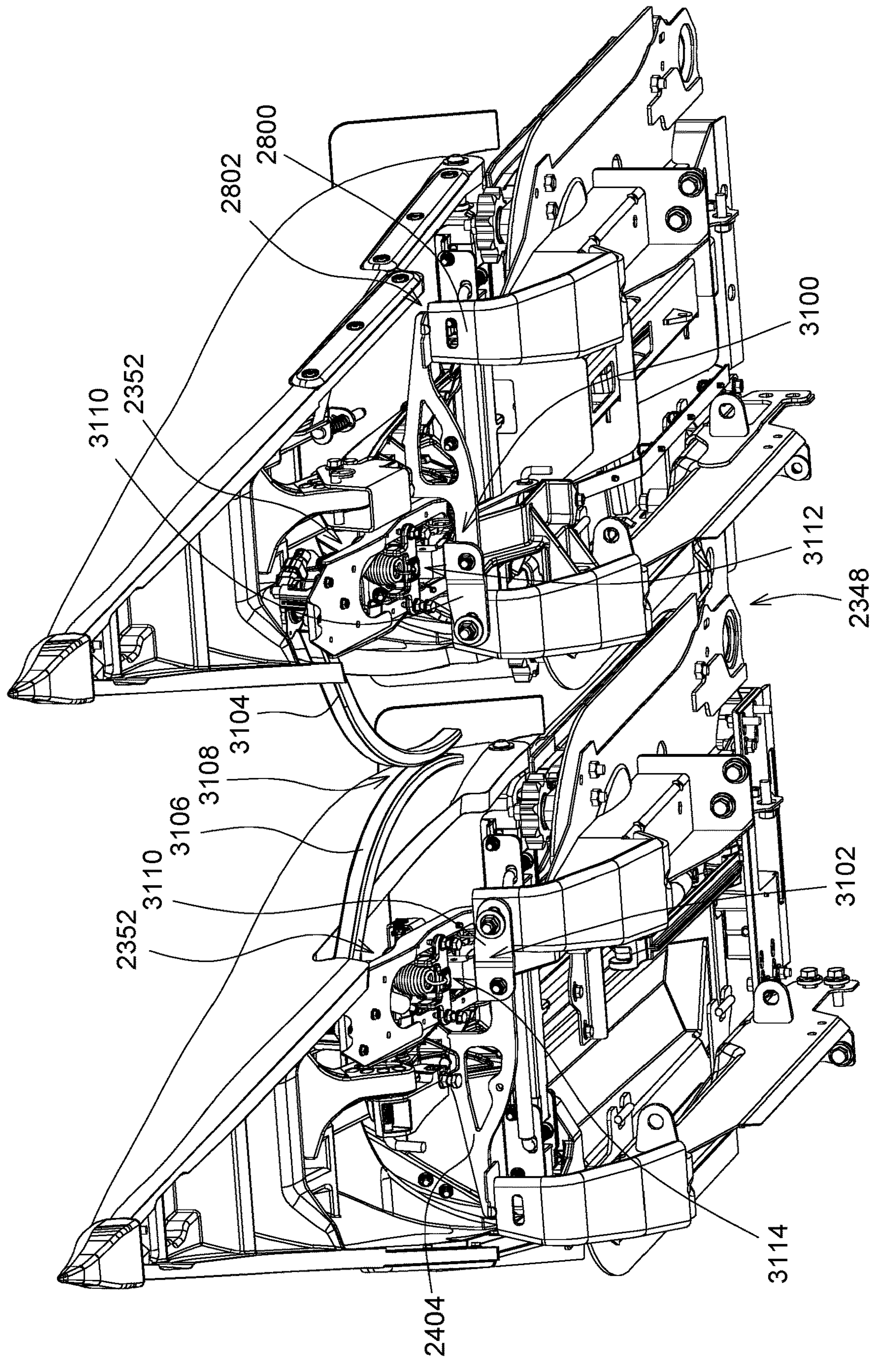
FIG. 31 is a perspective view of an example implementation of a stalk-diameter sensing system.

The sensing unit 2352 may be coupled to the row unit frame 2400 via a mount body 3110 (best shown in FIG. 31). The mount body 3110 can be a casting, weldment, powdered metal, composite, etc. One or more fasteners or connectors 3206 are used for coupling the mount body 3110 to a leg 3204 the row unit frame 2400 (see FIG. 32A-B). In FIG. 25, an adjustment body 2500 may be coupled to the main body 2402. The adjustment body 2500 can be formed as a casting, a weldment, powdered metal, composite, etc. The adjustment body 2500 includes a first arm 2502 and a second arm 2504. The first and second arms 2502, 2504 form a pair of first openings 2506 through which a pin 2602 (FIG. 26) is inserted. The first openings 2506 are formed in a first portion of the first and second arms. The pin 2602 pivotally couples the adjustment body 2500 to a first post 2508 formed by the main body 2402. The adjustment body 2500 is therefore able to pivot about a first pivot axis 2510 relative to the main body 2402. Moreover, the pivotal connection between the adjustment body 2500 and main body 2402 is a first connection between the two bodies.

Figure 26:
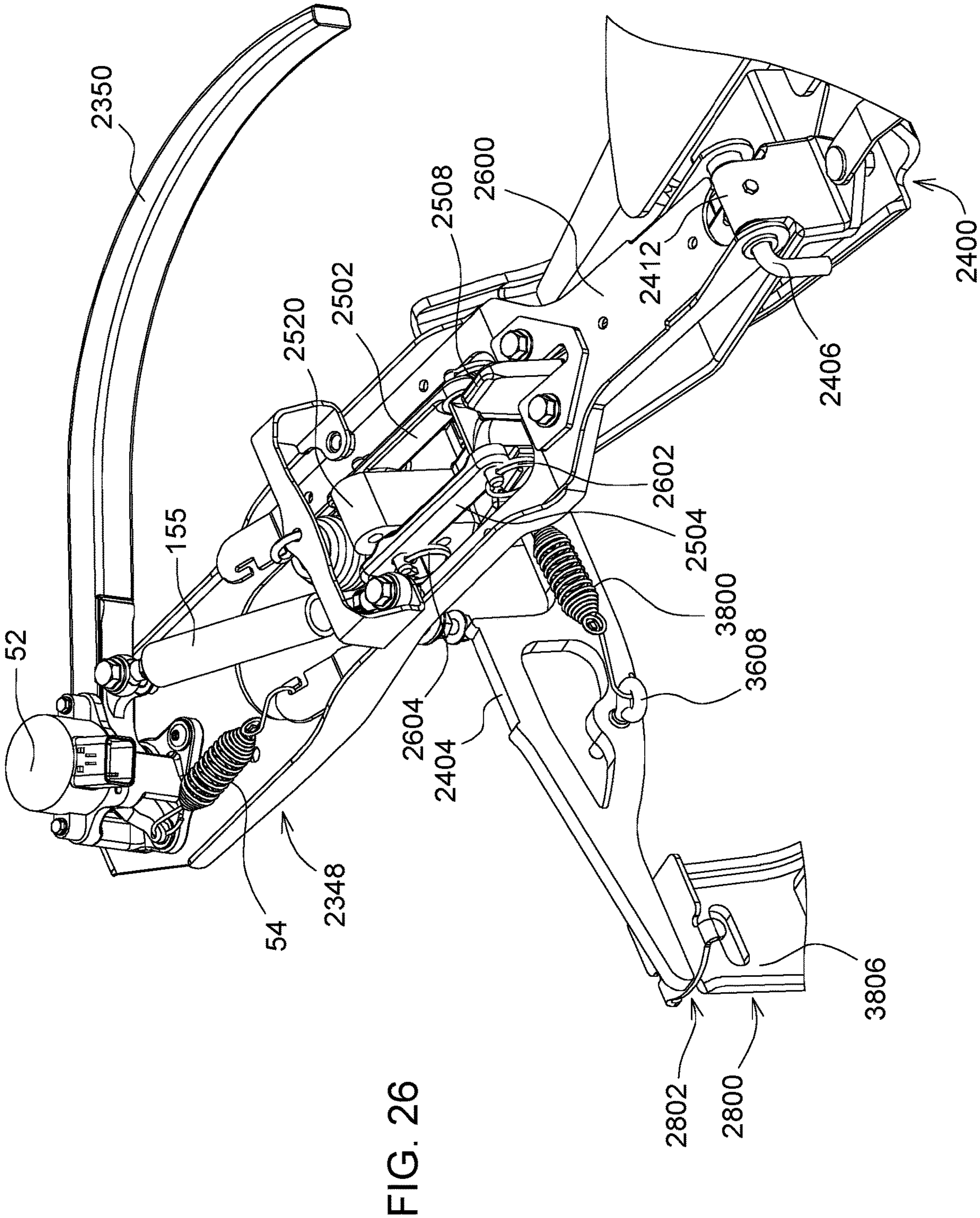
FIG. 26 is a perspective view of the stalk-diameter sensing system of FIG. 24 and the assembly of FIG. 25.

The first arm 2502 and second arm 2504 also form second openings 2512 in a second portion thereof. The second openings 2512 formed in the first and second arms 2502, 2504 are aligned along an adjustment axis 2524. As shown in FIG. 25, the adjustment body 2500 is coupled to the main body 2402 at a second connection along the adjustment axis 2524. As shown in FIG. 25, the main body 2402 includes a second post, or adjustment post 2520. The adjustment post 2520 includes a plurality of openings 2522 formed therein. In FIG. 26, a second pin 2604 may be inserted into the openings 2512 formed in the first arm and second arms 2502, 2504 and one of the plurality of openings 2522 formed in the adjustment post 2520 of the main body 2402. As shown, the plurality of openings 2522 are defined in the adjustment post along an arcuate path to enable the adjustment body 2500 to pivot about the first pivot axis 2510 and thus align the openings 2512 in the first and second arms 2502, 2504 with one of the plurality of openings 2522. The height of the sensing unit 2352 can be adjusted without the use of tools relative to the main body 2402 and row unit frame 2400 by removing the second pin 2604 from one of the plurality of openings 2522 in the adjustment post 2520 and reinserting it into a different opening of the plurality of openings 2522 in the adjustment post 2520. The selection of one of the plurality of openings 2522 will be further described below with the adjustment of the point assembly 2344.

In FIGS. 25 and 26, the main body 2402 includes the post or mounting location 2414, a frame portion 2600, a first post or mounting location 2508 and an adjustment post or mounting location 2520. The main body 2402 is a separate body from the adjustment body 2500 such that the two bodies are configured to be coupled to one another via fasteners or other known type of coupling mechanism. In one implementation, the main body 2402 and the mount body 3110 may be integrally formed with one another to form a single body (e.g., via a casting, weldment, composite, powered metal, etc.). In other implementations, the main body 2402 and mount body 3110 may be separate bodies that are coupled to one another via fasteners, welding, or other known type of coupling mechanism.

Figure 27:
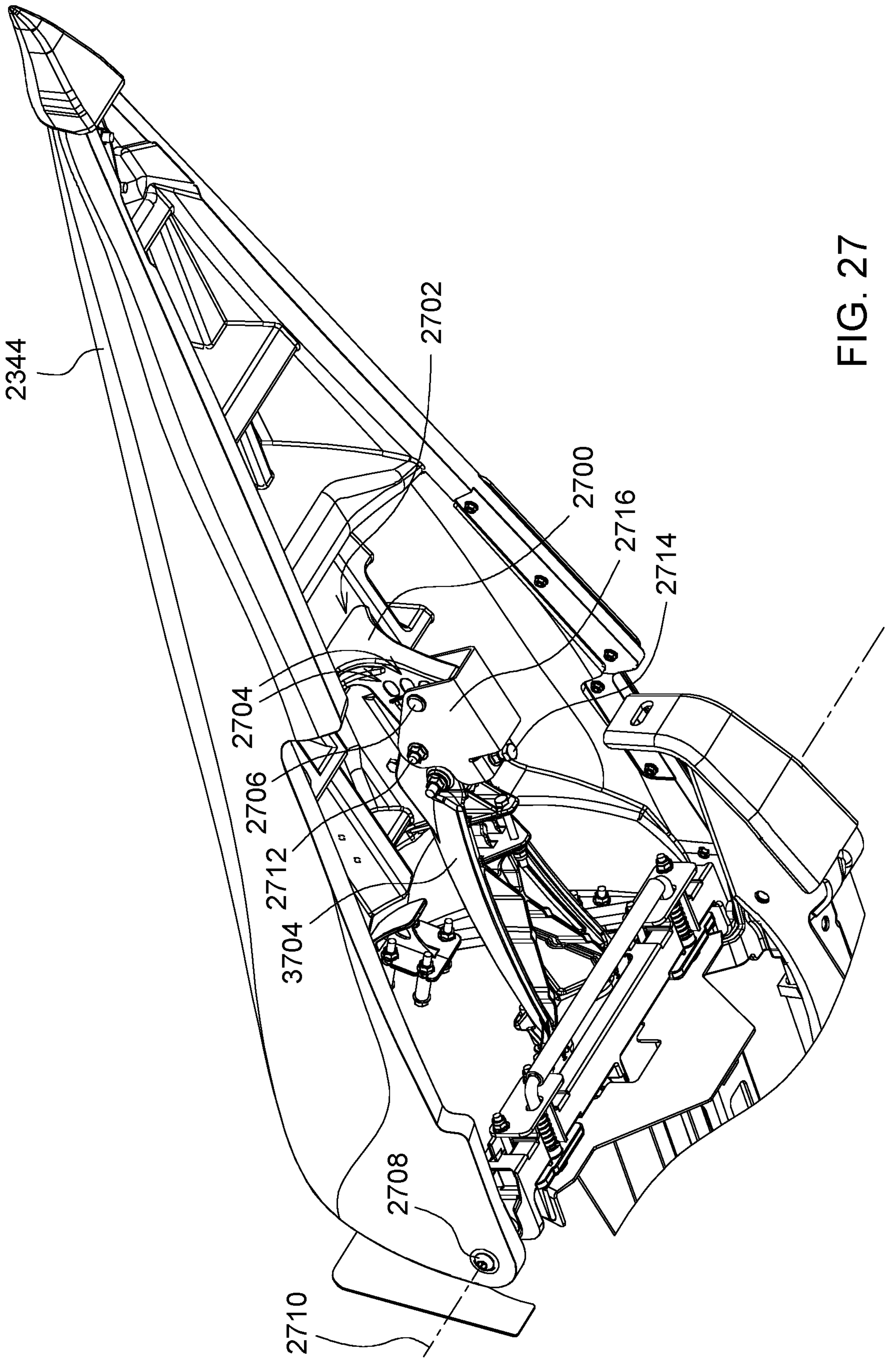
FIG. 27 is a perspective view of one example point assembly and adjustment body.
Figure 28:
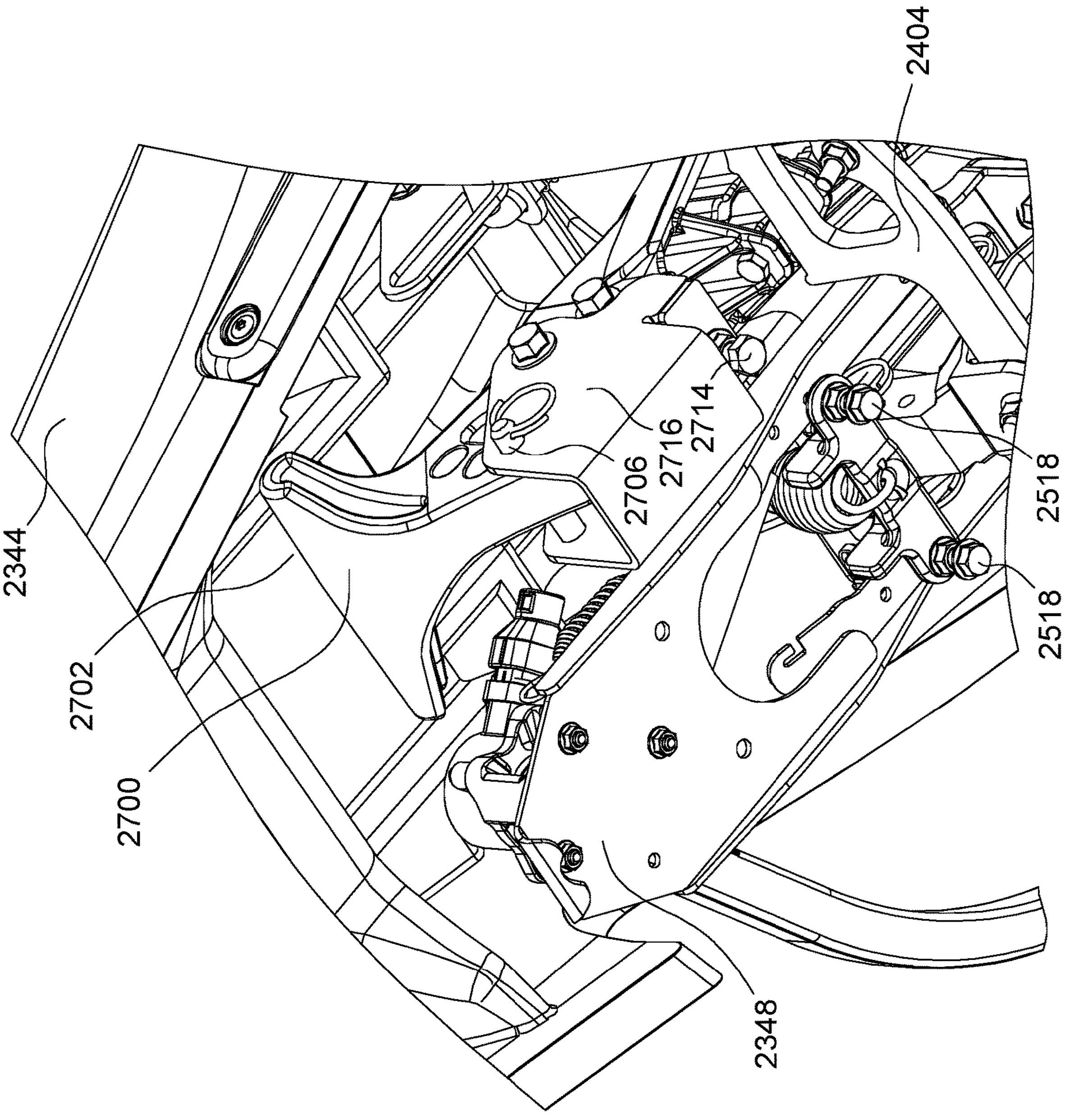
FIG. 28 is a partial section of a perspective view of the point assembly of FIG. 27.

Referring to FIGS. 27 and 28 of the present disclosure, the point assembly 2344 is also adjustable. More specifically, the height of the point assembly 2344 relative to the row unit frame 2400 is adjustable via one of a plurality of adjustment openings 2704 formed in a point assembly adjustment mechanism. The point assembly adjustment mechanism includes a point contact body 2700 as shown in FIG. 27. The point contact body 2700 may be formed as part of a casting, weldment, powdered metal, composite, etc. The point contact body 2700 is shown in FIGS. 27 and 28 as having a generally T-shaped body. In other implementations, the point contact body 2700 may be formed as other shapes including rectangular, square, oval, polygonal, etc. The point contact body 2700 is selectively coupled to an adjustment component 2716. The adjustment component 2716 is coupled to a point assembly support frame 3704 as shown and described in further detail below with respect to FIG. 37. In any event, a pin 2706 is selectively inserted into one of the plurality of adjustment openings 2704 formed in the point contact body 2700 to set the point assembly 2344 at a desired height. The pin 2706 may be selectively removed and inserted without the use of tools in some implementations. As the height of the point assembly 2344 is adjusted, the point contact body 2700 engages an underneath portion of the point assembly 2344 at a point of contact 2702. As the height of the point assembly 2344 is adjusted with the selective insertion of the pin 2706 into one of the plurality of adjustment openings 2704, the point assembly 2344 pivotally moves up or down relative to a point pivot axis 2710. The point pivot axis 2710 is defined through a fastener 2708 as shown in FIG. 27.

The point contact body 2700 is able to pivot about an adjustment pivot axis 2712 relative to the adjustment component 2716. The adjustment axis 2712 is defined through a pin or other fastener. Moreover, besides adjusting the point assembly 2344 via one of the plurality of adjustment openings 2704, the point assembly 2344 may be adjusted via a fine tuning adjustment mechanism 2714. Referring to FIGS. 27 and 28, each of the plurality of adjustment openings 2704 may be oversized or slotted with respect to the pin 2706. In other words, there is a degree of movement of the pin 2706 within each opening 2704 to accommodate fore/aft tolerances. In order to finely tune the height adjustment of the point assembly 2344, the fine tuning adjustment mechanism 2714 may include a threaded cylindrical body such as a bolt. A jam nut may be threadably coupled to the cylindrical body and rotated along the threads to finely tune and adjust the height of the point assembly 2344 with the pin 2706 selectively located in one of the plurality of adjustment openings 2704.

As shown in FIG. 26 and described in greater detail below, the crossbar member 2404 is supported on a leg 2800 of a row unit frame 2400. As shown, the crossbar member 2404 is supported along a contact portion 2802 of the leg 2800.

Referring now to FIGS. 25, 27, 28, 30-32B, the height of the sensing unit 2352 may be adjusted in accordance with one of the plurality of openings 2522 formed in the adjustment post 2520 of the main body 2402. Specifically, as described above, a pin 2604 is inserted into the second openings 2512 of the first and second arms of the adjustment body 2500 and through a corresponding opening 2522 of the plurality of openings 2522. In one implementation, it is desirable to position or adjust the height of the sensing unit 2352 in accordance with the height of the point assembly 2544 to maintain the gap between the stalk feeler 2350 and the housing of the point assembly 2544, as described above. Thus, to maintain a relatively consistent gap, each of the plurality of openings 2522 in the main body 2402 corresponds to each of the plurality of adjustment openings 2704 in the point assembly adjustment mechanism 2700 (i.e., point contact body). In other words, when the pin 2706 is inserted into a bottom-most adjustment opening 2704, the second pin 2604 is inserted into the bottom-most opening 2522 of the plurality of openings 2522 in the adjustment post 2520. Likewise, in this implementation, when the pin 2706 is inserted into a top-most adjustment opening 2704, the second pin 2604 is inserted into the top-most opening 2522 of the plurality of openings 2522 in the adjustment post 2520.

In some implementations, there may be two or more adjustment openings 2704 and two or more openings 2522 such that the location of each adjustment opening 2704 corresponds with the same location of each opening 2522. In several implementations, there may be three or more adjustment openings 2704 and three or more openings 2522 such that the location of each adjustment opening 2704 corresponds with the same location of each opening 2522. In other implementations, there may be four or more adjustment openings 2704 and four or more openings 2522 such that the location of each adjustment opening 2704 corresponds with the same location of each opening 2522. In yet other implementations, there may be five or more adjustment openings 2704 and five or more openings 2522 such that the location of each adjustment opening 2704 corresponds with the same location of each opening 2522. In FIGS. 25 and 27, it is shown that there are four adjustment openings 2704 and four openings 2522. In this implementation, the top of the four adjustment openings 2704 corresponds with the top of the four openings 2522, and the bottom of the four adjustment openings 2704 corresponds with the bottom of the four openings 2522. The adjustment openings 2704 inbetween the top and bottom adjustment openings 2704 corresponds to the respective opening 2522 located between the top and bottom openings 2522.

In other implementations, the pin 2706 may be inserted into one of the adjustment openings 2704 and the second pin 2604 may be inserted into one of the openings 2522 such that the location of the pin 2706 and second pin 2604 do not correspond with one another.

Figure 30:
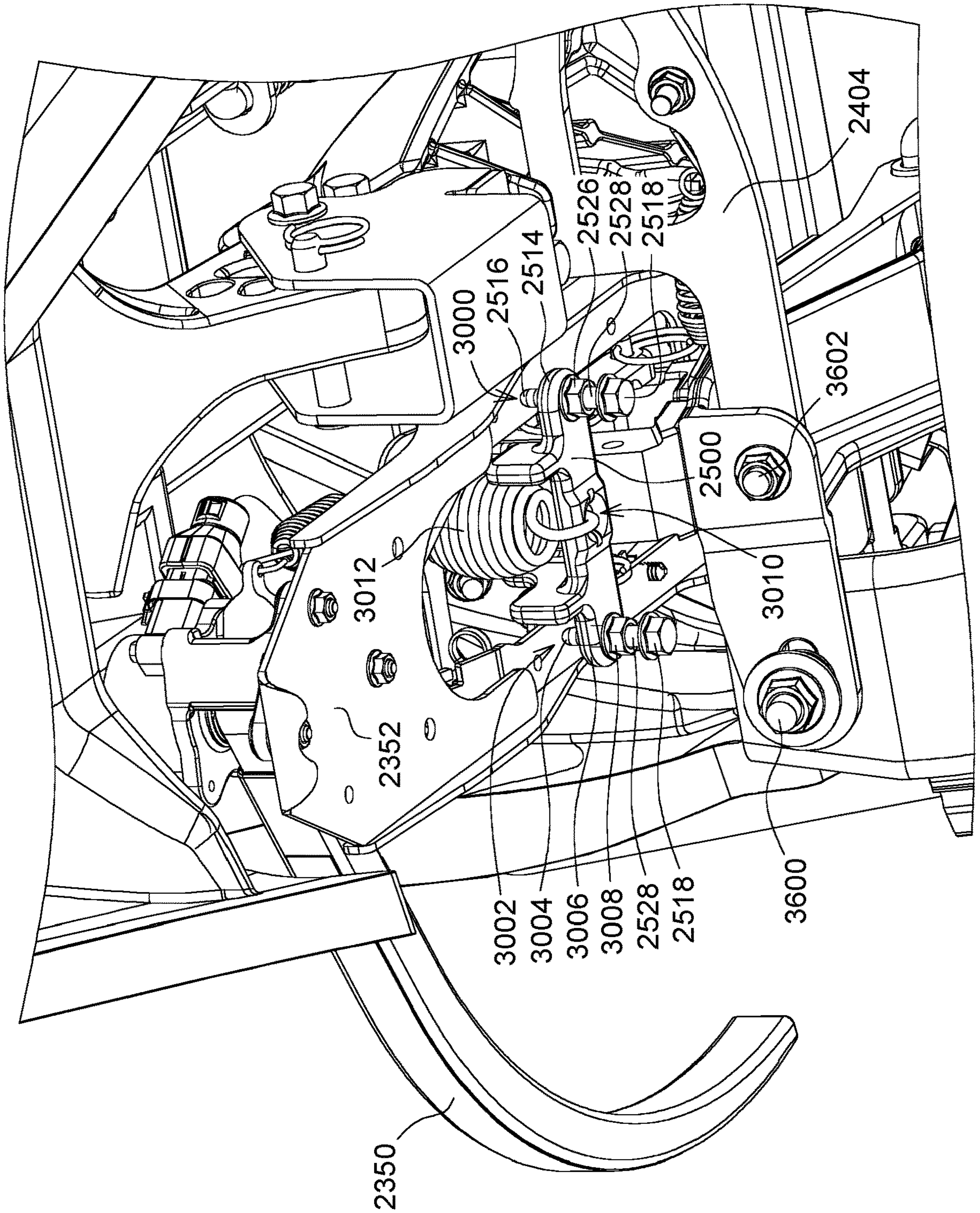
FIG. 30 is a partial section of a perspective view of an example adjustment body of the assembly of FIG. 25.

The height adjustment of the sensing unit 2352 may also be finely tuned. Referring to FIGS. 25 and 30, the adjustment body 2500 includes a first ear 2514 extending along a transverse direction from the second arm 2504 and a second ear 3006 extending along the transverse direction from the first arm 2502. Each ear 2514, 3006 includes an opening through which a contact member passes through. During use, the sensing unit 2344 rests or comes into contact with a first contact member 2516 and a second contact member 3004. As shown in FIG. 30, the sensing unit 2352 rests on the first contact member 2516 at a first contact location 3000 and on the second contact member 3004 at a second contact location 3002. In one implementation, the first and second contact members are bolts coupled to the adjustment body 2500. In some implementations, the contact members are part of a bolt. The adjustment body 2500 may include tapped openings in each ear with threads such that the bolts or contact members are threadably coupled to the adjustment body 2500 via the threaded openings. Each bolt or contact member includes a head member 2518 at one end and a threaded body 2528, as shown in FIGS. 25 and 30. Jam nuts, for example, may be used as the fine tune adjustment member for finely adjusting the height of the sensing unit 2352. In FIG. 30, a first jam nut 2526 is threadably coupled to the body 2528 of the first contact member 2516 between the first ear 2514 and the head member 2518. Similarly, a second jam nut 3008 is threadably coupled to the body 2528 of the second contact member 3004 between the second ear 3006 and the head member 2518.

Each of the jam nuts 2526, 3008 may be rotated in either a clockwise or counterclockwise direction to move the corresponding contact member and therefore the sensing unit 2352 either up or down relative to the adjustment body 2500. The amount of adjustment capable of being made via the movement of the contact members is smaller than moving the second pin 2604 from one opening 2522 to another. Thus, movement of the contact members advantageously achieves more fine tune adjustments than what can be achieved by selectively moving the second pin 2604 to a different opening 2522.

As shown in FIG. 31, an implementation of a stalk-diameter sensing system 2348 is shown for a given row unit and includes a first sensing unit 3100 and a second sensing unit 3102. The first sensing unit 3100 and second sensing unit 3102 may be identical to the sensing unit 2352 previously described. The first sensing unit 3100 includes a first stalk feeler 3104 similar to the previously described stalk feeler 2350. The first sensing unit 3100 is partially supported by a first adjustment assembly 3112 including an adjustment body 2500 having a first bolt or contact member 2516 and a second bolt or contact member 3004. In the same way, the second sensing unit 3102 includes a second stalk feeler 3106 that is similar to the stalk sensor 2350. The second sensing unit 3102 is partially supported by a second adjustment assembly 3114 including an adjustment body 2500 having a first bolt or contact member 2516 and a second bolt or contact member 3004.

In the implementation of FIG. 31, the height of the first sensing unit 3100 and the height of the second sensing unit 3102 may be adjusted so that the first stalk feeler 3106 is aligned with the second stalk feeler 3108. When the first and second stalk feelers are aligned with one another in a common plane, the first stalk feeler 3106 and second stalk feeler 3108 contact one another at a contact point or along a contact portion 3108 of each stalk feeler, as shown. In this implementation, it is desirable for the stalk feelers to contact one another so that an accurate sensing may be performed by the sensors 52 on both sensing units. Moreover, with the first and second stalk feelers 3104, 3106 located on opposite sides of a row unit, the ability to make adjustments to each stalk feeler independently of the other is also desirable for alignment reasons.

In the event the first and second stalk feelers are misaligned with one another, either or both of the sensing units may be adjusted until the stalk feelers are aligned and in contact with one another. The adjustment may be made by moving the second pin of each adjustment assembly into a different opening formed in the respective adjustment post 2520. Alternatively, either or both of the first contact member 2516 and second contact member 3004 may be adjusted. Thus, larger adjustments may be made via selectively moving the second pin 2604 to a different opening 2522 in the adjustment post 2520, whereas smaller or fine tune adjustments may be made via movement of the first and second bolts or contact members.

Besides the fine tune adjustability that the contact members 2516, 3004 provide, the adjustability of each contact member independent of the other allows for a twisting or rotational reconfiguration of the sensing unit and, in particular, the stalk feeler. In other words, each stalk feeler of the stalk-diameter sensing system 2348 may be independently rotated or twisted via the adjustability of the first and second contact members. This level of adjustability may also be used for aligning the stalk feelers located on opposite sides of the row unit.

Figure 32B:
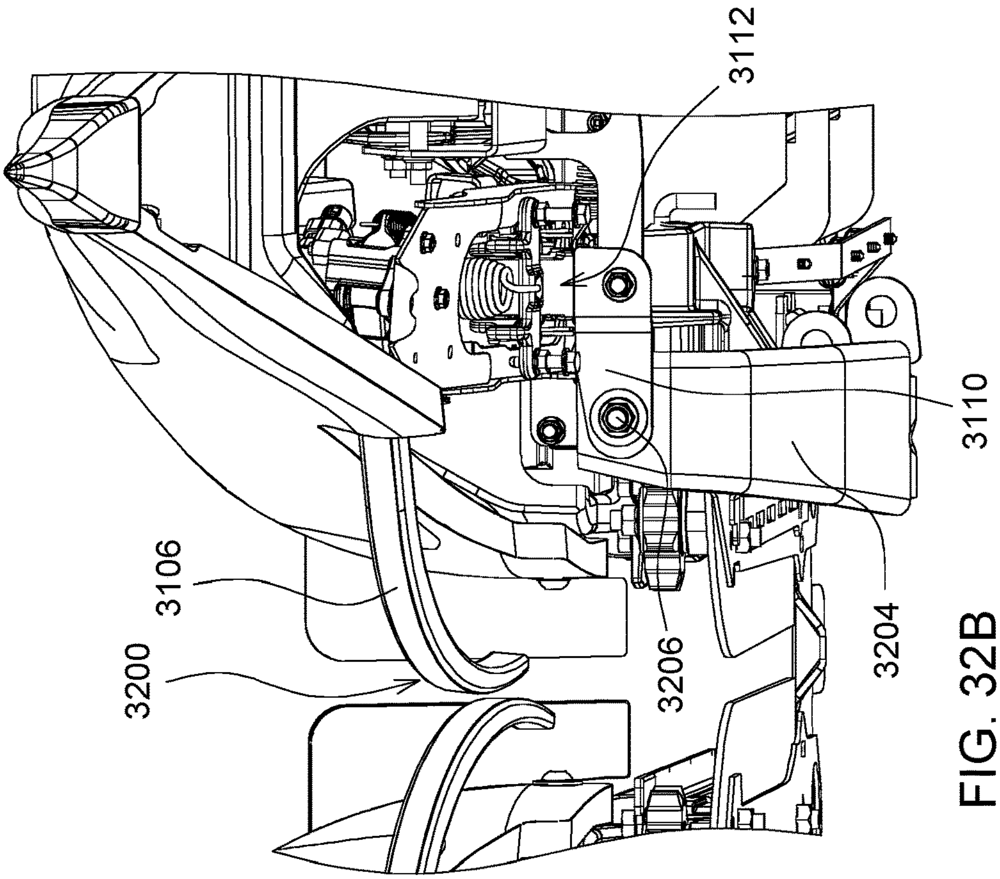
FIG. 32B is a perspective view of a second orientation of an example stalk feeler of a stalk-diameter sensing system.
Figure 32A:
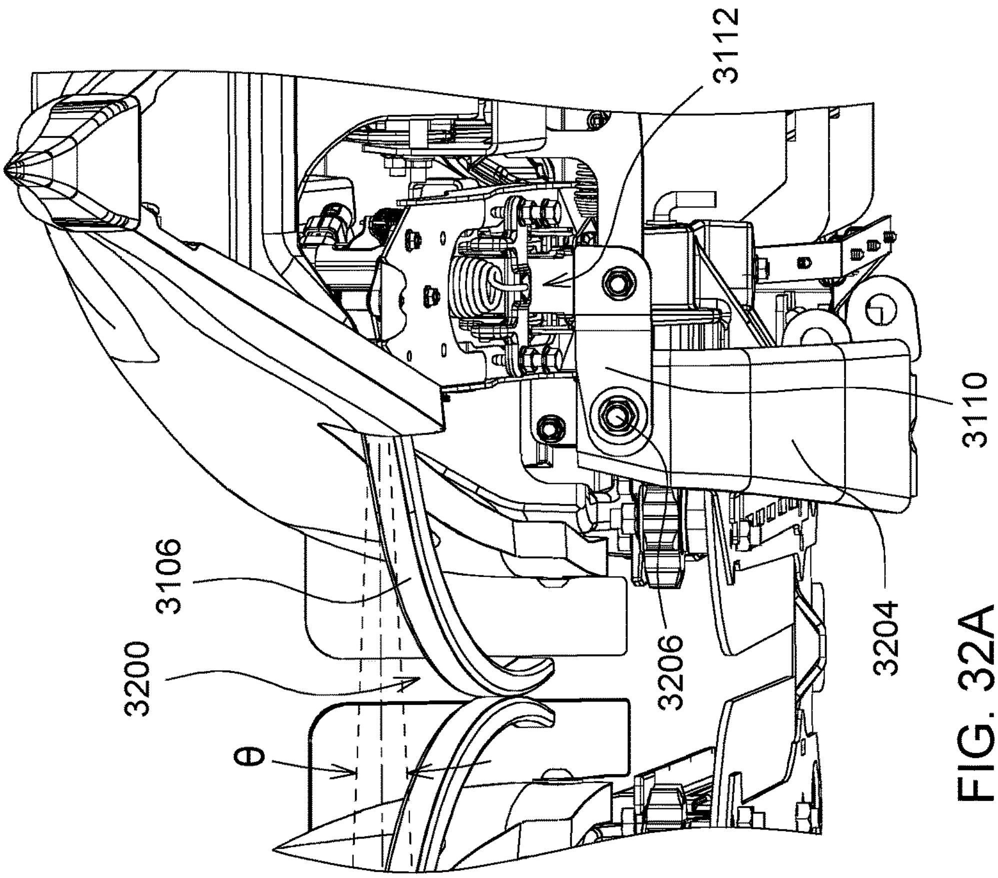
FIG. 32A is a perspective view of a first orientation of an example stalk feeler of a stalk-diameter sensing system.

In FIG. 32A, for example, the first stalk feeler 3106 is shown in a first orientation 3200. In this first orientation 3200, the first contact member 2514 is adjusted upwards independently of the second contact member 3004. As the first contact member 2514 is moved upward relative to the second contact member 3004, the first stalk feeler 3106 may twist or rotate about the first adjustment assembly 3112 counterclockwise to the first orientation 3200. As shown, the first stalk feeler 3106 twists or is rotated at an angle Θ relative to a second orientation 3202 shown in FIG. 32B. In FIG. 32B, the first stalk feeler 3106 is shown being generally more level and not twisted or rotated as in the first orientation 3200. The ability to twist or rotate each stalk feeler in a clockwise or counterclockwise direction allows for the flexibility in aligning each stalk feeler with the other in a stalk-diameter sensing system 2348.

Moreover, the ability to twist or rotate the sensing unit via the independently movable bolts or contact members can be utilized in other aspects and applications besides sensing stalk diameter. The adjustment body and main body combination that allows for the fine tune adjustability may be used in some implementations on other agricultural headers or other agricultural systems including planters, seeders, sprayers, tractors, and implements. The fine tune adjustability may be used for other pivotal or rotational adjustments to align different components or sensing units on the header or agricultural harvester. For instance, in one implementation, a non-contact transmitter may be mounted to a frame of one sensing unit located on one side of a row unit, and a receiver may be mounted to a frame of another sensing unit located on the opposite side of the row unit. The transmitter may emit signals to the receiver to detect when a stalk or other object is about to be received by the row unit. With the transmitter and receiver being mounted on different frames, the ability to align the two frames and thus the transmitter with the receiver is desirable. The fine tune adjustability of the first and second contact members 2516, 3004 may be implemented in this application to assist with aligning the transmitter and receiver with one another. In other implementations, this type of fine tune adjustability may be implemented to align two components located on the header or agricultural harvester with one another via the independent twisting or rotating of one or both components.

In other implementations, the fine tune adjustability may be used to align one component located on an implement with another component at a different location on the implement. For example, a first component and a second component may be mounted at different locations on the implement. In another example, the first component may be mounted on a first sub-frame and the second component may be mounted on a second sub-frame, where either or both sub-frames may be adjustably controlled to align the first component and second component with one another. In some examples, the first sub-frame and second sub-frame may be coupled to a common main frame. For example, in a combine harvester, a pair of components on the cleaning shoe may be aligned with one another utilizing the fine tune adjustability described in this disclosure. In another example, the stalk feelers 2350 may be the components that are being aligned with one another.

In other implementations, the fine tune adjustability can be utilized to align different components on different headers of an agricultural system. The different headers may include a cornhead, a draper header, and an auger header. In yet other implementations, the fine tune adjustability may be used to align different components on other agricultural systems that share a common frame.

In yet other implementations, the fine tune adjustability may be used to align a pair of sensing units located at different locations in an agricultural system (e.g., at different mounting locations, different frames, different sub-frames, etc.). In some implementations, a first sensing unit may include the fine tune adjustability utilizing the adjustment body 2500 with the first contact member 2516 and the second contact member 3004. Again, the first and second contact members 2516, 3004 can be bolts, screws, dowel pins, rods, or other members capable of being moved in at least a linear direction. In other implementations, the second sensing unit may include the fine tune adjustability as described herein. In further implementations, the first and second sensing units may include the fine tune adjustability.

In another implementation, a sensing unit may include an optical sensor including a camera or the like. The optical sensor may be mounted at a location on a frame or other support body for sensing a target location (e.g., another sensing unit, a row in a field, a crop, a weed, another location on the frame, another location on an implement, another location on a harvester, another location on a header, etc.). The optical sensor may output a signal to a controller or control system which can display the output from the optical sensor to a display in a harvester, for example. The alignment of the optical sensor with the target location can be adjusted utilizing the fine tune adjustability described herein. In some examples, the optical sensor may be adjusted relative to the target location. In other examples, the frame or other support body may be adjusted so that the optical sensor is aligned with the target location.

In a further implementation of the present disclosure, a sensing unit or component may be adjusted relative to a target plane. For example, in FIGS. 32A and 32B, the stalk feelers 2350 may be adjusted relative to a target plane. In one example, the stalk feeler 2350 of one sensing unit 2352 may be adjustably controlled to align with the target plane and the stalk feeler 2350 of the opposite sensing unit 2352 may be adjustably controlled to align with the target plane. In this example, by aligning the stalk feelers 2350 to the target plane, the stalk feelers 2350 may be in contact with one another. In other examples, the stalk feelers may be adjusted to different target planes so that the stalk feelers are not in contact with one another.

In FIG. 30, a biasing member 3012 such as a spring (e.g., coil spring, torsion spring, compression spring, gas spring, etc.) is shown coupled between the sensing unit 2352 and the adjustment body 2500. The adjustment body 2500 includes an opening 3010 through which an end of the biasing member 3012 couples directly to the adjustment body 2500. Although not shown, the sensing unit 2352 includes a frame to which the opposite end of the biasing member 3012 is coupled. The biasing member 3012 biases the sensing unit 2352 down and into contact with the first contact member 2516 and the second contact member 3004. Unlike the point assembly 2344, the sensing unit 2352 may not have enough weight to maintain contact with the first and second contact members 2516, 3004. Thus, the biasing member 3012 assists with maintaining contact between the sensing unit 2352 and the first and second contact members 2516, 3004.

The biasing member 3012 also allows the sensing unit 2352 to pivotally move about the hinge axis 2408 upon contact with the ground or another object. As the sensing unit 2352 pivots upward about the hinge axis 2408 until the ground or object is clear, the biasing member 3012 biases or returns the sensing unit 2352 back to its original position in contact with the first and second contact members 2516, 3004. Due to this pivotal movement of the sensing unit 2352, the sensing unit 2352 generally does not yield, deflect or undergo structural failure if the ground or an object is engaged. The biasing member 3012 therefore provides overload protection to the sensing unit 2352 in the event of contact with the ground or an object. Moreover, the biasing member 3012 may be used in other applications with other agricultural headers or sub-frames where the biasing member provides overload protection. For example, as referenced above with one sensing unit including a transmitter coupled to one sub-frame and a second sensing unit including a receiver coupled to another sub-frame. A first biasing member may be utilized to provide overload protection to the first sub-frame and transmitter, and a second biasing member may be utilized to provide overload protection to the second sub-frame and receiver.

Figure 33:
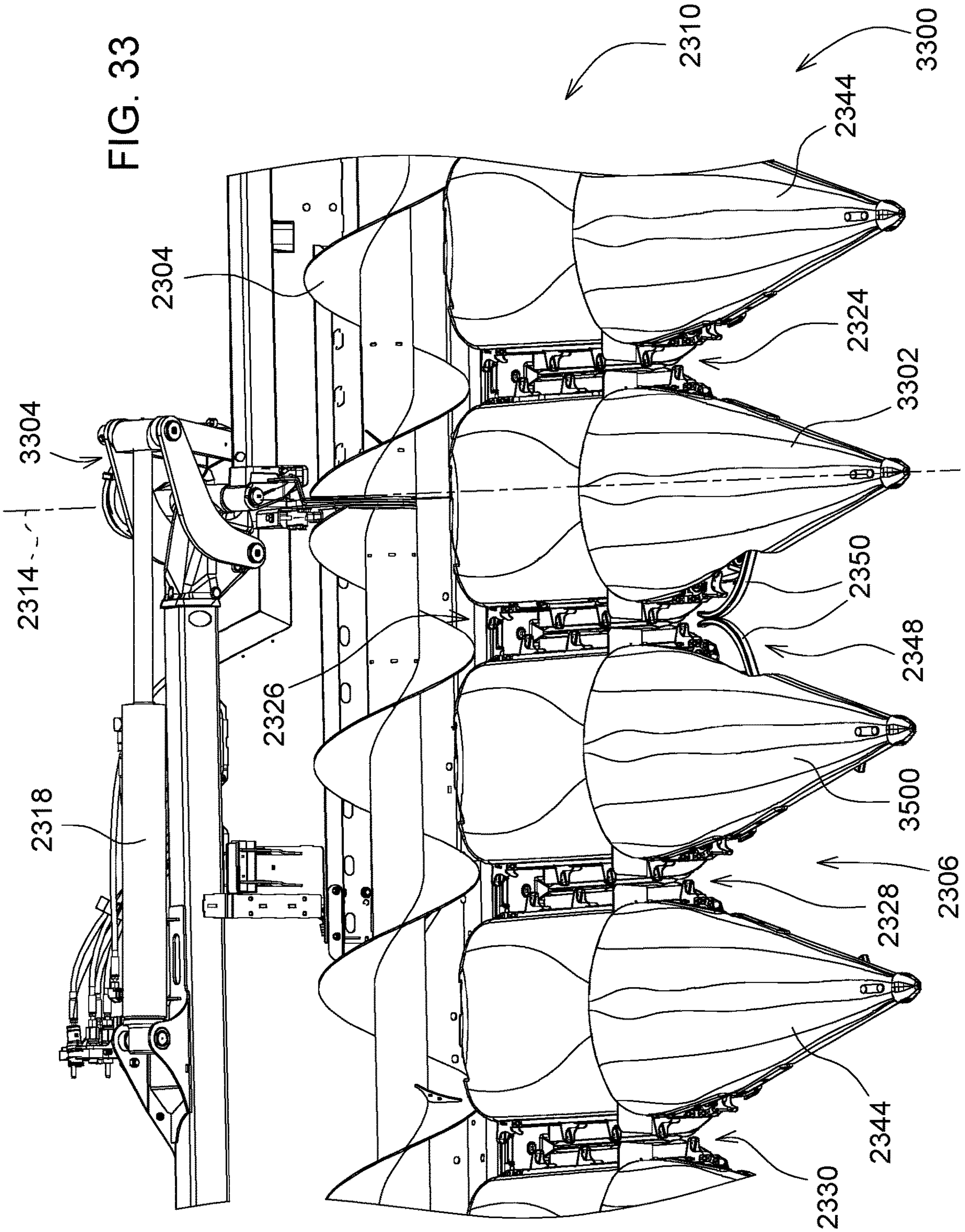
FIG. 33 is a partial perspective view of an example header of an agricultural harvester including a center frame, a wing frame, and a plurality of row units.

Referring to FIGS. 33-40, one implementation of an example header 3300 (e.g., agricultural header) is shown. The header 3300 may be similar to the header 2300 of FIG. 23. In any event, the header 3300 includes a center frame assembly 2306, a first wing frame assembly 2308, and a second wing frame assembly 2310. The second wing frame assembly 2310 is shown in FIG. 33 being pivotable about a second fold axis 2314. As shown, a fold linkage assembly 3304 including one or more links may be used in combination with a second actuator 2318 for imparting pivotal movement of the second wing frame assembly 2310 relative to the center frame assembly 2306. As also shown, a point assembly 3302 similar to the point assemblies 2344 previously described is located along the second fold axis 2314. The point assembly 3302 is located between the third row unit 2324 and the fourth row unit 2326 of the header 3300.

Figure 34:
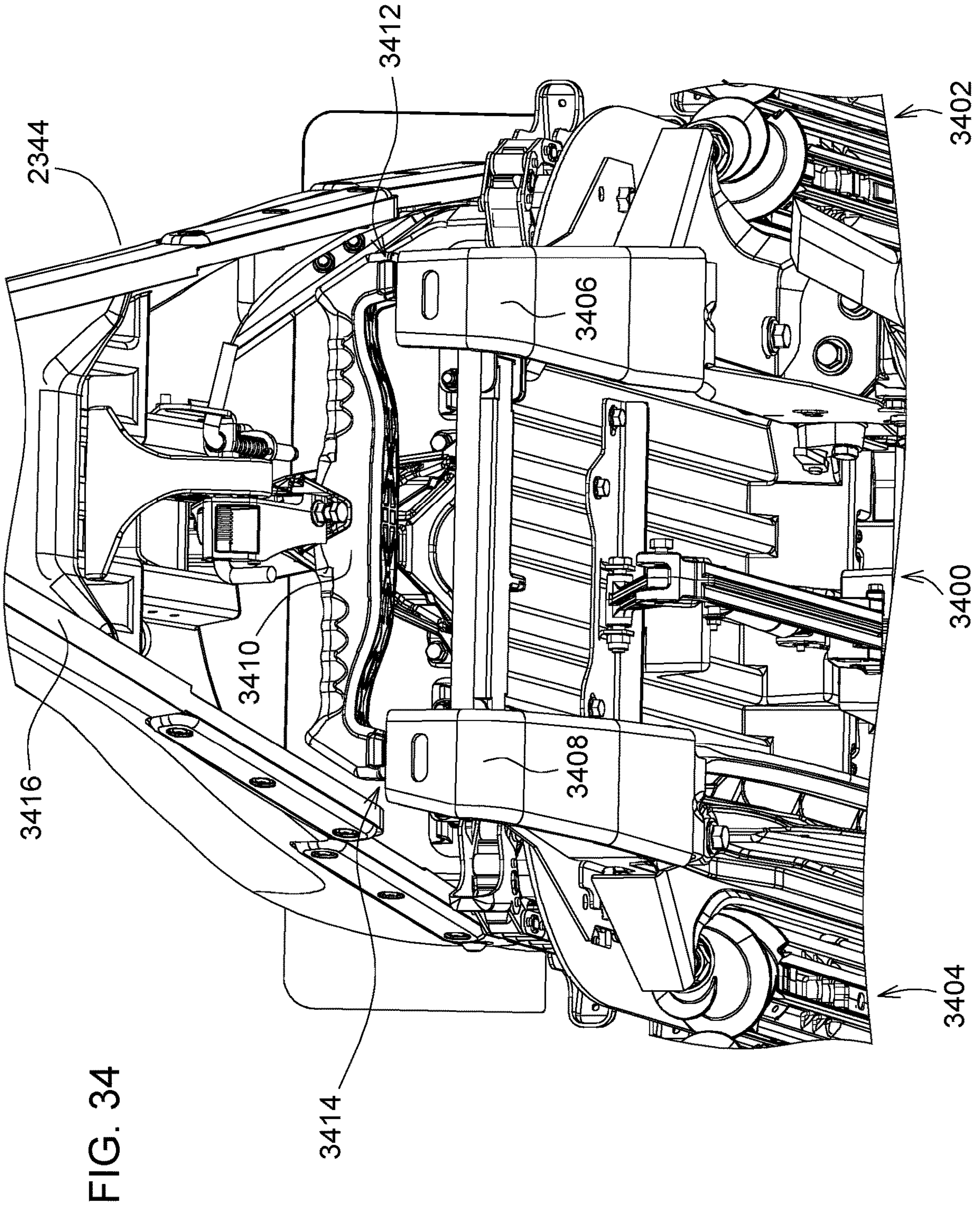
FIG. 34 is a perspective bottom view of an example point assembly.

The point assembly 3302 of FIG. 33 is supported between the third row unit 2324 and fourth row unit 2326 in a different manner than the other point assemblies 2344 not located on the first or second folding axis 2312, 2314. In FIG. 34, for example, one implementation of a point assembly 2344 is depicted in a non-fold axis location 3400 on the header 3300. One example of a non-fold axis location 3400 is the point assembly 2344 supported between the fifth row unit 2328 and the sixth row unit 2330. For sake of clarity, the point assembly 2344 in FIG. 34 is located between a first row unit 3402 (e.g., the fifth row unit 2328 of FIG. 23) and a second row unit 3404 (e.g., the sixth row unit 2330). The first row unit 3402 includes a row unit frame having a first leg 3406 and the second row unit 3404 includes a row unit frame having a second leg 3408. In this implementation, the point assembly 2344 includes a support member 3410 mounted to a portion of the point assembly 2344 and located underneath a housing 3416 (e.g., similar to the housing 126 of FIG. 12) that covers the sensor unit (not shown). In one example, the support member 3410 is an aluminum die casting. In another example, the support member 3410 is made of steel. In a further example, the support member 3410 is made of plastic. In other examples, the support member 3410 is made of material that is strong enough to support the weight of the point assembly 2344. In this implementation, the support member 3410 contacts and is supported at a first location 3412 by the first leg 3406 of the first row unit 3402 and at a second location 3414 by the second leg 3408 of the second row unit 3404.

Figure 35:
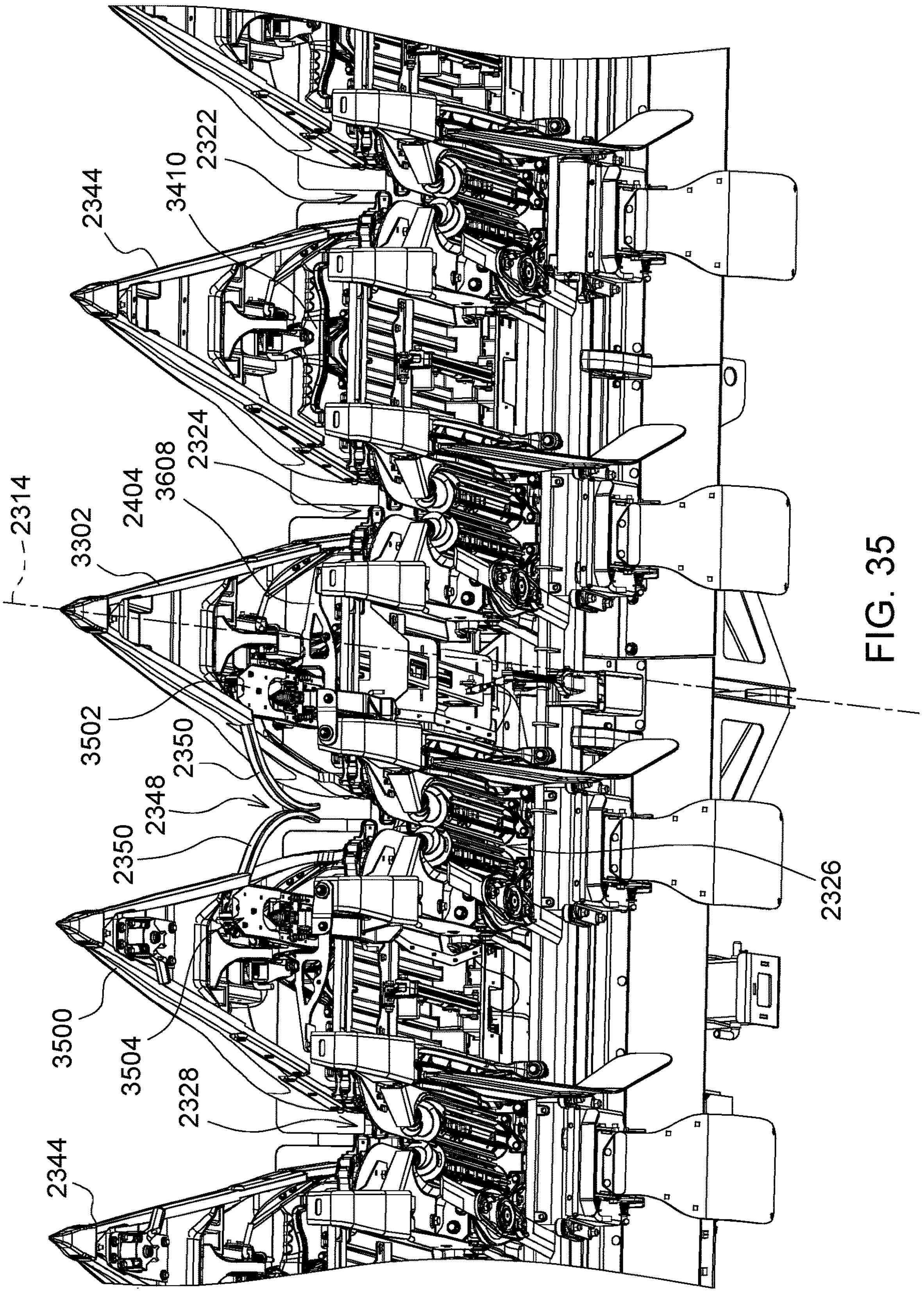
FIG. 35 is a perspective bottom view of the example header of FIG. 33.

When the stalk-diameter sensing system 2348 is located adjacent to the fold axis, and particularly when one of the two sensing units is located along the fold axis such as in FIG. 33, the point assembly 3300 that at least partially covers that sensing unit needs to be supported by adjacent row units. In FIG. 35, for example, the point assembly 3300 is located along the second fold axis 2314 and its weight is supported by the row unit frame of the third row unit 2324 and the row unit frame of the fourth row unit 2326. The manner in which this is achieved is described below.

The point assembly 3300, also referred to hereinafter as the first point assembly 3300, provides cover for a first sensing unit 3502 that is part of the stalk-diameter sensing system 2348 shown in FIG. 35. The first sensing unit 3502 is similar to the sensing unit 2352 previously described and includes a first stalk feeler 2350. On the opposite side of the fourth row unit 2326 is a second point assembly 3500. The second point assembly 3502 is similarly structured as the point assembly 2344 and the first point assembly 3300. The second point assembly 3502 provides cover for a second sensing unit 3504 that is part of the stalk-diameter sensing system 2348. The second sensing unit 3504 is similar to the sensing unit 2352 and includes a second stalk feeler 2350. The first and second stalk feelers 2350 function to help detect a diameter or size of stalk being harvested by the fourth row unit 2326.

The first point assembly 3300 is supported along the second fold axis 2314 by the mount body 3110 and crossbar member 2404. As previously described above, the mount body 3110 couples the first sensing unit 3502 of the stalk-diameter sensing system 2348 to the first leg 3606 of the fourth row unit 2326. As shown, a fastener 3600 (i.e., similar to the connection 3206 of FIG. 32A-B) such as a bolt is used to couple mount body 3110 to the first leg 3606 at a first of two or more locations. A second bolt (not shown) may also couple the mount body 3110 to the first leg 3606. In any event, the crossbar member 2404 is able to pivot about a pivot axis 3700 defined through the second fastener 3602 (see FIG. 37). This pivotal movement is described in more detail below.

Figure 36:
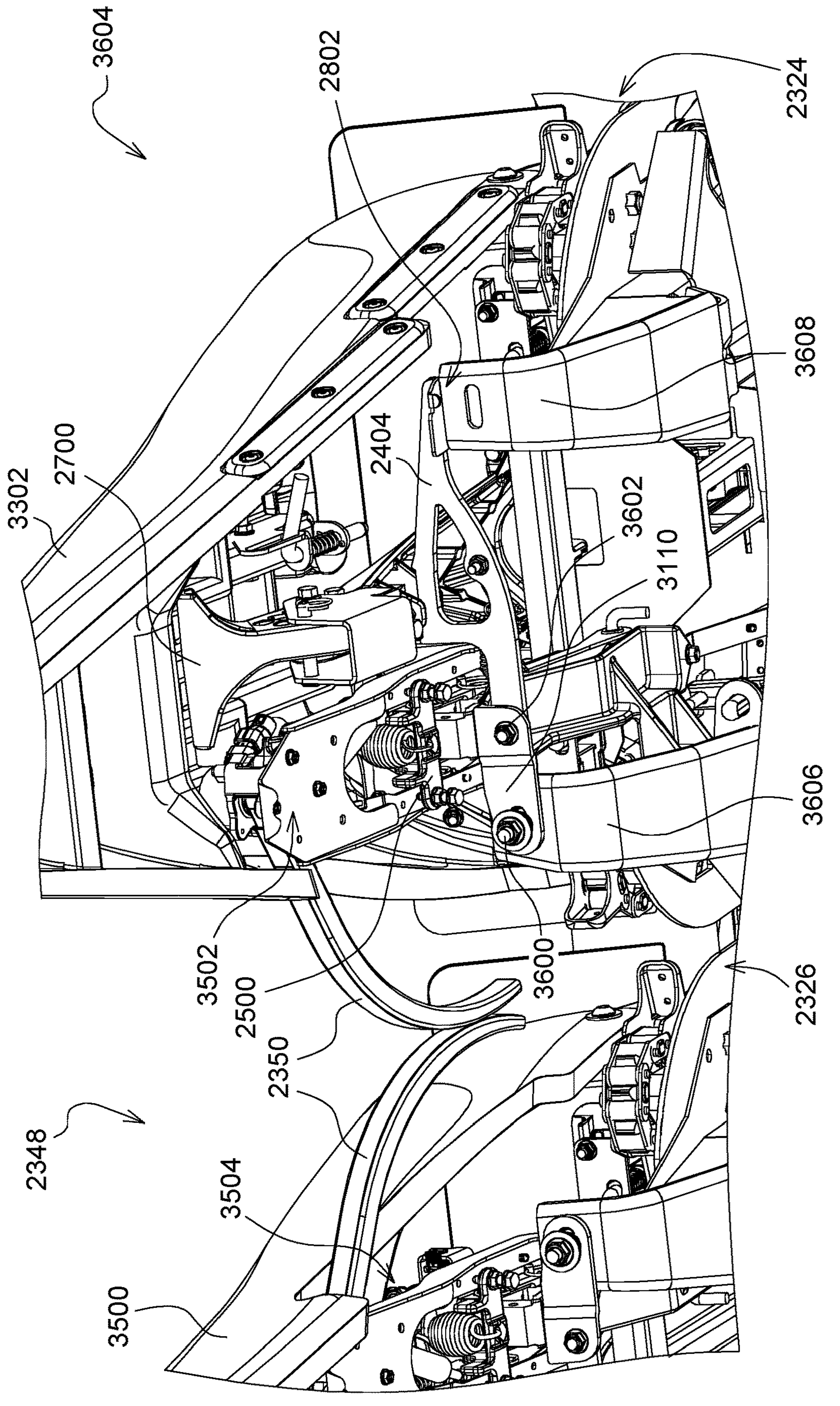
FIG. 36 is a perspective bottom view of a stalk-diameter sensing system and example crossbar support.

The crossbar 2404 is pivotally coupled to the mount body 3110 via a second fastener 3602 such as a bolt. The crossbar member 2404 extends from the connection to the mount body 3110 below the first point assembly 3302 and contacts a second leg 3608 of the row unit frame of the third row unit 2324. In the position of FIG. 36, the first point assembly 3302 is in a first or rest position 3604.

Figure 38:
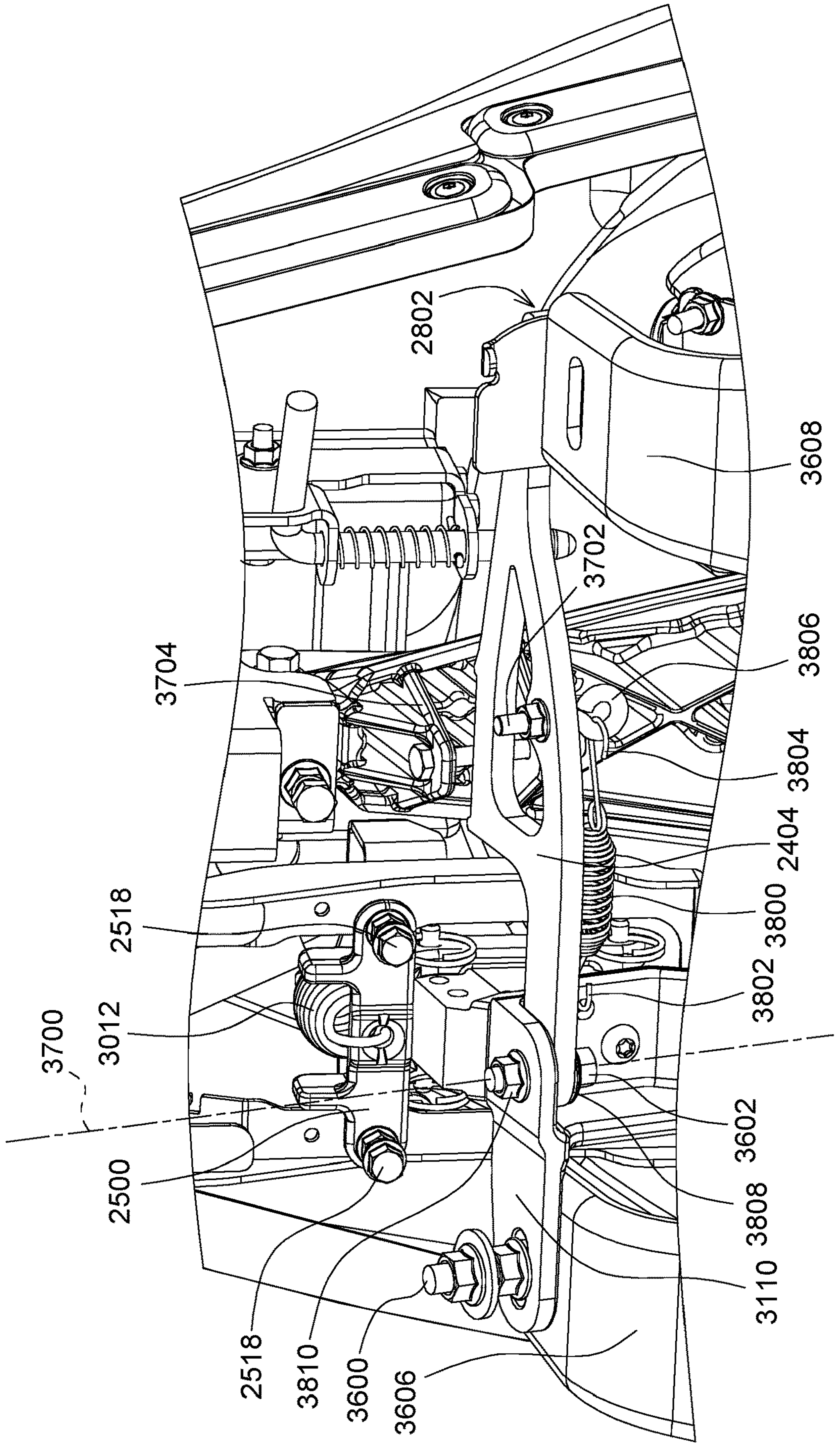
FIG. 38 is a perspective view of an example biasing member of the crossbar support of FIG. 36.

As shown in FIG. 38, the crossbar member 2404 is coupled along the pivot axis 3700 to the mount body 3110 via the second fastener 3602, a bushing 3808, and a nut 3810. The crossbar member 2404 is therefore able to pivot about the bushing 3808 and mount body 3110.

Figure 37:
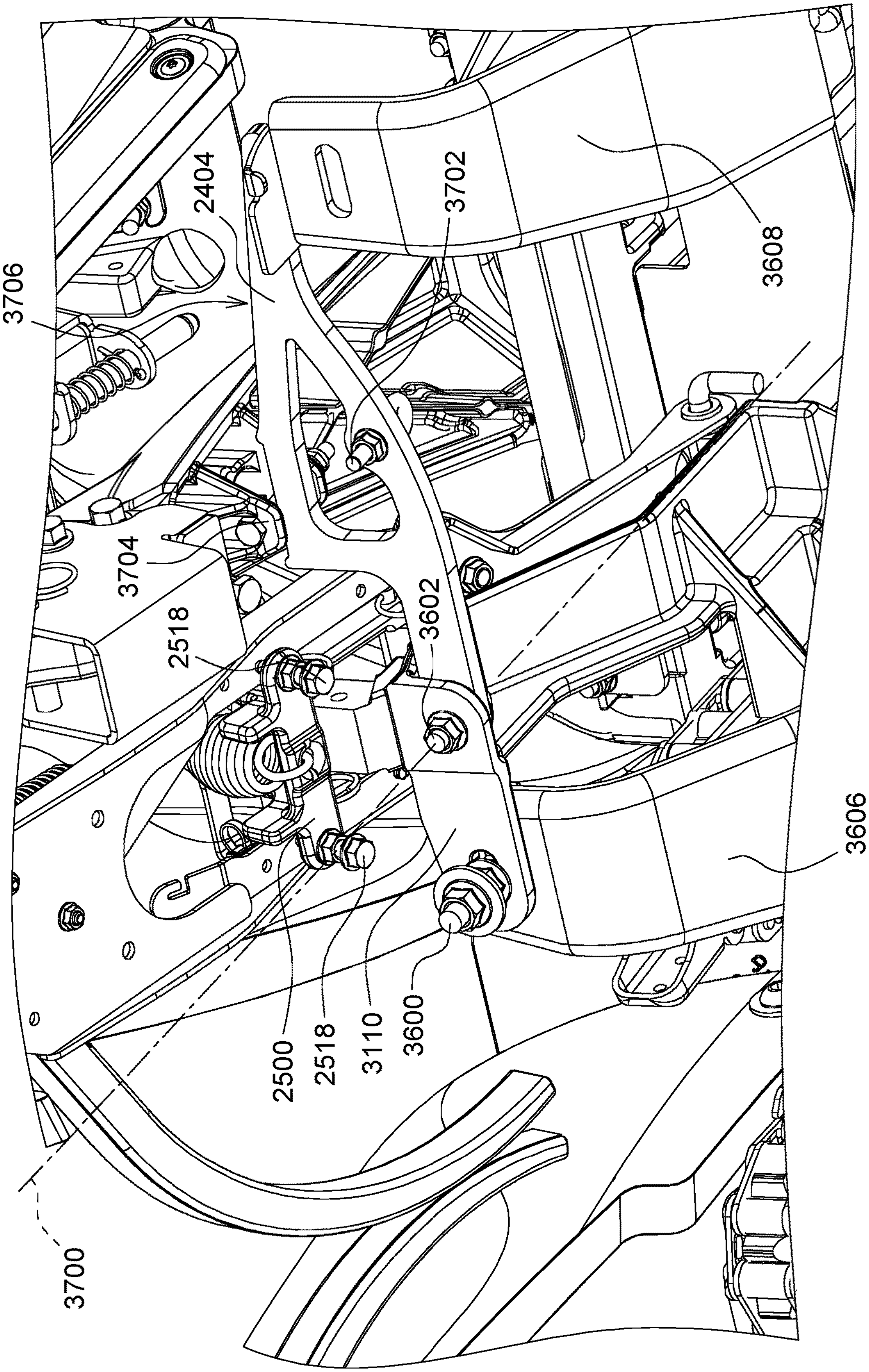
FIG. 37 is another perspective bottom view of the crossbar support of FIG. 36.

In FIGS. 37 and 38, a fastener 3702 such as a threaded bolt is coupled to the crossbar member 2404 at a location between the pivot axis 3700 and contact location 2802 between the crossbar member 2404 and the second leg 3608. The fastener 3702 may be secured to the crossbar member 2404 via a nut. In one implementation, the fastener 3702 may include an eye bolt, for example, having a connecting member 3806 such as an aperture or opening formed therein. In other implementations, the fastener 3702 can be omitted such that the connecting member is integrally formed in the crossbar member 2404 as an opening or aperture. In some implementations, the crossbar member 2404 may be formed as a casting with the connecting member formed as part of the casting. As shown in FIG. 38, a second biasing member 3800 is coupled between the first leg 3606 and the connecting member 3806 of the fastener 3702. The biasing member 3800 may be a spring such as a coil spring, extension spring, torsion spring, gas spring, compression spring or any other type of biasing member (e.g., an actuator). In the implementation of FIG. 38, the second biasing member 3800 is shown as an extension spring. In other embodiments where the second biasing member 3800 is not an extension spring, it is understood that the configuration and connection points may differ from the implementation of FIG. 38. As shown in FIG. 38, a first end 3802 of the second biasing member 3800 is coupled to the first leg 3606 and a second end 3804 of the second biasing member 3800 is coupled to the connecting member 3806. In another implementation, the first end 3802 may be coupled to the main body 2402 or a row unit leg. As will be described further below, the second biasing member 3800 assists with biasing or pivoting the crossbar support 2404 upward in a counterclockwise direction about the pivot axis 3700. In some implementations, the biasing member 3800 is able to pivot the crossbar member 2404 by 5-25° relative to the first position 3604. In other implementations, the biasing member 3800 is able to pivot the crossbar member 2404 by 5-20° relative to the first position 3604. In further implementations, the biasing member 3800 is able to pivot the crossbar member 2404 by 5-15° relative to the first position 3604. In yet other implementations, the biasing member 3800 is able to pivot the crossbar member 2404 by approximately 10° relative to the first position 3604.

In the first position 3604 of FIGS. 36 and 37, the first point assembly 3302 includes a support frame 3704. The support frame 3704 contacts a top surface 3706 of the crossbar member 2404 in the first position 3604 to hold or maintain the crossbar member 2404 in the first position 3604. As described above, without the weight of the first point assembly 3302 holding the crossbar member 2404 in the first position 3604, the second biasing member 3800 biases the crossbar member 2404 to lift up and pivot counterclockwise about the pivot axis 3700.

Figure 39:
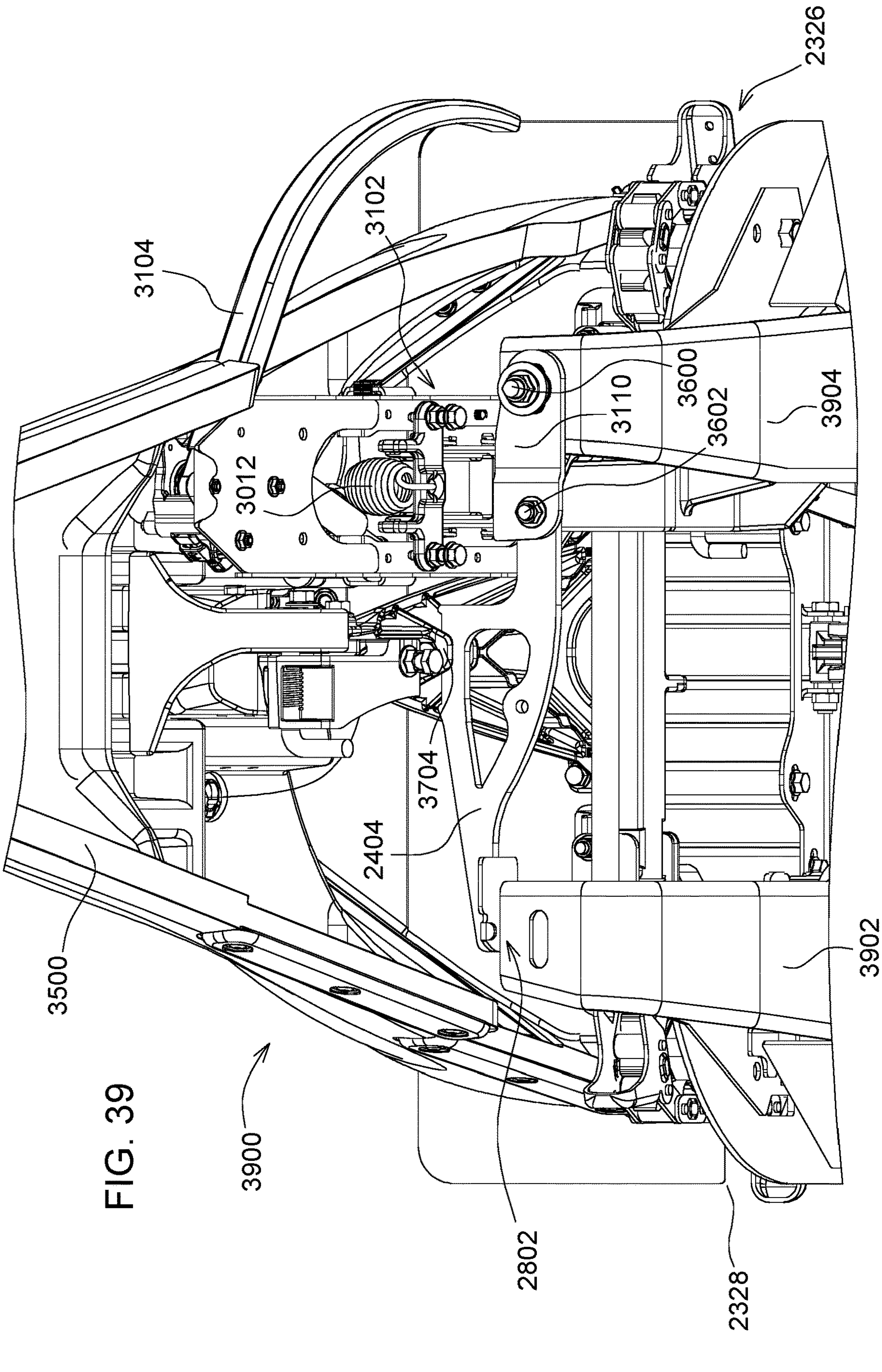
FIG. 39 is a perspective view of another example crossbar support.

Referring to FIG. 39, the second point assembly 3500 is shown in a first or rest position 3900. In this implementation, the second point assembly 3500 is supported by the mount body 3110 and crossbar member 2404 similar to the first point assembly 3302. The second point assembly 3500 is supported between a first leg 3902 of a row unit frame of the fifth row unit 2328 and a second leg 3904 of a row unit frame of the fourth row unit 2326. The implementation of FIG. 39 differs from that of the first point assembly 3302 in FIGS. 36-38 in that the crossbar member 2404 that supports the second point assembly 3500 does not include a biasing member 3800 coupled between the crossbar member 2404 and the second leg 3904. Here, the crossbar member 2404 that supports the second point assembly 3500 does not need to pivot about the second fastener 3602 since the second point assembly 3500 is not located along a fold axis. In other words, when the first and second wing frame assemblies are folded along the respective first and second fold axes, the second point assembly 3500 does not pivot or move during the fold or unfold processes. The second point assembly 3500 therefore can remain in the first or rest position 3900 as shown.

Even though the second point assembly 3500 does not pivot or move during the fold/unfold process, the crossbar member 2404 is still used to allow enough space below the cover of the second point assembly 3500 for the second sensing unit 3504. Thus, the crossbar member 2404 is used for space constraint reasons at each location on the header 3300 where a sensing unit is coupled to a row unit and a stalk-diameter sensing system 2348 is located at an interface of the center frame assembly 2306 and a wing frame assembly 2308, 2310. Moreover, in several implementations, the crossbar support 2404 is coupled to each sensing unit of the stalk-diameter sensing system 2348, and the respective sensing unit is coupled to the row unit frame rather than the point assembly. In some implementations, the second biasing member 3800 is generally used on only one side of the fold axis and is coupled to the crossbar member 2404 that is located along the fold axis.

Figure 40:
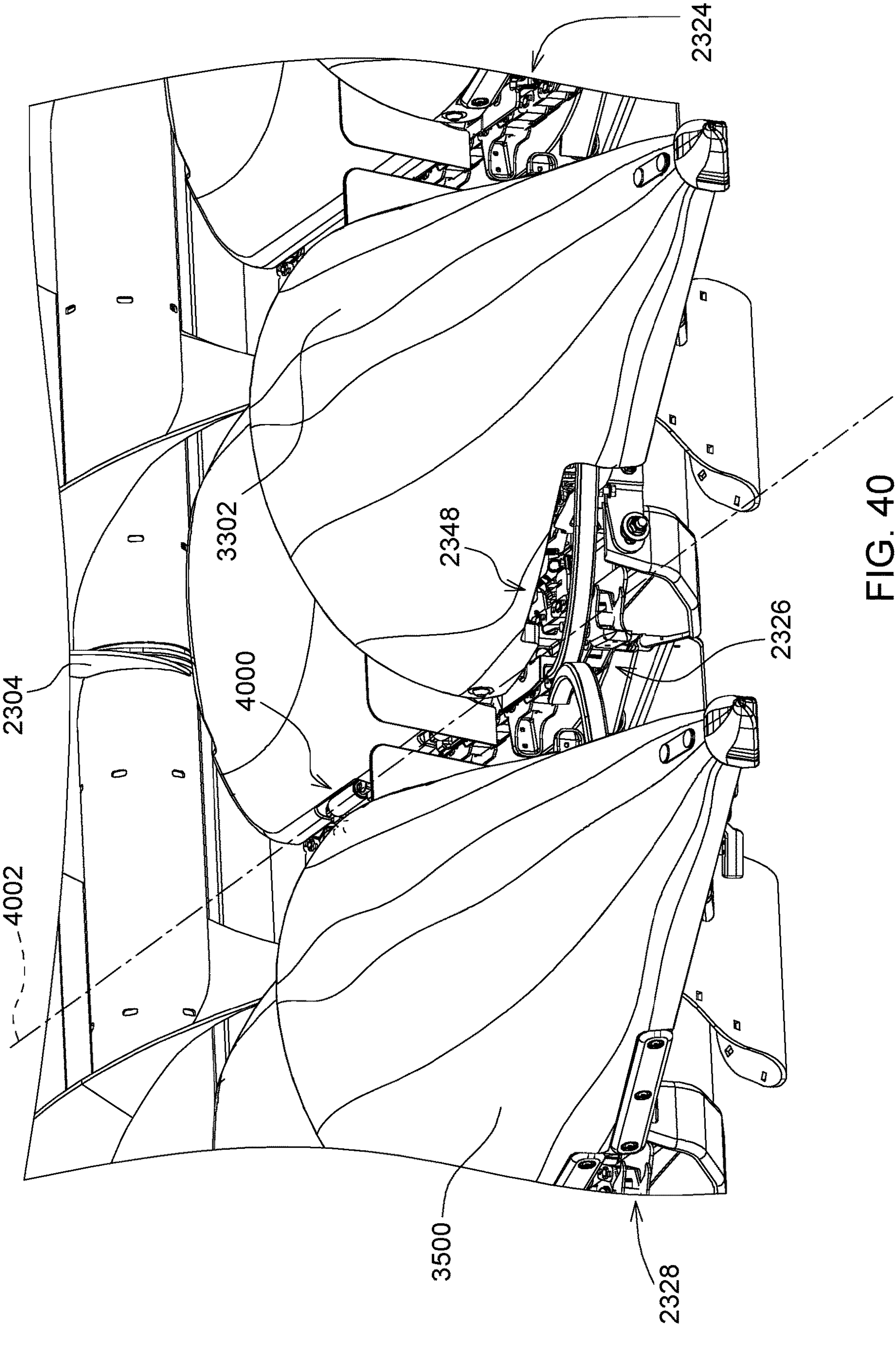
FIG. 40 is a partial perspective view of an example point assembly of the example header of FIG. 33.

As shown in FIG. 40, the first point assembly 3302 includes a hinge assembly 4000. The first point assembly 3302 is pivotally coupled to the hinge assembly 4000 such that the first point assembly 3302 is able to pivot about a longitudinal pivot axis 4002. In some implementations, the longitudinal pivot axis 4002 is parallel to each fold axis. In other implementations, the longitudinal pivot axis 4002 is angularly-disposed relative to each fold axis.

When the header 3300 is in the work position and is being folded to the transport position, the first point assembly 3302 is pivoted about the longitudinal pivot axis 4002 in a counterclockwise direction towards the second pivot assembly 3500. The first and second actuators 2316, 2318 are actuated to pivot the first wing frame assembly 2308 about the first fold axis 2312 and the second wing frame assembly 2310 about the second fold axis 2314. As the first point assembly 3302 is pivoted about the longitudinal pivot axis 4402 to create space for the second wing frame assembly 2310 to fold about the second fold axis 2314, the weight of the first point assembly 3302 is removed from the crossbar member 2404. As this happens, the second biasing member 3800 biases or lifts the crossbar member 2404 to pivot about the pivot axis 3700. As the crossbar member 2404 pivots about the pivot axis 3700, the crossbar member 2404 moves out of contact with the second leg 3608 of the third row unit 2324. Since the third row unit 2324 is coupled to the second wing frame assembly 2310, the third row unit 2324 will move with the second wing frame assembly 2310 about the second fold axis 2314. In this implementation, the first point assembly 3302 is coupled only to the mount body 3110 which is coupled to the first leg 3606 of the fourth row unit 2326. Since the fourth row unit 2326 does not move or pivot during the folding process, the stalk-diameter sensing system 2348 remains in place and coupled to corresponding legs of the fourth row unit 2326 and fifth row unit 2328 as previously described.

During the fold process, the first pivot assembly 3302 and its cover or housing also pivot about the longitudinal pivot axis 4402. An actuator (not shown) may be controlled to pivot the first pivot assembly 3302 and its cover about the longitudinal pivot axis 4402. The actuator may be a hydraulic actuator, linear actuator, rotary actuator, electric actuator, pneumatic actuator, or any other known type of actuator.

During the unfold process, the first and second actuators 2316, 2318 are actuated to pivot the first and second wing frames 2308, 2310 about the first and second fold axes 2312, 2314. Once the wing frame assemblies are pivoted about the respective fold axis in a clockwise direction to the work position, the first point assembly 3302 is pivoted in the clockwise direction about the longitudinal axis 4402. In doing so, the point assembly support frame 3704 of the first point assembly 3302 contacts the top surface 3706 of the crossbar member 2404. As it does, the weight of the first point assembly 3302 is sufficient to overcome the biasing force of the second biasing member 3800 and therefore pivots the crossbar member 2404 in a clockwise direction about the pivot axis 3700. The crossbar member 2404 pivots about the pivot axis 3700 until the crossbar member 2404 returns to being in contact with the second leg 3608 of the row unit frame of the third row unit 2324. The second wing frame assembly 2310 and first point assembly 3302 are now returned to the unfold or work position.

While the description above and FIGS. 33-40 refer to the second wing frame assembly 2310 and first point assembly 3302, it is to be understood that a similar point assembly at the first fold axis 2312 is configured and functions the same.

While the above describes example implementations of the present disclosure, these descriptions should not be viewed in a limiting sense. Rather, other variations and modifications can be made without departing from the scope and spirit of the present disclosure as defined in the appended claims.

What is claimed is:

1. An agricultural header for use with an agricultural harvester, comprising:

a header frame;

a first row unit comprising a first row unit frame coupled to the header frame;

a second row unit comprising a second row unit frame coupled to the header frame;

a mount body coupled to the first row unit frame;

a stalk sensing unit comprising a frame portion and a stalk feeler deflectably coupled to the sensing unit;

a point assembly pivotally coupled to the header frame, the point assembly at least partially covering the sensing unit; and a crossbar member comprising a first portion and a second portion, the first portion being pivotally coupled to the mount body to pivot about a first pivot axis;

wherein the crossbar member is pivotable about the first pivot axis between a first position and a second position;

wherein, in the first position, the second portion of the crossbar member is disposed in contact with the second row unit frame;

wherein, in the second position, the second portion of the crossbar member is biased out of contact with the second row unit frame.

2. The agricultural header of claim 1, wherein the crossbar member pivots about a bushing disposed along the first pivot axis.

3. The agricultural header of claim 1, further comprising a biasing member coupled to the crossbar member, the biasing member configured to bias the crossbar member out of contact with the second row unit frame.

4. The agricultural header of claim 3, wherein the biasing member is coupled to the crossbar member at a location between the first portion and the second portion.

5. The agricultural header of claim 3, wherein the crossbar member includes a connection location, the biasing member coupled to the connection location.

6. The agricultural header of claim 3, wherein the biasing member is configured to bias the crossbar member to pivot about the first pivot axis towards the second position.

7. The agricultural header of claim 1, wherein the point assembly comprises a frame structure configured to contact the crossbar member in the first position.

8. The agricultural header of claim 1, wherein the point assembly is pivotally coupled to the header frame about a second pivot axis.

9. The agricultural header of claim 8, wherein the first and second pivot axes are generally parallel to one another.

10. The agricultural header of claim 8, wherein the point assembly is pivotable about the second pivot axis between a work position and a transport position, wherein, when the point assembly is in the work position, the frame structure of the point assembly is in contact with the crossbar member in the first position;

wherein, when the point assembly is in the transport position, the frame structure is disengaged from the crossbar member and the crossbar member is biased to the second position.

11. The agricultural header of claim 1, wherein the header frame comprises a first frame assembly and a second frame assembly, the second frame assembly being pivotal about a fold axis relative to the first frame assembly;

wherein, the point assembly is aligned along the fold axis.

12. The agricultural header of claim 11, wherein the first row unit is coupled to the first frame assembly and the second row unit is coupled to the second frame assembly.

13. An agricultural header for use with an agricultural harvester, comprising:

a header frame comprising a first frame assembly and a second frame assembly, the second frame assembly pivotally coupled to the first frame assembly about a fold axis;

a first row unit coupled to the first frame assembly;

a second row unit coupled to the second frame assembly;

a mount body coupled to the first row unit;

a point assembly aligned along the fold axis and pivotally coupled to the first frame assembly about a first pivot axis; and a crossbar member comprising a first portion and a second portion, the first portion pivotally coupled to the mount body to pivot about a second pivot axis;

wherein the crossbar member is pivotable about the second pivot axis to pivot between a first position and a second position, where in the first position the second portion of the crossbar member is in contact with the second row unit, and wherein in the second position the second portion of the crossbar member is biased out of contact with the second row unit frame.

14. The agricultural header of claim 13, further comprising a biasing member including a first end and a second end, the first end coupled to the first row unit and the second end coupled to the crossbar member.

15. The agricultural header of claim 14, wherein the biasing member is configured to bias the crossbar member to pivot about the second pivot axis towards the second position.

16. The agricultural header of claim 13, wherein as the point assembly pivots about the first pivot axis from a work position to a transport position, the crossbar member is biased to pivot about the second pivot axis from the first position to the second position.

17. The agricultural header of claim 16, wherein as the point assembly pivots about the first pivot axis from the transport position to the work position, the crossbar member is engaged by the point assembly to pivot about the second pivot axis from the second position to the first position.

18. An agricultural header for use with an agricultural harvester, comprising:

a header frame comprising a first frame assembly and a second frame assembly, the second frame assembly pivotally coupled to the first frame assembly about a fold axis;

a first row unit coupled to the first frame assembly;

a second row unit coupled to the second frame assembly, the first row unit being on one side of the fold axis and the second row unit being on the other side of the fold axis;

a third row unit coupled to the first frame assembly, the first row unit located between the second row unit and the third row unit;

a first mount body coupled to the first row unit and a second mount body coupled to the third row unit;

a first point assembly aligned along the fold axis and pivotally coupled to the first frame assembly about a first pivot axis;

a first crossbar member comprising a first portion and a second portion, the first portion pivotally coupled to the first mount body to pivot about a second pivot axis; and a biasing member coupled between the first row unit and the first crossbar member;

wherein the first crossbar member is pivotable about the second pivot axis to pivot between a first position and a second position, where in the first position the second portion of the crossbar member is in contact with the second row unit;

wherein the biasing member is configured to bias the first crossbar member out of contact with the second row unit frame and towards the second position.

19. The agricultural header of claim 18, further comprising:

a second point assembly located adjacent the first point assembly and offset from the fold axis, the second point assembly coupled to the first frame assembly; and a second crossbar member comprising a first portion and a second portion, the first portion of the second crossbar member pivotally coupled to the second mount body;

wherein the second crossbar member is engaged by the second point assembly to maintain the second portion of the second crossbar member in contact with the first row unit.

* * * * *